United States Patent
Kehrer et al.

(10) Patent No.: US 12,502,420 B2
(45) Date of Patent: Dec. 23, 2025

(54) CLOSTRIDIUM BOTULINUM SEROTYPE A NEUROTOXIN (BoNT/A) SEQUENCE VARIANTS

(71) Applicant: AbbVie Inc., North Chicago, IL (US)

(72) Inventors: Robert R. Kehrer, Garden Grove, CA (US); Jared Wiig, Fullerton, CA (US); Hui Xiang, Irvine, CA (US); Phillip P. Nguyen, Irvine, CA (US); Hemant A. Patel, Rancho Santa Margarita, CA (US); Connie J. Ng, Irvine, CA (US); Cortnie M. Guerrero, Costa Mesa, CA (US)

(73) Assignee: AbbVie Inc., North Chicago, IL (US)

( * ) Notice: Subject to any disclaimer, the term of this patent is extended or adjusted under 35 U.S.C. 154(b) by 0 days.

(21) Appl. No.: 18/418,028

(22) Filed: Jan. 19, 2024

(65) Prior Publication Data

US 2024/0277820 A1   Aug. 22, 2024

Related U.S. Application Data

(60) Provisional application No. 63/480,937, filed on Jan. 20, 2023.

(51) Int. Cl.
*A61K 38/48* (2006.01)
*C12N 9/52* (2006.01)

(52) U.S. Cl.
CPC ............ *A61K 38/4893* (2013.01); *C12N 9/52* (2013.01); *C12Y 304/24069* (2013.01)

(58) Field of Classification Search
CPC .................. A61K 38/4893; C12N 9/52; C12Y 304/24069
See application file for complete search history.

(56) References Cited

U.S. PATENT DOCUMENTS

| | | | |
|---|---|---|---|
| 5,939,070 | A | 8/1999 | Johnson et al. |
| 7,160,699 | B2 | 1/2007 | Wang et al. |
| 7,354,740 | B2 | 4/2008 | Xiang et al. |
| 7,452,697 | B2 | 11/2008 | Luo et al. |
| 8,129,139 | B2 | 3/2012 | Ton et al. |
| 8,198,034 | B2 | 6/2012 | Fernandez-Salas et al. |
| 8,618,261 | B2 | 12/2013 | Ester et al. |
| 9,249,216 | B2 | 2/2016 | Fernandez-Salas et al. |
| 9,725,705 | B2 | 8/2017 | Xiang |
| 9,920,310 | B2 | 3/2018 | Anderson et al. |
| 10,703,806 | B2 | 7/2020 | Fernandez-Salas et al. |
| 11,261,240 | B2 | 3/2022 | Fernandez-Salas et al. |
| 11,332,518 | B2 | 5/2022 | Fernandez-Salas et al. |
| 2003/0118598 | A1 | 6/2003 | Hunt |
| 2005/0238669 | A1 | 10/2005 | Xiang et al. |
| 2009/0202591 | A1 | 8/2009 | Steward et al. |
| 2010/0278826 | A1 | 11/2010 | Shoemaker et al. |
| 2011/0008843 | A1 | 1/2011 | Ton et al. |
| 2015/0313973 | A1 | 11/2015 | Forssen et al. |
| 2021/0024913 | A1 | 1/2021 | Xiang |

FOREIGN PATENT DOCUMENTS

| | | |
|---|---|---|
| CN | 105420073 A | 3/2016 |
| JP | 2020055798 A | 4/2020 |
| WO | WO 2009/114748 A1 | 9/2009 |
| WO | WO 2010/105234 A1 | 9/2010 |
| WO | WO 2015004461 A1 | 1/2015 |
| WO | WO 2016019180 A1 | 2/2016 |
| WO | WO 2022/189807 A2 | 9/2022 |

OTHER PUBLICATIONS

Aoki et al., 1999, "Preclinical update on Botox® (botulinum toxin type A)—purified neurotoxin complex relative to other botulinurn neurotoxin preparations," European Journal of Neurology 6:s3-s10.

Aoki, 2001, "A comparison of the safety margins of botulinum neurotoxin serotypes A, B, and F in mice," Toxicon 39(12):1815-1820.

Broide et al., 2013, "The rat Digit Abduction Score (DAS) assay: a physiological model for assessing botulinum neurotoxin-induced skeletal muscle paralysis," Toxicon 71:18-24.

Ekong et al., 1997, "Recombinant SINAP-25 is an effective substrate for Clostridium botulinum type A toxin endopeptidase activity in vitro," Microbiology 143:3337-3347.

Fernandez-Salas et al., 2012, "Botulinum neurotoxin serotype A specific cell-based potency assay to replace the mouse bioassay," PLOS One 7(11):e49516.

Hunt et al., 2010, "Characterization of SNARE Cleavage Products Generated by Formulated Botulinum Neurotoxin Type-A Drug Products," Toxins 2(8):2198-2212.

Hunt et al., 2009, "Potency Evaluation of a Formulated Drug Product Containing 150-kd Botulinum Neurotoxin Type A," Clinical Neuropharmacology 32(1):28-31.

Lietzow et al., 2008, "Subunit stoichiometry of the Clostridium botulinum type A neurotoxin complex determined using denaturing capillary electrophoresis," Protein J 27:420-425.

Rupp et al., 2020, "OnabotulinumtoxinA Displays Greater Biological Activity Compared to IncobotulinumtoxinA, Demonstrating Non-Interchangeability in Both In Vitro and In Vivo Assays," Toxins 12(6):393.

Schantz et al., 1978, "Standardized Assay for Clostridium botulinum Toxins," Journal of the AOAC 61(1):96-99.

Zhang et al., 2003, "Complete DNA sequences of the botulinum neurotoxin complex of Clostridium botulinum type A-Hall (Allergan) strain," Gene 315:21-32.

Baldwin et al., 2004, "The C-terminus of botulinum neurotoxin type A light chain contributes to solubility, catalysis, and stability," Protein Expression and Purification 37(1):187-195.

(Continued)

*Primary Examiner* — Lynn Y Fan
(74) *Attorney, Agent, or Firm* — JONES DAY

(57) ABSTRACT

Provided herein are compositions comprising a *Clostridium botulinum* neurotoxin serotype A (BoNT/A) complex comprising a 150 kDa BoNT/A. Said 150 kDa BoNT/A is in the form of a plurality of sequence variant species, wherein the plurality of sequence variant species comprises a 150 kDa BoNT/A sequence variant species with a C-terminal truncated light chain.

Figure 1:
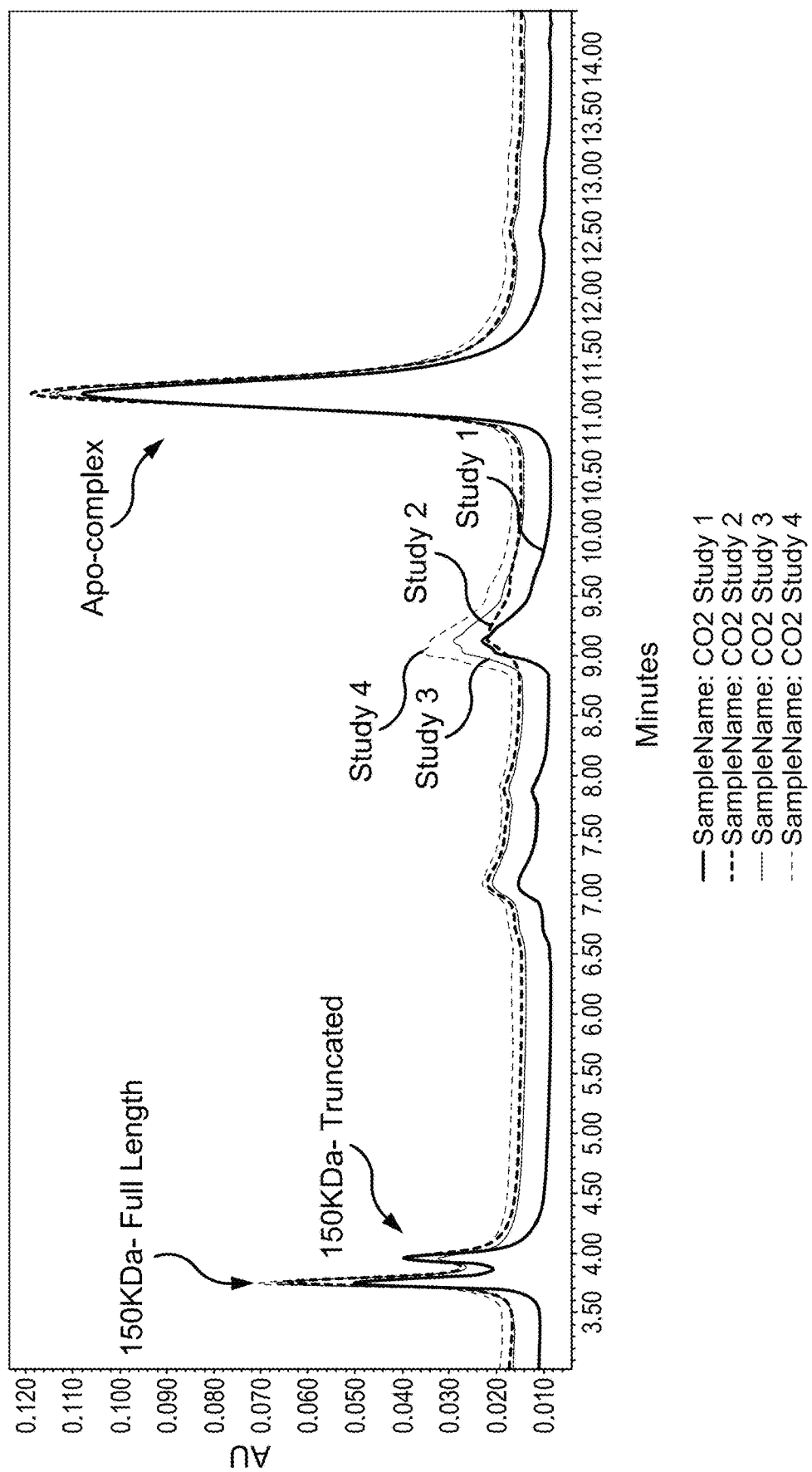

26 Claims, 8 Drawing Sheets
Specification includes a Sequence Listing.

(56) References Cited

OTHER PUBLICATIONS

International Search Report and Written Opinion mailed Jun. 26, 2024 for International Application PCT/US2024/012176 filed Jan. 19, 2024 (6 pages).
Lam et al., 2022. "Probing the structure and function of the protease domain of botulinum neurotoxins using single-domain antibodies," PLoS Pathogens 18(1):1-25.
Artin et al., 2008, "Effects of carbon dioxide on neurotoxin gene expression in nonproteolytic Clostridium botulinum Type E," Appl. Environ. Microbiol., 74(8): 2391-2397.
Benoit et al., 2017, "Crystal structure of the BoNT/A2 receptor-binding domain in complex with the luminal domain of its neuronal receptor SV2C," Sci Rep. 7:43588 (7 pages).
Dasgupta et al., 1984, "Purification and amino acid composition of type A botulinum neurotoxin," Toxicon, 22(3):415-424.
GenBank Accession No. AAQ06331.1, "neurotoxin BONT [Clostridium botulinum]," Oct. 20, 2003 (2 pages).
International Searching Authority, International Search Report and Written Opinion for International Patent Application No. PCT/US2024/012176 (Pub No. WO 2024155900) mailed Jul. 31, 2024 (12 pages).
Krieglstein et al., 1994, "Covalent structure of botulinum neurotoxin type A: location of sulfhydryl groups, and disulfide bridges and identification of C-termini of light and heavy chains," J. Protein Chem., 13(1):49-57.
Mizanur et al., 2013, "The C terminus of the catalytic domain of type A botulinum neurotoxin may facilitate product release from the active site," J. Biol. Chem., 288(33):24223-24233.
Park et al., 2020, "Neurotoxin Impurities: A Review of Threats to Efficacy," Plast. Reconstr. Surg. Glob. Open, 8(1):e2627 (11 pages).
Pirazzini et al., 2017, "Botulinum Neurotoxins: Biology, Pharmacology, and Toxicology," Pharmacol. Rev., 69(2):200-235.
Sathyamoorthy et al., 1985, "Separation, purification, partial characterization and comparison of the heavy and light chains of botulinum neurotoxin types A, B, and E," J. Biol. Chem., 260(19):10461-10466.
Agencia Española De Medicamentos Y Productos Sanitarios (AEMPS), 2021, "Technical Data Sheet Botox Allergan, Powder for Injectable Solution," Aug. 2021 [retrieved on Nov. 29, 2024]. Retrieved from The Waybak Machine <URL: https://web.archive.org/web/20220609101059/https://cima.aemps.es/cima/dochtml/ft/63194/FichaTecnica_63194.html>, in Spanish with machine English translation (74 pages).
Zhang et al., 2003, "Complete DNA sequences of the botulinum neurotoxin complex of Clostridium botulinum type A-Hall (Allergan) strain," Gene, 315:21-32 and corrigendum 322:187 (13 pages).
Lyons et al., 2016, "Spontaneous cleavage of proteins at serine and threonine is facilitated by zinc," Aging Cell, 15(2):237-244.
Siegel et al., 1979, "Toxin production by Clostridium botulinum type A under various fermentation conditions," Appl. Environ. Microbiol., 38(4):606-611.

CLOSTRIDIUM BOTULINUM SEROTYPE A NEUROTOXIN (BoNT/A) SEQUENCE VARIANTS

CROSS-REFERENCE TO RELATED APPLICATIONS

This application claims the benefit, under 35 U.S.C. § 119(e), of U.S. Provisional Application No. 63/480,937, filed on Jan. 20, 2023, which is incorporated by reference herein in its entirety.

REFERENCE TO SEQUENCE LISTING SUBMITTED ELECTRONICALLY

This application incorporates by reference a Sequence Listing submitted with this application as an xml file entitled "13371-269-999_SEQ_LISTING.xml" created on Jan. 11, 2024 and having a size of 8,297 bytes.

1. FIELD

Provided herein are compositions comprising a *Clostridium botulinum* neurotoxin serotype A (BoNT/A) complex comprising a 150 kDa BoNT/A. Said 150 kDa BoNT/A is in the form of a plurality of sequence variant species, wherein the plurality of sequence variant species comprises a 150 kDa BoNT/A sequence variant species with a C-terminal truncated light chain.

2. BACKGROUND

*Clostridium botulinum* neurotoxin serotype A (BoNT/A) is a highly potent toxin that causes muscle relaxation by inhibition of synaptic vesicle docking and fusion, thereby blocking acetylcholine release at neuromuscular junctions. BoNT/A is produced by *Clostridium botulimim* Type A strains, which synthesize a complex of a 150 kDa neurotoxin, along with a group of nontoxic neurotoxin-associated proteins (NAPs). BOTOX®, or onabotulinumtoxinA, is a BoNT/A product approved by the United States Food and Drug Administration (FDA) in 1989 for a variety of therapeutic and cosmetic indications.

To date, there remains a need for developing *botulimim* toxins pharmaceutical compositions with improved properties.

Citation of a reference herein shall not be construed as an admission that such is prior art to the present disclosure.

3. SUMMARY

The present disclosure is based, in part, on the surprising finding of a 150 kDa BoNT/A variant with a C-terminal truncated light chain, i.e., a C-terminal truncated light chain having an amino acid sequence set forth in SEQ ID NO: 4 (hereinafter referred to as "truncated 150 kDa BoNT/A"), and that the presence and/or the amount of such a variant may impact the properties of the BoNT/A complex. The present disclosure also describes that increasing the concentration of $CO_2$ during the fermentation of *Clostridium botulinum* and using a temperature that is lower than the standard fermentation temperature during fermentation (either for a short period of time (i.e., cold shock) or continuously) both can reduce the amount of truncated 150 kDa BoNT/A. Without wishing to be bound by any one theory, as compared to the full-length 150 kDa BoNT/A (i.e., the 150 kDa BoNT/A comprising a light chain having the amino acid sequence of SEQ ID NO: 2), the truncated 150 kDa BoNT/A variant is more negatively charged due to the loss of the C-terminal positively charged lysine residue in the light chain. The more negatively charged truncated BoNT/A variant may display a shorter tissue retention time than the full-length BoNT/A species at the site of administration due to unfavorable electrostatic interactions between the truncated BoNT/A variants described herein and the anionic extracellular components (such as cell membranes and heparin sulphate proteoglycans) at the site of administration. Thus, by reducing the level of the more negatively charged truncated BoNT/A variant, the BoNT/A compositions described herein can reduce the amount of biologically active BoNT/A that diffuse away from the site of administration, and thus improving tissue retention.

In one aspect, provided herein is a composition comprising a 900 kDa *Clostridium botulinum* neurotoxin serotype A (BoNT/A) complex, wherein the 900 kDa BoNT/A complex comprises a 150 kDa BoNT/A that is in the form of a plurality of sequence variant species, wherein the plurality of sequence variant species comprises a 150 kDa BoNT/A sequence variant species with a C-terminal truncated light chain and a 150 kDa BoNT/A sequence variant species with a full-length light chain, wherein the C-terminal truncated light chain has an amino acid sequence set forth in SEQ ID NO: 4, and the full-length light chain has an amino acid sequence set forth in SEQ ID NO: 2, and wherein the ratio of the abundance of the 150 kDa BoNT/A sequence variant species with the C-terminal truncated light chain to the abundance of the 150 kDa BoNT/A sequence variant species with the full-length light chain is less than 3.9.

In another aspect, provide herein is a composition comprising a 900 kDa BoNT/A complex, wherein the 900 kDa BoNT/A complex comprises a 150 kDa BoNT/A that is in the form of a plurality of sequence variant species, wherein the plurality of sequence variant species comprises a 150 kDa BoNT/A sequence variant species with a C-terminal truncated light chain, wherein the C-terminal truncated light chain has an amino acid sequence set forth in SEQ ID NO: 4, and wherein the percentage of the abundance of the 150 kDa BoNT/A sequence variant species with the C-terminal truncated light chain in the abundance of the plurality of 150 kDa BoNT/A sequence variant species is less than 79.5%.

In certain embodiments, the 900 kDa BoNT/A complex is produced by *Clostridium botulinum* bacteria cultured and expanded from an animal product free working cell bank.

In certain embodiments, the 900 kDa BoNT/A complex is produced by a Type A strain of *Clostridium botulinum*.

In certain embodiments, the Type A strain of *Clostridium botulinum* is a Type A Hall strain of *Clostridium botulinum*.

In certain embodiments, the 900 kDa BoNT/A complex is onabotulinumtoxin A.

In certain embodiments, the composition provided herein further comprises human serum albumin. In specific embodiments, the composition provided herein comprises about 0.5 mg of human serum albumin per 100 units of the 900 kDa BoNT/A complex. In specific embodiments, the human serum albumin is recombinant human serum albumin. In specific embodiments, the human serum albumin is human plasma-derived.

In certain embodiments, the composition provided herein is animal product free.

In certain embodiments, the composition provided herein further comprises sodium chloride. In specific embodiments, the composition provided herein comprises about 0.9 mg of sodium chloride per 100 units of the 900 kDa BoNT/A complex.

In certain embodiments, the composition provided herein does not contain a protease inhibitor.

In certain embodiments, the composition provided herein does not contain benzamidine hydrochloride.

In certain embodiments, the composition provided herein comprises about 50 units, about 100 units or about 200 units of the 900 kDa BoNT/A complex.

In certain embodiments, the composition provided herein has a potency of about $1.5\times10^7$ units/mg to about $6.0\times10^7$ units/mg.

In certain embodiments, the composition provided herein is a powdered pharmaceutical composition.

In certain embodiments, the composition provided herein is vacuum-dried.

In certain embodiments, the 900 kDa BoNT/A complex is produced by a process that comprises one or more steps of column chromatography. In certain embodiments, the one or more steps of column chromatography comprise hydrophobic interaction chromatography. In certain embodiments, the one or more steps of column chromatography further comprise anion exchange chromatography. In certain embodiments, the one or more steps of column chromatography further comprise cation exchange chromatography.

In another aspect, provided herein is a method of producing a composition comprising BoNT/A, said method comprising incubating a culture of *Clostridium botulinum* bacteria in a production fermentor in the presence of $CO_2$ in the fermentor headspace overlay during the fermentation process.

In certain embodiments, the incubating step is performed in the presence of $CO_2$ and $N_2$ in the fermentor headspace overlay during the fermentation process. In specific embodiments, the incubating step is performed in the presence of 25% $CO_2$ and 75% $N_2$ in the fermentor headspace overlay during the fermentation process. In specific embodiments, the incubating step is performed in the presence of 50% $CO_2$ and 50% $N_2$ in the fermentor headspace overlay during the fermentation process. In specific embodiments, the incubating step is performed in the presence of 75% $CO_2$ and 25% $N_2$ in the fermentor headspace overlay during the fermentation process. In specific embodiments, the incubating step is performed in the presence of 100% $CO_2$ in the fermentor headspace overlay during the fermentation process.

In another aspect, the present disclosure also relates to a method of treating a patient in need thereof, comprising administering a composition described herein.

4. BRIEF DESCRIPTION OF THE DRAWINGS

FIG. 1 shows the AEX-HPLC chromatograph for samples obtained from fermentation conditions with different $CO_2$ concentrations. $CO_2$ study 1: 25% $CO_2$; $CO_2$ study 2: 50% $CO_2$; $CO_2$ study 3: 75% $CO_2$; $CO_2$ study 4: 100% $CO_2$.

Figure 2A:
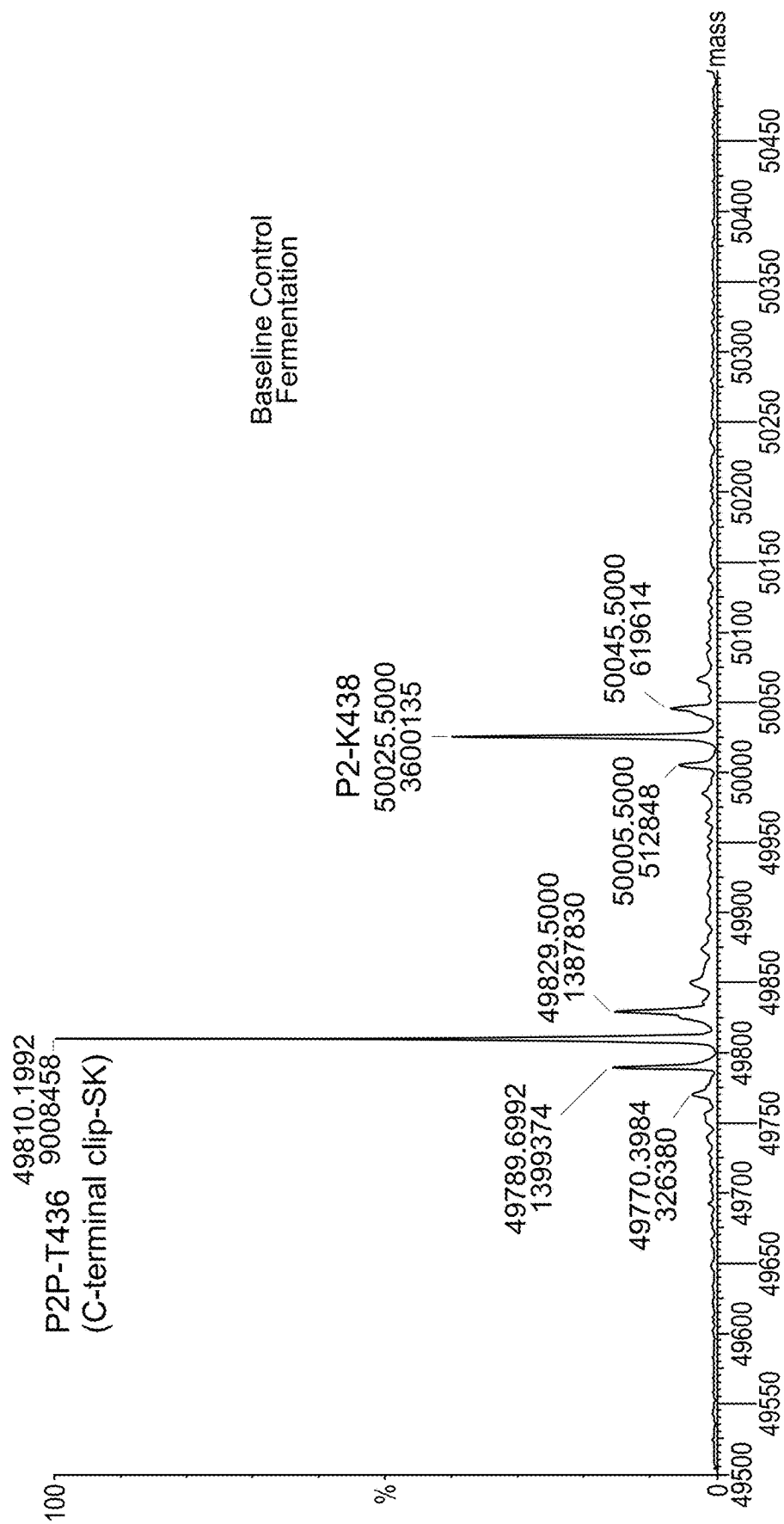
Figure 2B:
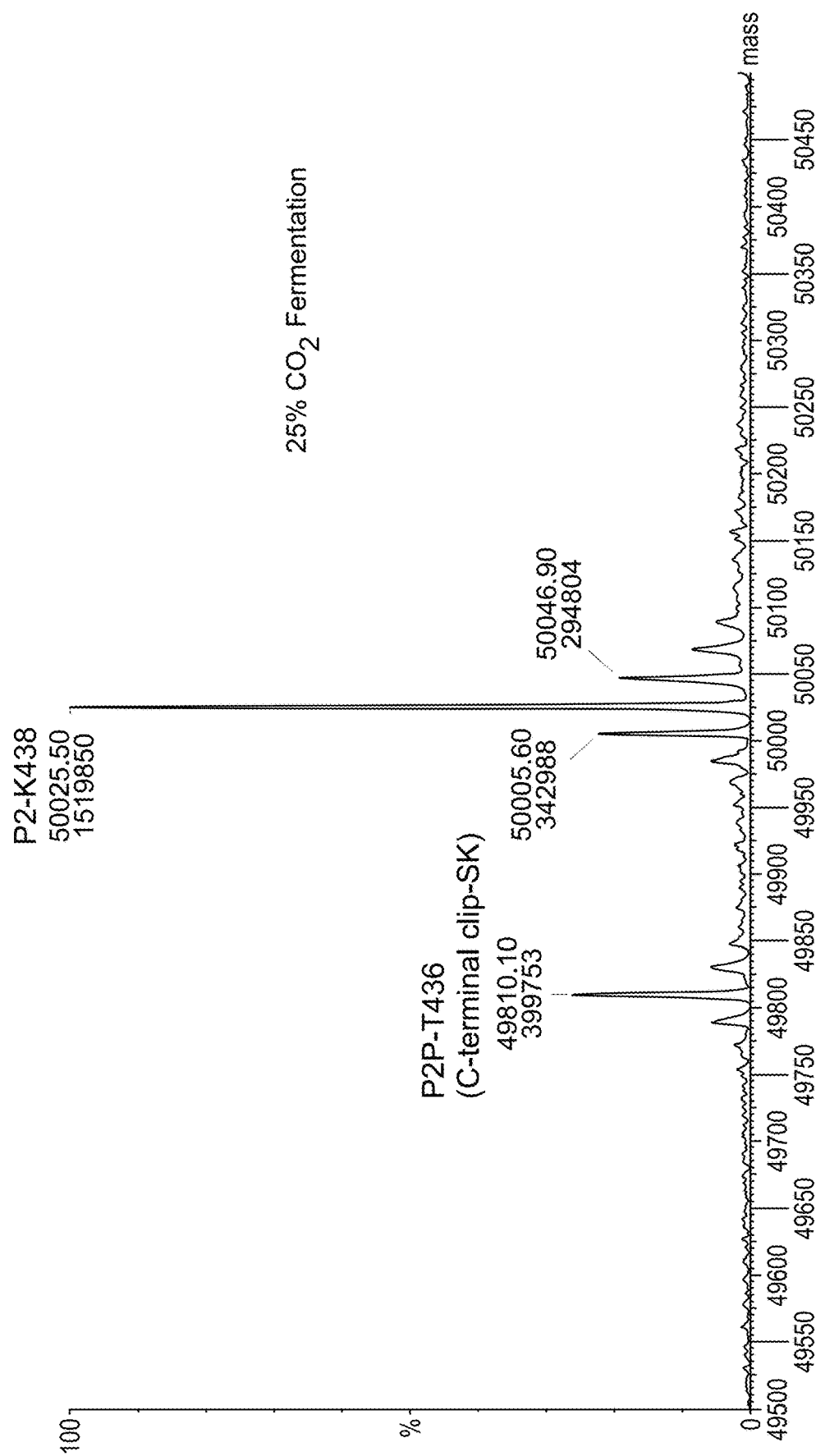
Figure 2C:
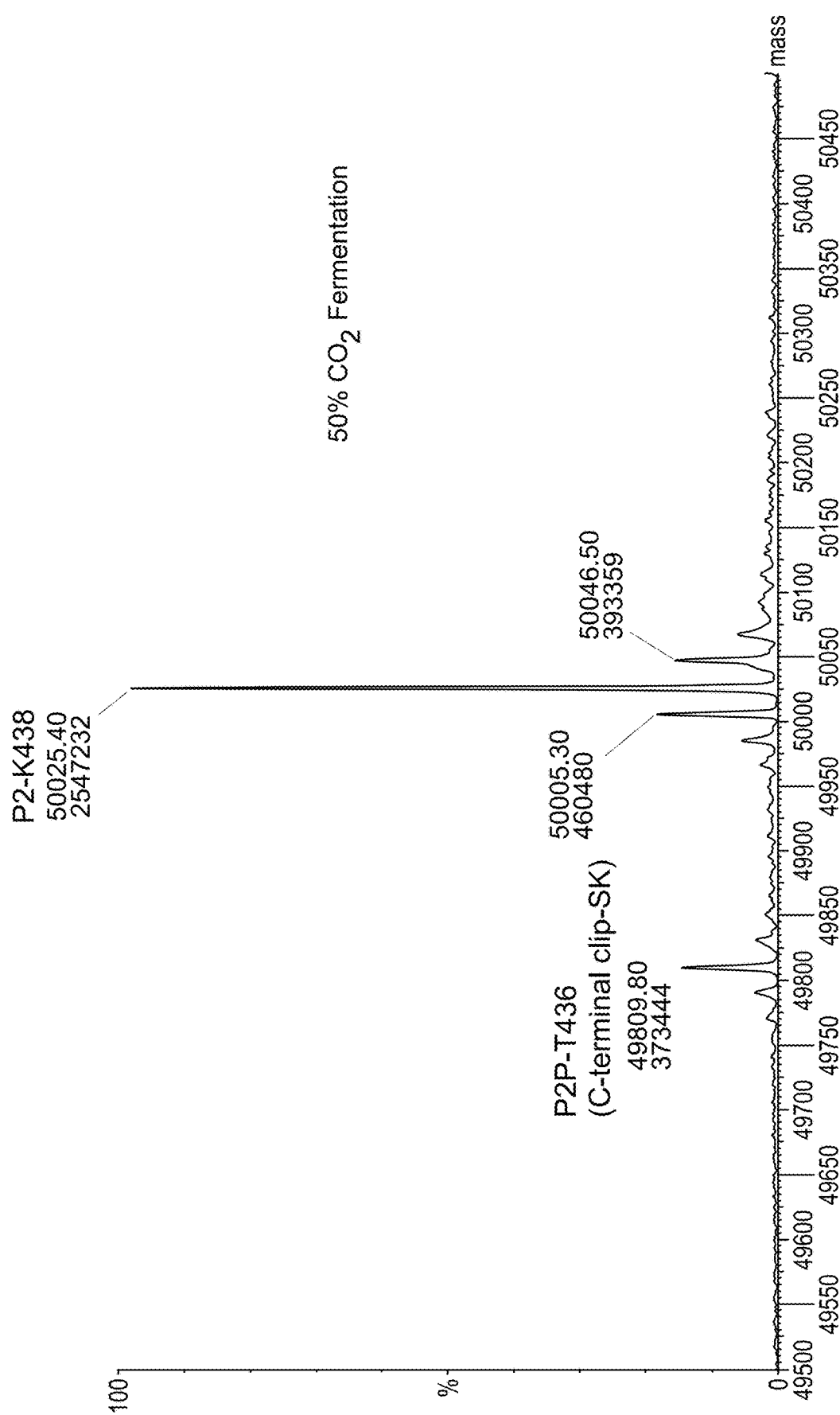
Figure 2D:
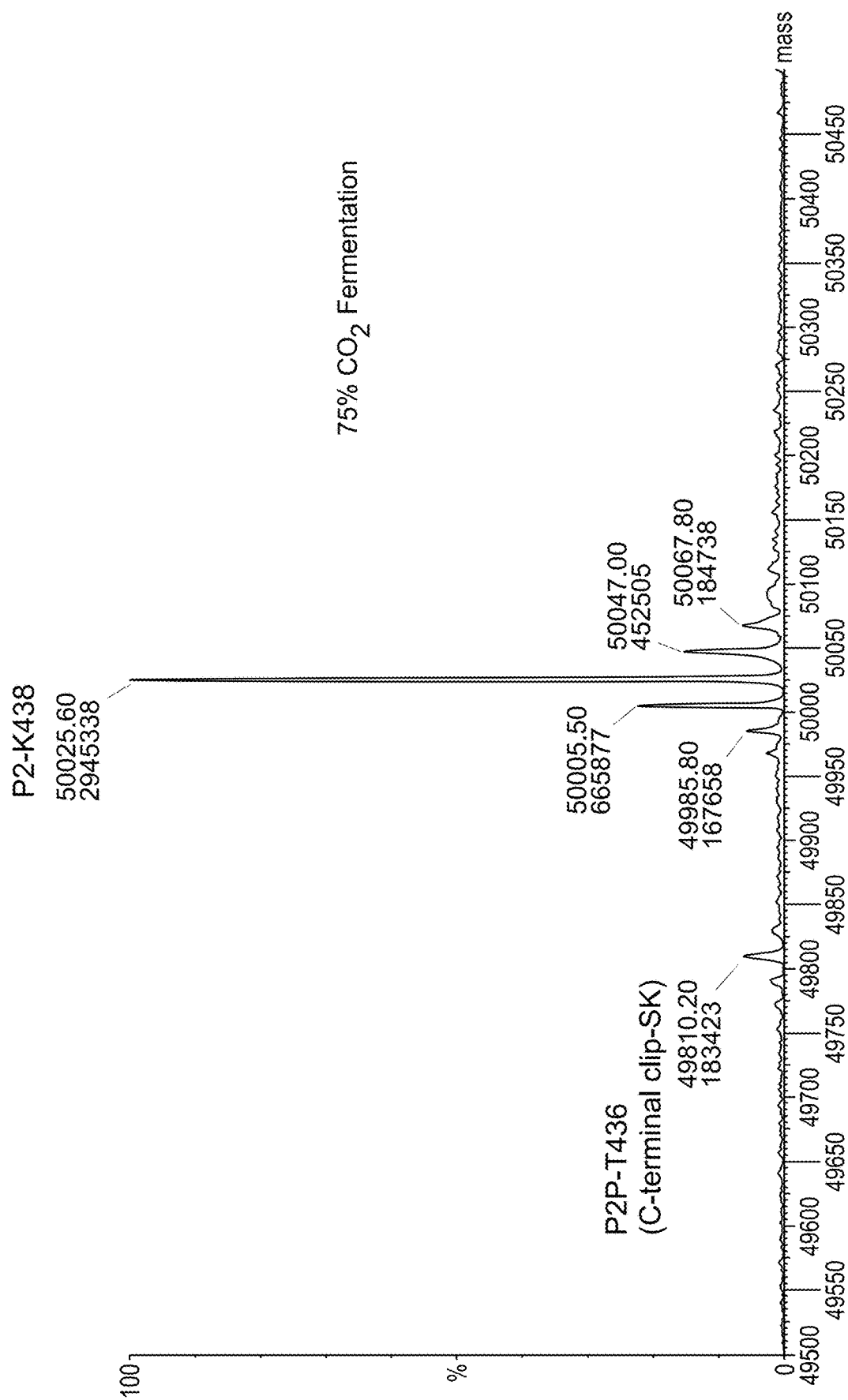
Figure 2E:
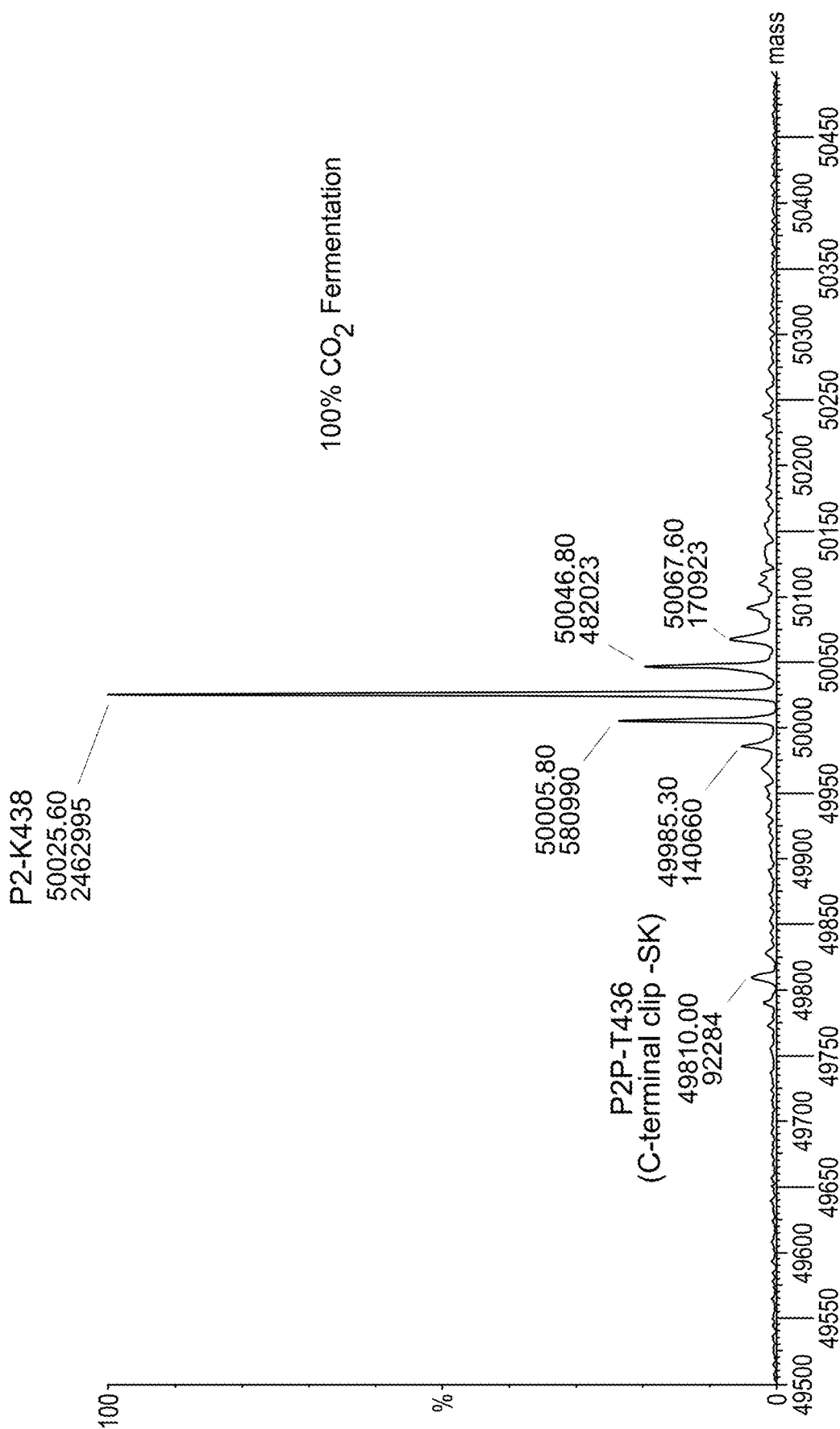

FIGS. 2A-2E show the abundance of full-length and C-terminal truncated BoNT/A light chain obtained from fermentation conditions with different $CO_2$ concentrations. FIG. 2A: baseline control fermentation. FIG. 2B: 25% $CO_2$ fermentation. FIG. 2C: 50% $CO_2$ fermentation. FIG. 2D: 75% $CO_2$ fermentation. FIG. 2E: 100% $CO_2$ fermentation.

Figure 3:
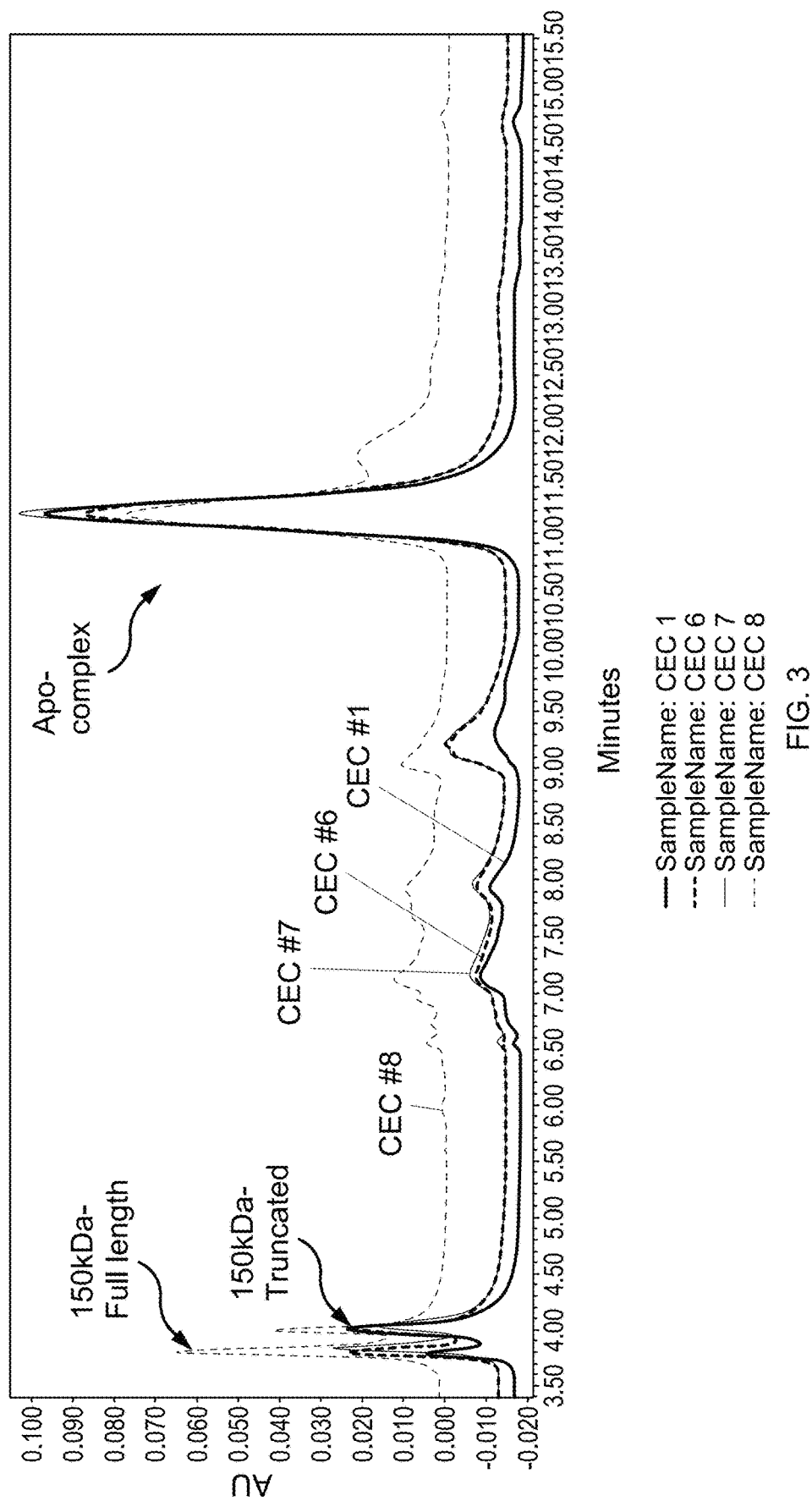

FIG. 3 shows the AEX-HPLC chromatograph for samples obtained from different temperature fermentation conditions. CEC #1: Baseline Control Fermentation; CEC #5: 20° C. Cold-shock; CEC #7: 15° C. Cold-shock; CEC #8: 25° C. Fermentation.

Figure 4:
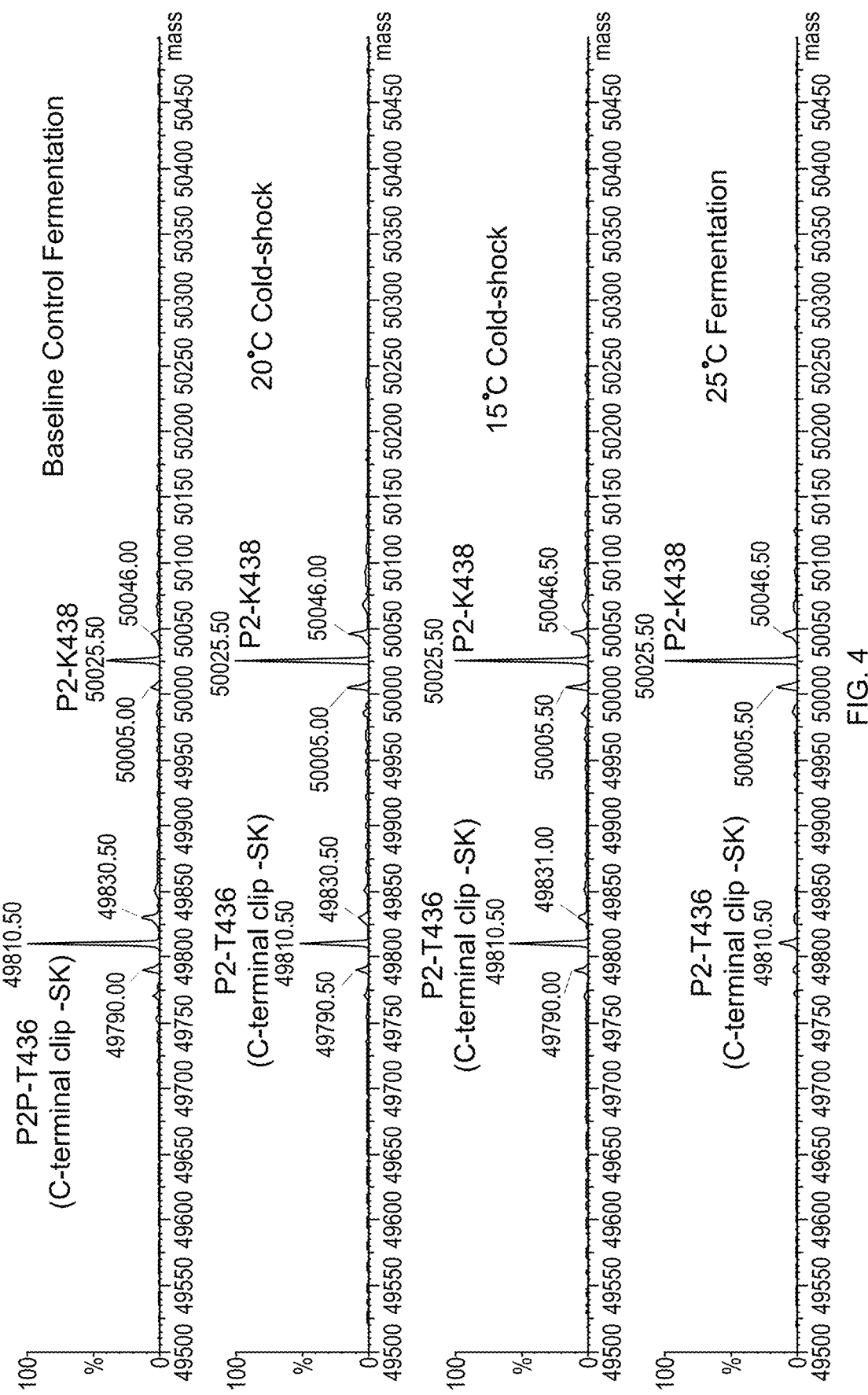

FIG. 4 shows the abundance of full-length and C-terminal truncated BoNT/A light chain obtained from different temperature fermentation conditions.

5. DETAILED DESCRIPTION

In one aspect, provided herein is a newly improved composition comprising a 900 kDa BoNT/A complex, wherein the 900 kDa BoNT/A complex comprises a 150 kDa BoNT/A that is in the form of a plurality of sequence variant species, wherein the plurality of sequence variant species comprises a truncated 150 kDa BoNT/A, and wherein the ratio of the abundance of the truncated 150 kDa BoNT/A to the abundance of the full length 150 kDa BoNT/A is less than a reference ratio (e.g., a reference ratio of 3.9) or the percentage of the abundance of the truncated 150 kDa BoNT/A among the abundance of the plurality of sequence variant species is less than a reference percentage (e.g., a reference percentage of 79.5%). The present disclosure also provides methods for producing the new compositions provided herein.

Further benefits of the present disclosure will be apparent to one skilled in the art from reading this patent application. The embodiments of the disclosure described in the following paragraphs are intended to illustrate the invention and should not be deemed to narrow the scope of the invention.

5.1. Definitions

The singular forms "a," "an" and "the" include plural referents unless the context clearly dictates otherwise.

The term "and/or" as used in a phrase such as "A and/or B" herein is intended to mean "A and B", "A or B", "A" or "B".

The terms "about" and "approximately" generally refer to a range of numbers that one of skill in the art would consider equivalent to the recited value (i.e., having the same function or result). In many instances, the terms "about" and "approximately" may include numbers that are rounded to the nearest significant figure. In specific embodiments, the terms "about" and "approximately" shall be construed so as to allow normal variation as judged by a person of ordinary skill in the art, such as, for example, a variation within 20% or 10% or 5%. In specific embodiments, the terms "about" and "approximately" encompass the exact value recited.

"Animal product free" ("APF") or "substantially animal product free" encompasses, respectively, the absence or substantial absence of blood derived, blood pooled and other animal derived products or compounds. "Animal" excludes microorganisms, such as bacteria. Thus, an APF medium or process or a substantially APF medium or process within the scope of the present invention can include a *botulinum* toxin or a *Clostridial botulinum* bacterium. For example, an APF process or a substantially APF process means a process which is either substantially free or essentially free or entirely free of animal-derived proteins, such as immunoglobulins, meat digest, meat by-products and milk or dairy products or digests.

"*Clostridium botulinum* neurotoxin serotype A" or "BoNT/A" means a neurotoxin produced by *Clostridium botulinum* Type A strains. One such *Clostridium botulinum* Type A strain is the Type A-Hall strain, for example, the Type A-Hall (Allergan) strain. Zhang et al. (2003) Gene 315:21, incorporated herein by reference in its entirety. BoNT/A encompasses both a BoNT/A complex (e.g., the 300, 500, 760, and 900 kDa complexes) as well as pure BoNT/A toxin (i.e. the about 150 kDa neurotoxic molecule).

"BoNT/A complexes" means *Clostridium botulinum* serotype A neurotoxin complexes comprising a BoNT/A molecule (the neurotoxic component) and one or more hemagglutinin (HA) proteins and/or non-toxin non-hemagglutinin (NTNH) protein. The BoNT/A complexes can be in the forms of, e.g., about 900 kDa, 760 kDa, 500 kDa or 300 kDa. In one embodiment, the BoNT/A complex is in the form of about 900 kDa comprising an about 150 kDa BoNT/A molecule, hemagglutinin HA70, hemagglutinin HA34, hemagglutinin HA17, and nontoxic-nonhemagglutinin (NTNH) proteins. In one embodiment, the BoNT/A complex is a substantially complete form of the 900 kDa BoTN/A complex. In one embodiment, the BoNT/A complex is onabotulinumtoxinA.

"150 kDa *Clostridium botulinum* serotype A neurotoxin" or "150 kDa BoNT/A" means a neurotoxin of approximately 150 kDa made from a culture of *Clostridium botulinum* type A strain (e.g., the Hall strain of *Clostridium botulinum*). The exemplary sequences of 150 kDa *botulinum* toxin type A (BoNT/A) used in the context of the present disclosure are shown in Table 1. For example, in one embodiment, the 150 kDa BoNT/A used in the context of the present disclosure comprises (e.g., consists of) a light chain having an amino acid sequence set forth in SEQ ID NO. 2 and a heavy chain having an amino acid sequence set forth in SEQ ID NO. 3, with disulfide bridges located between positions 429 and 453 and between positions 1234 and 1279. For another example, in one embodiment, the 150 kDa BoNT/A used in the context of the present disclosure comprises (e.g., consists of) a light chain having an amino acid sequence set forth in SEQ ID NO. 4 and a heavy chain having an amino acid sequence set forth in SEQ ID NO. 3, with disulfide bridges located between positions 429 and 453 and between positions 1234 and 1279.

The term "full-length 150 kDa BoNT/A" refers to the 150 kDa BoNT/A that comprises a light chain with the amino acid sequence set forth in SEQ ID NO: 2 and a heavy chain with the amino acid sequence set forth in SEQ ID NO: 3.

The term "truncated 150 kDa BoNT/A" refers to the 150 kDa BoNT/A that comprises a C-terminal truncated light chain with the amnio acid sequence set forth in SEQ ID NO: 4 and a heavy chain with the amino acid sequence set forth in SEQ ID NO: 3.

"BoNT/A composition" refers to any composition comprising BoNT/A and encompasses both solid compositions and liquid compositions. In certain embodiments, a BoNT/A composition (e.g., a solid composition or liquid composition) described herein is a pharmaceutical composition. In specific embodiments, a BoNT/A composition (e.g., a solid composition or liquid composition) described herein is a drug product (i.e., a finished dosage form). In specific embodiments, a BoNT/A composition (e.g., a solid composition or liquid composition) described herein is a drug substance. In a specific embodiment, a BoNT/A composition described herein is in the form of a solution. In a specific embodiment, a BoNT/A composition described herein is in the form of powder (e.g., vacuum-dried powder or freeze-dried powder).

The term "carrier" used in connection with a pharmaceutical excipient refers to any and all solvents, dispersion media, preservatives, coatings, isotonic and absorption delaying agents, and the like, that are compatible with pharmaceutical administration.

"Pharmaceutical composition" means a formulation in which an active ingredient can be a BoNT/A. The word "formulation" means that there is at least one additional ingredient (such as, for example and not limited to, an albumin (such as a human serum albumin (HSA) or a recombinant human albumin) and/or sodium chloride) in the pharmaceutical composition in addition to a BoNT/A active ingredient. The human serum albumin excipient can be derived from human plasma or recombinantly made. A pharmaceutical composition is therefore a formulation which is suitable for diagnostic, therapeutic and/or cosmetic administration (e.g., by intramuscular or subcutaneous injection or by insertion of a depot or implant) to a subject, such as a human patient. A pharmaceutical composition can be in a vacuum dried or freeze-dried condition, a solution reconstituted from the vacuum dried or freeze-dried pharmaceutical composition with, for example, saline or water, or as a solution that does not require reconstitution. In one embodiment, the active ingredient is the *botulinum* toxin serotype A made natively by *Clostridial* bacteria. In one embodiment, the active ingredient is onabotulinumtoxinA. As stated, a pharmaceutical composition can be liquid or solid, for example vacuum-dried or freeze-dried. Exemplary methods for formulating a BoNT/A active ingredient pharmaceutical composition are disclosed in U.S. Patent Application Publication No. 2003/0118598, filed Nov. 5, 2002, herein incorporated by reference in its entirety. In a preferred embodiment, a pharmaceutical composition described herein is in a dried form (e.g., a vacuum-dried or freeze-dried form). The pharmaceutical compositions can be vacuum-dried and suitable for administration by injection either subcutaneously or intramuscularly upon reconstitution with normal saline, comprising 900 kDa BoNT/A, human serum albumin (HSA), and sodium chloride. Preferably such pharmaceutical compositions comprise 0.5 mg of HSA and 0.9 mg of sodium chloride per 100 Units of BoNT/A. Most preferably such pharmaceutical compositions comprise 50, 100 or 200 Units of BoNT/A.

The term "patient", "subject", "individual" and the like refers to humans.

"Unit" or "U" refers to the $LD_{50}$ dose or the dose determined by a cell-based potency assay (CBPA). The $LD_{50}$ dose is defined as the amount of BoNT/A that killed 50% of the mice injected with the BoNT/A. The CBPA dose is determined as described in U.S. Pat. Nos. 8,618,261; 8,198,034; 9,249,216; 10,703,806; 11,261,240 and 11,332,518; the assay details of which are incorporated by reference herein.

Unless the context requires otherwise, the terms "comprise," "comprises," and "comprising" are used on the basis and clear understanding that they are to be interpreted inclusively, rather than exclusively, such that they indicate the inclusion of the recited feature but without excluding one or more other such features. However, it is understood that wherever aspects and embodiments are described herein with the language "comprise" (or "comprises" or "comprising"), otherwise analogous aspects described in terms of "consist of" (or "consists of" or "consisting of") and/or "consist essentially of" (or "consists essentially of" or "consisting essentially of") are also provided.

5.2. *Clostridium botulinum* Neurotoxin Serotype a (BoNT/A) and BoNT/a Compositions A 150 kDa BoNT/A molecule is a zinc endopeptidase which can specifically hydrolyze a peptide linkage of the intracellular, vesicle-associated protein (VAMP, also called synaptobrevin) 25 kiloDalton (kDa) synaptosomal associated protein (SNAP-25). A 150 kDa BoNT/A molecule is translated as a single chain polypeptide of approximately 150 kDa that is subsequently cleaved by proteolytic scission within a disulfide loop by a naturally-occurring protease. This posttranslational processing yields a di-chain molecule comprising an approximately 50 kDa light chain (LC) and an approximately 100 kDa heavy chain (HC) held together by a single disulfide bond and noncovalent interactions.

*Clostridial bacterium* can produce *botulinum* toxin type A complexes in various forms, which include, and are not limited to, 900 kDa, 760 kDa, 500 kDa, and 300 kDa complexes (approximate molecular weights). The complexes (i.e., molecular weight greater than about 150 kDa) comprise a 150 kDa *botulinum* toxin molecule (the neurotoxic component) and one or more hemagglutinin (HA) proteins and/or non-toxin non-hemagglutinin (NTNH) protein.

In one embodiment, the 150 kDa BoNT/A molecule that can be used in the context of the present disclosure has a sequence shown in Table 1. In one embodiment, the 150 kDa BoNT/A molecule comprises a light chain (LC: residues 2-438, about 50 kDa) and a heavy chain (HC: residues 449-1296, about 100 kDa). In another embodiment, the 150 kDa BoNT/A molecule comprises a light chain (LC: residues 2-436, about 50 kDa) and a heavy chain (HC: residues 449-1296, about 100 kDa). Residues 439-448 are the nicking site and are italicized.

TABLE 1

```
Preferred sequences of BoNT/A molecules
SEQ ID NO. 1: amino acid sequence of the 150 kDa BoNT/A molecule
MPFVNKQFNY KDPVNGVDIA YIKIPNAGQM QPVKAFKIHN KIWVIPERDT        50
FTNPEEGDLN PPPEAKQVPV SYYDSTYLST DNEKDNYLKG VTKLFERIYS       100
TDLGRMLLTS IVRGIPFWGG STIDTELKVI DTNCINVIQP DGSYRSEELN       150
LVIIGPSADI IQFECKSFGH EVLNLTRNGY GSTQYIRFSP DFTFGFEESL       200
EVDTNPLLGA GKFATDPAVT LAHELIHAGH RLYGIAINPN RVFKVNTNAY       250
YEMSGLEVSF EELRTFGGHD AKFIDSLQEN EFRLYYYNKF KDIASTLNKA       300
KSIVGTTASL QYMKNVFKEK YLLSEDTSGK FSVDKLKFDK LYKMLTEIYT       350
EDNFVKFFKV LNRKTYLNFD KAVFKINIVP KVNYTIYDGF NLRNTNLAAN       400
FNGQNTEINN MNFTKLKNFT GLFEFYKLLC VRGIITSKTK *SLDKGYNK*
                                                 *AL*        450
NDLCIKVNNW DLFFSPSEDN FINDLNKGEE ITSDTNIEAA EENISLDLIQ       500
QYYLTFNFDN EPENISIENL SSDIIGQLEL MPNIERFPNG KKYELDKYTM       550
FHYLRAQEFE HGKSRIALTN SVNEALLNPS RVYTFFSSDY VKKVNKATEA       600
AMFLGWVEQL VYDFTDETSE VSTTDKIADI TIIIPYIGPA LNIGNMLYKD       650
DFVGALIFSG AVILLEFIPE IAIPVLGTFA LVSYIANKVL TVQTIDNALS       700
KRNEKWDEVY KYIVTNWLAK VNTQIDLIRK KMKEALENQA EATKAIINYQ       750
YNQYTEEEKN NINFNIDDLS SKLNESINKA MININKFLNQ CSVSYLMNSM       800
IPYGVKRLED FDASLKDALL KYIYDNRGTL IGQVDRLKDK VNNTLSTDIP       850
FQLSKYVDNQ RLLSTFTEYI KNIINTSILN LRYESNHLID LSRYASKINI       900
GSKVNFDPID KNQIQLFNLE SSKIEVILKN AIVYNSMYEN FSTSFWIRIP       950
KYFNSISLNN EYTIINCMEN NSGWKVSLNY GEIIWTLQDT QEIKQRVVFK      1000
YSQMINISDY INRWIFVTIT NNRLNNSKIY INGRLIDQKP ISNLGNIHAS      1050
NNIMFKLDGC RDTHRYIWIK YFNLFDKELN EKEIKDLYDN QSNSGILKDF      1100
WGDYLQYDKP YYMLNLYDPN KYVDVNNVGI RGYMYLKGPR GSVMTTNIYL      1150
NSSLYRGTKF IIKKYASGNK DNIVRNNDRV YINVVVKNKE YRLATNASQA      1200
GVEKILSALE IPDVGNLSQV VVMKSKNDQG ITNKCKMNLQ DNNGNDIGFI      1250
GFHQFNNIAK LVASNWYNRQ IERSSRTLGC SWEFIPVDDG WGERPL         1296

SEQ ID NO. 2: amino acid sequence of the light chain (LC) of full-
length 150 kDa BoNT/A
PFVNKQFNY KDPVNGVDIA YIKIPNAGQM QPVKAFKIHN KIWVIPERDT         50
FTNPEEGDLN PPPEAKQVPV SYYDSTYLST DNEKDNYLKG VTKLFERIYS       100
TDLGRMLLTS IVRGIPFWGG STIDTELKVI DTNCINVIQP DGSYRSEELN       150
LVIIGPSADI IQFECKSFGH EVLNLTRNGY GSTQYIRFSP DFTFGFEESL       200
EVDTNPLLGA GKFATDPAVT LAHELIHAGH RLYGIAINPN RVFKVNTNAY       250
YEMSGLEVSF EELRTFGGHD AKFIDSLQEN EFRLYYYNKF KDIASTLNKA       300
KSIVGTTASL QYMKNVFKEK YLLSEDTSGK FSVDKLKFDK LYKMLTEIYT       350
EDNFVKFFKV LNRKTYLNFD KAVFKINIVP KVNYTIYDGF NLRNTNLAAN       400
FNGQNTEINN MNFTKLKNFT GLFEFYKLLC VRGIITSK SEQ ID NO. 3: amino acid sequence of the heavy chain (HC) of 150
kDa BoNT/A
                                                 AL          450
NDLCIKVNNW DLFFSPSEDN FINDLNKGEE ITSDTNIEAA EENISLDLIQ       500
QYYLTFNFDN EPENISIENL SSDIIGQLEL MPNIERFPNG KKYELDKYTM       550
FHYLRAQEFE HGKSRIALTN SVNEALLNPS RVYTFFSSDY VKKVNKATEA       600
AMFLGWVEQL VYDFTDETSE VSTTDKIADI TIIIPYIGPA LNIGNMLYKD       650
DFVGALIFSG AVILLEFIPE IAIPVLGTFA LVSYIANKVL TVQTIDNALS       700
KRNEKWDEVY KYIVTNWLAK VNTQIDLIRK KMKEALENQA EATKAIINYQ       750
YNQYTEEEKN NINFNIDDLS SKLNESINKA MININKFLNQ CSVSYLMNSM       800
IPYGVKRLED FDASLKDALL KYIYDNRGTL IGQVDRLKDK VNNTLSTDIP       850
FQLSKYVDNQ RLLSTFTEYI KNIINTSILN LRYESNHLID LSRYASKINI       900
GSKVNFDPID KNQIQLFNLE SSKIEVILKN AIVYNSMYEN FSTSFWIRIP       950
KYFNSISLNN EYTIINCMEN NSGWKVSLNY GEIIWTLQDT QEIKQRVVFK      1000
YSQMINISDY INRWIFVTIT NNRLNNSKIY INGRLIDQKP ISNLGNIHAS      1050
NNIMFKLDGC RDTHRYIWIK YFNLFDKELN EKEIKDLYDN QSNSGILKDF      1100
WGDYLQYDKP YYMLNLYDPN KYVDVNNVGI RGYMYLKGPR GSVMTTNIYL      1150
NSSLYRGTKF IIKKYASGNK DNIVRNNDRV YINVVVKNKE YRLATNASQA      1200
GVEKILSALE IPDVGNLSQV VVMKSKNDQG ITNKCKMNLQ DNNGNDIGFI      1250
GFHQFNNIAK LVASNWYNRQ IERSSRTLGC SWEFIPVDDG WGERPL         1296
```

TABLE 1-continued

```
SEQ ID NO. 4: amino acid sequence of the light chain (LC) of the
truncated 150 kDa BoNT/A with C-terminal (-SK) truncation
 PFVNKQFNY KDPVNGVDIA YIKIPNAGQM QPVKAFKIHN KIWVIPERDT        50
FTNPEEGDLN PPPEAKQVPV SYYDSTYLST DNEKDNYLKG VTKLFERIYS       100
TDLGRMLLTS IVRGIPFWGG STIDTELKVI DTNCINVIQP DGSYRSEELN       150
LVIIGPSADI IQFECKSFGH EVLNLTRNGY GSTQYIRFSP DFTFGFEESL       200
EVDTNPLLGA GKFATDPAVT LAHELIHAGH RLYGIAINPN RVFKVNTNAY       250
YEMSGLEVSF EELRTFGGHD AKFIDSLQEN EFRLYYYNKF KDIASTLNKA       300
KSIVGTTASL QYMKNVFKEK YLLSEDTSGK FSVDKLKFDK LYKMLTEIYT       350
EDNFVKFFKV LNRKTYLNFD KAVFKINIVP KVNYTIYDGF NLRNTNLAAN       400
FNGQNTEINN MNFTKLKNFT GLFEFYKLLC VRGIIT
```

In one embodiment, the BoNT/A described herein is present as a 900 kDa BoNT/A complex. In one embodiment, the BoNT/A described herein is present as a 900 kDa BoNT/A complex formed by the 150 kDa BoNT/A molecule and hemagglutinin HA70, hemagglutinin HA34, hemagglutinin HA17, and nontoxic-nonhemagglutinin (NTNH) proteins. In a specific embodiment, the BoNT/A described herein (e.g., the 900 kDa BoNT/A complex) is produced in a *Clostridium botulinum* type A strain. In a specific embodiment, the BoNT/A described herein (e.g., the 900 kDa BoNT/A complex) is produced in a *Clostridium botulinum* type A Hall strain. In a preferred embodiment, the BoNT/A described herein is onabotulinumtoxinA.

In one embodiment, the full-length 150 kDa BoNT/A molecule described herein comprises a light chain having an amino acid sequence set forth in SEQ ID NO. 2 and a heavy chain having an amino acid sequence set forth in SEQ ID NO. 3, with disulfide bridges located between positions 429 and 453 and between positions 1234 and 1279.

In another embodiment, the truncated 150 kDa BoNT/A molecule described herein comprises a light chain having an amino acid sequence set forth in SEQ ID NO. 4 and a heavy chain having an amino acid sequence set forth in SEQ ID NO. 3, with disulfide bridges located between positions 429 and 453 and between positions 1234 and 1279.

5.3. BoNT/A Compositions

In one aspect, provided herein is a composition comprising a 900 kDa BoNT/A complex, wherein the 900 kDa BoNT/A complex comprises a 150 kDa BoNT/A that is in the form of a plurality of sequence variant species, wherein the plurality of sequence variant species comprises a 150 kDa BoNT/A sequence variant species with a C-terminal truncated light chain (truncated 150 kDa BoNT/A) and a 150 kDa BoNT/A sequence variant species with a full-length light chain (full-length 150 kDa BoNT/A), wherein the C-terminal truncated light chain has an amino acid sequence set forth in SEQ ID NO: 4, and the full-length light chain has an amino acid sequence set forth in SEQ ID NO: 2, and wherein the ratio of the abundance of the truncated 150 kDa BoNT/A to the abundance of the full-length 150 kDa BoNT/A is less than a reference ratio. In some embodiments, the ratio of the abundance of the truncated 150 kDa BoNT/A to the abundance of the full-length 150 kDa BoNT/A is less than 3.9. In some embodiments, the ratio of the abundance of the truncated 150 kDa BoNT/A to the abundance of the full-length 150 kDa BoNT/A is less than 3.8. In some embodiments, the ratio of the abundance of the truncated 150 kDa BoNT/A to the abundance of the full-length 150 kDa BoNT/A is less than 3.7. In some embodiments, the ratio of the abundance of the truncated 150 kDa BoNT/A to the abundance of the full-length 150 kDa BoNT/A is less than 3.6. In some embodiments, the ratio of the abundance of the truncated 150 kDa BoNT/A to the abundance of the full-length 150 kDa BoNT/A is less than 3.5. In some embodiments, the ratio of the abundance of the truncated 150 kDa BoNT/A to the abundance of the full-length 150 kDa BoNT/A is less than 3.4. In some embodiments, the ratio of the abundance of the truncated 150 kDa BoNT/A to the abundance of the full-length 150 kDa BoNT/A is less than 3.3. In some embodiments, the ratio of the abundance of the truncated 150 kDa BoNT/A to the abundance of the full-length 150 kDa BoNT/A is less than 3.2. In some embodiments, the ratio of the abundance of the truncated 150 kDa BoNT/A to the abundance of the full-length 150 kDa BoNT/A is less than 3.1. In some embodiments, the ratio of the abundance of the truncated 150 kDa BoNT/A to the abundance of the full-length 150 kDa BoNT/A is less than 3.0. In some embodiments, the ratio of the abundance of the truncated 150 kDa BoNT/A to the abundance of the full-length 150 kDa BoNT/A is less than 2.9. In some embodiments, the ratio of the abundance of the truncated 150 kDa BoNT/A to the abundance of the full-length 150 kDa BoNT/A is less than 2.8. In some embodiments, the ratio of the abundance of the truncated 150 kDa BoNT/A to the abundance of the full-length 150 kDa BoNT/A is less than 2.7. In some embodiments, the ratio of the abundance of the truncated 150 kDa BoNT/A to the abundance of the full-length 150 kDa BoNT/A is less than 2.6. In some embodiments, the ratio of the abundance of the truncated 150 kDa BoNT/A to the abundance of the full-length 150 kDa BoNT/A is less than 2.5. In some embodiments, the ratio of the abundance of the truncated 150 kDa BoNT/A to the abundance of the full-length 150 kDa BoNT/A is less than 2.4. In some embodiments, the ratio of the abundance of the truncated 150 kDa BoNT/A to the abundance of the full-length 150 kDa BoNT/A is less than 2.3. In some embodiments, the ratio of the abundance of the truncated 150 kDa BoNT/A to the abundance of the full-length 150 kDa BoNT/A is less than 2.2. In some embodiments, the ratio of the abundance of the truncated 150 kDa BoNT/A to the abundance of the full-length 150 kDa BoNT/A is less than 2.1. In some embodiments, the ratio of the abundance of the truncated 150 kDa BoNT/A to the abundance of the full-length 150 kDa BoNT/A is less than 2.0. In some embodiments, the ratio of the abundance of the truncated 150 kDa BoNT/A to the abundance of the full-length 150 kDa BoNT/A is less than 1.9. In some embodiments, the ratio of the abundance of the truncated 150 kDa BoNT/A to the abundance of the full-length 150 kDa BoNT/A is less than 1.8. In some embodiments, the ratio of the abundance of the truncated 150 kDa BoNT/A to the abundance of the full-length 150 kDa BoNT/A is less than 1.7. In some embodiments, the ratio of the abundance of the truncated 150 kDa BoNT/A to the abundance of the full-length 150 kDa BoNT/A is less than 1.6. In some embodiments, the ratio of the abundance of the truncated 150 kDa BoNT/A to the abundance of the full-length 150 kDa BoNT/A is less than 1.5. In some embodiments, the ratio of the abundance of the truncated 150 kDa BoNT/A to the abundance of the full-length 150 kDa BoNT/A is less than 1.4. In some embodiments, the ratio of the abundance of the truncated 150 kDa BoNT/A to the abundance of the full-length 150 kDa BoNT/A is less than 1.3. In some embodiments, the ratio of the abundance of the truncated 150 kDa BoNT/A to the abundance of the full-length 150 kDa BoNT/A is less than 1.2. In some embodiments, the ratio of the abundance of the truncated 150 kDa BoNT/A to the abundance of the full-length 150 kDa BoNT/A is less than 1.1. In some embodiments, the ratio of the abundance of the truncated 150 kDa BoNT/A to the abundance of the full-length 150 kDa BoNT/A is less than 1.0. In some embodiments, the ratio of the abundance of the truncated 150 kDa BoNT/A to the abundance of the full-length 150 kDa BoNT/A is less than 0.9. In some embodiments, the ratio of the abundance of the truncated 150 kDa BoNT/A to the abundance of the full-length 150 kDa BoNT/A is less than 0.8. In some embodiments, the ratio of the abundance of the truncated 150 kDa BoNT/A to the abundance of the full-length 150 kDa BoNT/A is less than 0.7. In some embodiments, the ratio of the abundance of the truncated 150 kDa BoNT/A to the abundance of the full-length 150 kDa BoNT/A is less than 0.6. In some embodiments, the ratio of the abundance of the truncated 150 kDa BoNT/A to the abundance of the full-length 150 kDa BoNT/A is less than 0.5. In some embodiments, the ratio of the abundance of the truncated 150 kDa BoNT/A to the abundance of the full-length 150 kDa BoNT/A is less than 0.4. In some embodiments, the ratio of the abundance of the truncated 150 kDa BoNT/A to the abundance of the full-length 150 kDa BoNT/A is less than 0.3. In some embodiments, the ratio of the abundance of the truncated 150 kDa BoNT/A to the abundance of the full-length 150 kDa BoNT/A is less than 0.2. In some embodiments, the ratio of the abundance of the truncated 150 kDa BoNT/A to the abundance of the full-length 150 kDa BoNT/A is less than 0.1. In some specific embodiments, the 150 kDa BoNT/A in the composition provided herein consists of two forms—one is truncated 150 kDa BoNT/A and the other one is full-length 150 kDa BONT/A.

In another aspect, provided herein is a composition comprising a 900 kDa BoNT/A complex, wherein the 900 kDa BoNT/A complex comprises a 150 kDa BoNT/A that is in the form of a plurality of sequence variant species, wherein the plurality of sequence variant species comprises a 150 kDa BoNT/A sequence variant species with a C-terminal truncated light chain (truncated 150 kDa BoNT/A), wherein the C-terminal truncated light chain has an amino acid sequence set forth in SEQ ID NO: 4, and wherein the percentage of the abundance of the truncated 150 kDa BoNT/A in the abundance of the plurality of 150 kDa BoNT/A sequence variant species is less than a reference percentage. In some embodiments, the percentage of the abundance of the truncated 150 kDa BoNT/A in the abundance of the plurality of 150 kDa BoNT/A sequence variant species is less than 79.5%. In some embodiments, the percentage of the abundance of the truncated 150 kDa BoNT/A in the abundance of the plurality of 150 kDa BoNT/A sequence variant species is less than 79%. In some embodiments, the percentage of the abundance of the truncated 150 kDa BoNT/A in the abundance of the plurality of 150 kDa BoNT/A sequence variant species is less than 78%. In some embodiments, the percentage of the abundance of the truncated 150 kDa BoNT/A in the abundance of the plurality of 150 kDa BoNT/A sequence variant species is less than 77%. In some embodiments, the percentage of the abundance of the truncated 150 kDa BoNT/A in the abundance of the plurality of 150 kDa BoNT/A sequence variant species is less than 76%. In some embodiments, the percentage of the abundance of the truncated 150 kDa BoNT/A in the abundance of the plurality of 150 kDa BoNT/A sequence variant species is less than 75%. In some embodiments, the percentage of the abundance of the truncated 150 kDa BoNT/A in the abundance of the plurality of 150 kDa BoNT/A sequence variant species is less than 74%. In some embodiments, the percentage of the abundance of the truncated 150 kDa BoNT/A in the abundance of the plurality of 150 kDa BoNT/A sequence variant species is less than 73%. In some embodiments, the percentage of the abundance of the truncated 150 kDa BoNT/A in the abundance of the plurality of 150 kDa BoNT/A sequence variant species is less than 72%. In some embodiments, the percentage of the abundance of the truncated 150 kDa BoNT/A in the abundance of the plurality of 150 kDa BoNT/A sequence variant species is less than 71%. In some embodiments, the percentage of the abundance of the truncated 150 kDa BoNT/A in the abundance of the plurality of 150 kDa BoNT/A sequence variant species is less than 70%. In some embodiments, the percentage of the abundance of the truncated 150 kDa BoNT/A in the abundance of the plurality of 150 kDa BoNT/A sequence variant species is less than 69%. In some embodiments, the percentage of the abundance of the truncated 150 kDa BoNT/A in the abundance of the plurality of 150 kDa BoNT/A sequence variant species is less than 68%. In some embodiments, the percentage of the abundance of the truncated 150 kDa BoNT/A in the abundance of the plurality of 150 kDa BoNT/A sequence variant species is less than 67%. In some embodiments, the percentage of the abundance of the truncated 150 kDa BoNT/A in the abundance of the plurality of 150 kDa BoNT/A sequence variant species is less than 66%. In some embodiments, the percentage of the abundance of the truncated 150 kDa BoNT/A in the abundance of the plurality of 150 kDa BoNT/A sequence variant species is less than 65%. In some embodiments, the percentage of the abundance of the truncated 150 kDa BoNT/A in the abundance of the plurality of 150 kDa BoNT/A sequence variant species is less than 64%. In some embodiments, the percentage of the abundance of the truncated 150 kDa BoNT/A in the abundance of the plurality of 150 kDa BoNT/A sequence variant species is less than 63%. In some embodiments, the percentage of the abundance of the truncated 150 kDa BoNT/A in the abundance of the plurality of 150 kDa BoNT/A sequence variant species is less than 62%. In some embodiments, the percentage of the abundance of the truncated 150 kDa BoNT/A in the abundance of the plurality of 150 kDa BoNT/A sequence variant species is less than 61%. In some embodiments, the percentage of the abundance of the truncated 150 kDa BoNT/A in the abundance of the plurality of 150 kDa BoNT/A sequence variant species is less than 60%. In some embodiments, the percentage of the abundance of the truncated 150 kDa BoNT/A in the abundance of the plurality of 150 kDa BoNT/A sequence variant species is less than 59%. In some embodiments, the percentage of the abundance of the truncated 150 kDa BoNT/A in the abundance of the plurality of 150 kDa BoNT/A sequence variant species is less than 58%. In some embodiments, the percentage of the abundance of the truncated 150 kDa BoNT/A in the abundance of the plurality of 150 kDa BoNT/A sequence variant species is less than 57%. In some embodiments, the percentage of the abundance of the truncated 150 kDa BoNT/A in the abundance of the plurality of 150 kDa BoNT/A sequence variant species is less than 56%. In some embodiments, the percentage of the abundance of the truncated 150 kDa BoNT/A in the abundance of the plurality of 150 kDa BoNT/A sequence variant species is less than 55%. In some embodiments, the percentage of the abundance of the truncated 150 kDa BoNT/A in the abundance of the plurality of 150 kDa BoNT/A sequence variant species is less than 54%. In some embodiments, the percentage of the abundance of the truncated 150 kDa BoNT/A in the abundance of the plurality of 150 kDa BoNT/A sequence variant species is less than 53%. In some embodiments, the percentage of the abundance of the truncated 150 kDa BoNT/A in the abundance of the plurality of 150 kDa BoNT/A sequence variant species is less than 52%. In some embodiments, the percentage of the abundance of the truncated 150 kDa BoNT/A in the abundance of the plurality of 150 kDa BoNT/A sequence variant species is less than 51%. In some embodiments, the percentage of the abundance of the truncated 150 kDa BoNT/A in the abundance of the plurality of 150 kDa BoNT/A sequence variant species is less than 50%. In some embodiments, the percentage of the abundance of the truncated 150 kDa BoNT/A in the abundance of the plurality of 150 kDa BoNT/A sequence variant species is less than 49%. In some embodiments, the percentage of the abundance of the truncated 150 kDa BoNT/A in the abundance of the plurality of 150 kDa BoNT/A sequence variant species is less than 48%. In some embodiments, the percentage of the abundance of the truncated 150 kDa BoNT/A in the abundance of the plurality of 150 kDa BoNT/A sequence variant species is less than 47%. In some embodiments, the percentage of the abundance of the truncated 150 kDa BoNT/A in the abundance of the plurality of 150 kDa BoNT/A sequence variant species is less than 46%. In some embodiments, the percentage of the abundance of the truncated 150 kDa BoNT/A in the abundance of the plurality of 150 kDa BoNT/A sequence variant species is less than 45%. In some embodiments, the percentage of the abundance of the truncated 150 kDa BoNT/A in the abundance of the plurality of 150 kDa BoNT/A sequence variant species is less than 44%. In some embodiments, the percentage of the abundance of the truncated 150 kDa BoNT/A in the abundance of the plurality of 150 kDa BoNT/A sequence variant species is less than 43%. In some embodiments, the percentage of the abundance of the truncated 150 kDa BoNT/A in the abundance of the plurality of 150 kDa BoNT/A sequence variant species is less than 42%. In some embodiments, the percentage of the abundance of the truncated 150 kDa BoNT/A in the abundance of the plurality of 150 kDa BoNT/A sequence variant species is less than 41%. In some embodiments, the percentage of the abundance of the truncated 150 kDa BoNT/A in the abundance of the plurality of 150 kDa BoNT/A sequence variant species is less than 40%. In some embodiments, the percentage of the abundance of the truncated 150 kDa BoNT/A in the abundance of the plurality of 150 kDa BoNT/A sequence variant species is less than 39%. In some embodiments, the percentage of the abundance of the truncated 150 kDa BoNT/A in the abundance of the plurality of 150 kDa BoNT/A sequence variant species is less than 38%. In some embodiments, the percentage of the abundance of the truncated 150 kDa BoNT/A in the abundance of the plurality of 150 kDa BoNT/A sequence variant species is less than 37%. In some embodiments, the percentage of the abundance of the truncated 150 kDa BoNT/A in the abundance of the plurality of 150 kDa BoNT/A sequence variant species is less than 36%. In some embodiments, the percentage of the abundance of the truncated 150 kDa BoNT/A in the abundance of the plurality of 150 kDa BoNT/A sequence variant species is less than 35%. In some embodiments, the percentage of the abundance of the truncated 150 kDa BoNT/A in the abundance of the plurality of 150 kDa BoNT/A sequence variant species is less than 34%. In some embodiments, the percentage of the abundance of the truncated 150 kDa BoNT/A in the abundance of the plurality of 150 kDa BoNT/A sequence variant species is less than 33%. In some embodiments, the percentage of the abundance of the truncated 150 kDa BoNT/A in the abundance of the plurality of 150 kDa BoNT/A sequence variant species is less than 32%. In some embodiments, the percentage of the abundance of the truncated 150 kDa BoNT/A in the abundance of the plurality of 150 kDa BoNT/A sequence variant species is less than 31%. In some embodiments, the percentage of the abundance of the truncated 150 kDa BoNT/A in the abundance of the plurality of 150 kDa BoNT/A sequence variant species is less than 30%. In some embodiments, the percentage of the abundance of the truncated 150 kDa BoNT/A in the abundance of the plurality of 150 kDa BoNT/A sequence variant species is less than 29%. In some embodiments, the percentage of the abundance of the truncated 150 kDa BoNT/A in the abundance of the plurality of 150 kDa BoNT/A sequence variant species is less than 28%. In some embodiments, the percentage of the abundance of the truncated 150 kDa BoNT/A in the abundance of the plurality of 150 kDa BoNT/A sequence variant species is less than 27%. In some embodiments, the percentage of the abundance of the truncated 150 kDa BoNT/A in the abundance of the plurality of 150 kDa BoNT/A sequence variant species is less than 26%. In some embodiments, the percentage of the abundance of the truncated 150 kDa BoNT/A in the abundance of the plurality of 150 kDa BoNT/A sequence variant species is less than 25%. In some embodiments, the percentage of the abundance of the truncated 150 kDa BoNT/A in the abundance of the plurality of 150 kDa BoNT/A sequence variant species is less than 24%. In some embodiments, the percentage of the abundance of the truncated 150 kDa BoNT/A in the abundance of the plurality of 150 kDa BoNT/A sequence variant species is less than 23%. In some embodiments, the percentage of the abundance of the truncated 150 kDa BoNT/A in the abundance of the plurality of 150 kDa BoNT/A sequence variant species is less than 22%. In some embodiments, the percentage of the abundance of the truncated 150 kDa BoNT/A in the abundance of the plurality of 150 kDa BoNT/A sequence variant species is less than 21%. In some embodiments, the percentage of the abundance of the truncated 150 kDa BoNT/A in the abundance of the plurality of 150 kDa BoNT/A sequence variant species is less than 20%. In some embodiments, the percentage of the abundance of the truncated 150 kDa BoNT/A in the abundance of the plurality of 150 kDa BoNT/A sequence variant species is less than 19%. In some embodiments, the percentage of the abundance of the truncated 150 kDa BoNT/A in the abundance of the plurality of 150 kDa BoNT/A sequence variant species is less than 18%. In some embodiments, the percentage of the abundance of the truncated 150 kDa BoNT/A in the abundance of the plurality of 150 kDa BoNT/A sequence variant species is less than 17%. In some embodiments, the percentage of the abundance of the truncated 150 kDa BoNT/A in the abundance of the plurality of 150 kDa BoNT/A sequence variant species is less than 16%. In some embodiments, the percentage of the abundance of the truncated 150 kDa BoNT/A in the abundance of the plurality of 150 kDa BoNT/A sequence variant species is less than 15%. In some embodiments, the percentage of the abundance of the truncated 150 kDa BoNT/A in the abundance of the plurality of 150 kDa BoNT/A sequence variant species is less than 14%. In some embodiments, the percentage of the abundance of the truncated 150 kDa BoNT/A in the abundance of the plurality of 150 kDa BoNT/A sequence variant species is less than 13%. In some embodiments, the percentage of the abundance of the truncated 150 kDa BoNT/A in the abundance of the plurality of 150 kDa BoNT/A sequence variant species is less than 12%. In some embodiments, the percentage of the abundance of the truncated 150 kDa BoNT/A in the abundance of the plurality of 150 kDa BoNT/A sequence variant species is less than 11%. In some embodiments, the percentage of the abundance of the truncated 150 kDa BoNT/A in the abundance of the plurality of 150 kDa BoNT/A sequence variant species is less than 10%. In some embodiments, the percentage of the abundance of the truncated 150 kDa BoNT/A in the abundance of the plurality of 150 kDa BoNT/A sequence variant species is less than 9%. In some embodiments, the percentage of the abundance of the truncated 150 kDa BoNT/A in the abundance of the plurality of 150 kDa BoNT/A sequence variant species is less than 8%. In some embodiments, the percentage of the abundance of the truncated 150 kDa BoNT/A in the abundance of the plurality of 150 kDa BoNT/A sequence variant species is less than 7%. In some embodiments, the percentage of the abundance of the truncated 150 kDa BoNT/A in the abundance of the plurality of 150 kDa BoNT/A sequence variant species is less than 6%. In some embodiments, the percentage of the abundance of the truncated 150 kDa BoNT/A in the abundance of the plurality of 150 kDa BoNT/A sequence variant species is less than 5%. In some embodiments, the percentage of the abundance of the truncated 150 kDa BoNT/A in the abundance of the plurality of 150 kDa BoNT/A sequence variant species is less than 4%. In some embodiments, the percentage of the abundance of the truncated 150 kDa BoNT/A in the abundance of the plurality of 150 kDa BoNT/A sequence variant species is less than 3%. In some embodiments, the percentage of the abundance of the truncated 150 kDa BoNT/A in the abundance of the plurality of 150 kDa BoNT/A sequence variant species is less than 2%. In some embodiments, the percentage of the abundance of the truncated 150 kDa BoNT/A in the abundance of the plurality of 150 kDa BoNT/A sequence variant species is less than 1%. In some specific embodiments, the plurality of 150 kDa BoNT/A sequence variant species further comprises a 150 kDa BoNT/A sequence variant species with a full-length light chain (full-length 150 kDa BoNT/A), wherein the full-length light chain has an amino acid sequence set forth in SEQ ID NO: 2. In some specific embodiments, the 150 kDa BoNT/A in the composition provided herein consists of two forms—one is truncated 150 kDa BoNT/A and the other one is full-length 150 kDa BoNT/A.

The ratio of the abundance of the truncated 150 kDa BoNT/A to the abundance of the full-length 150 kDa BoNT/A or the percentage of the abundance of the truncated 150 kDa BoNT/A in the abundance of the plurality of 150 kDa BoNT/A sequence variant species can be determined according to any known technologies in the art as well as those specifically described herein, for example, in the Examples section below.

In some embodiments, the ratio of the abundance of the truncated 150 kDa BoNT/A to the abundance of the full-length 150 kDa BoNT/A or the percentage of the abundance of the truncated 150 kDa BoNT/A in the abundance of the plurality of 150 kDa BoNT/A sequence variant species is determined using anion exchange (AEX) chromatography (e.g., anion exchange high performance liquid chromatography (AEX-HPLC)). In one embodiment, the truncated 150 kDa BoNT/A corresponds to the peak that elutes later than (e.g., immediately after) the peak for full-length 150 kDa BoNT/A in an AEX-HPLC chromatograph. In one embodiment, the truncated 150 kDa BoNT/A corresponds to the second 150 kDa BoNT/A peak eluted in an AEX-HPLC chromatograph. The AEX-HPLC chromatograph described herein can be generated using a first mobile phase of 40 mM Tris-HCl (pH 8.0) and a second mobile phase of 1.0 M NaCl and 40 mM Tris-HCl (pH 8.0), and wherein the AEX-HPLC chromatogram is generated using detection at 220 nm. In one embodiment, the AEX-HPLC chromatogram is generated using the conditions shown in Table 4. In one embodiment, the truncated 150 kDa BoNT/A corresponds to the 150 kDa-truncated peak as shown in FIG. 1. In some specific embodiments, the ratio of the abundance of the truncated 150 kDa BoNT/A to the abundance of the full-length 150 kDa BoNT/A or the percentage of the abundance of the truncated 150 kDa BoNT/A in the abundance of the plurality of 150 kDa BoNT/A sequence variant species is determined by using the AEX-HPLC method as illustrated in Example 1 below.

It shall be understood that a peak on a chromatogram does not only refer to one that has one and only one high point (i.e., the apex), but also refers to one that has one apex (which is the highest point of the peak) and one or more local high points.

Chromatographic peak detection and integration can be performed by a person of ordinary skill in the art. In certain embodiments, peak detection is performed manually. In certain embodiments, peak integration is performed manually. In certain embodiments, peak detection is performed using an algorithm. In certain embodiments, peak integration is performed using an algorithm. In specific embodiments, an algorithm that can be used for peak detection and/or integration takes into consideration factors including peak width, threshold, peak height, and/or curvature of the chromatogram, etc. In a specific embodiment, an algorithm that can be used for peak detection and/or integration uses asymmetric Cauchy curves. In a specific embodiment, an algorithm that can be used for peak detection and/or integration is one that is built into a chromatography software (e.g., the Empower® software). In a specific embodiment, an algorithm that can be used for peak detection and/or integration is Apex Track™.

In other embodiments, the ratio of the abundance of the truncated 150 kDa BoNT/A to the abundance of the full-length 150 kDa BoNT/A or the percentage of the abundance of the truncated 150 kDa BoNT/A in the abundance of the plurality of 150 kDa BoNT/A sequence variant species is determined using liquid chromatography-mass spectrometry (LC-MS). In some specific embodiments, the ratio of the abundance of the truncated 150 kDa BoNT/A to the abundance of the full-length 150 kDa BoNT/A or the percentage of the abundance of the truncated 150 kDa BoNT/A in the abundance of the plurality of 150 kDa BoNT/A sequence variant species is determined by using the LC-MS method described in Example 1 below. In one specific embodiment, the LC-MS is conducted using the conditions shown in Table 5.

In various aspects and embodiments, the 900 kDa BoNT/A complex is produced by a Type A strain of *Clostridium botulinum* (e.g., the Type A Hall strain of *Clostridium botulinum*). In specific embodiments, the 900 kDa BoNT/A complex is onabotulinumtoxin A.

In various aspects and embodiments, the composition described herein is animal product free. In various aspects and embodiments, the composition described herein does not contain a protease inhibitor. In certain embodiments, the composition described herein does not contain benzamidine hydrocholoride. In various aspects and embodiments, the 900 kDa BoNT/A complex is produced by *Clostridium botulinum* bacteria cultured and expanded from an animal product free working cell bank. The animal product free working cell bank can be produced, for example and without limitation, as described in Example 6.

In various aspects and embodiments, the composition described herein further comprises human serum albumin (HSA). In certain embodiments, the composition comprises about 0.5 mg of HSA per 100 units of the 900 kDa BoNT/A complex. In certain embodiments, the HSA is recombinant HSA. In specific embodiments, the recombinant HSA is animal product free. In specific embodiments, the recombinant HSA is not produced from an animal. In specific embodiments, the recombinant HSA is produced from a microorganism, such as bacteria. In specific embodiments, the recombinant HSA is produced from a plant-based expression system. In certain embodiments, the HSA is human plasma-derived.

In various aspects and embodiments, the composition described herein further comprises sodium chloride. In certain embodiments, the composition comprises about 0.9 mg of sodium chloride per 100 units of the 900 kDa BoNT/A complex.

In various aspects and embodiments, the composition described herein comprises about 50 units of the 900 kDa BoNT/A complex. In various aspects and embodiments, the composition described herein comprises about 100 units of the 900 kDa BoNT/A complex. In various aspects and embodiments, the composition described herein comprises about 200 units of the 900 kDa BoNT/A complex.

In various aspects and embodiments, the composition described herein is a liquid composition. In various aspects and embodiments, the composition described herein is a solid composition. In certain embodiments, the composition described herein is a vacuum-dried composition. In certain embodiments, the composition described herein is a freeze-dried composition. In certain embodiments, the composition described herein is a powdered pharmaceutical composition. In specific embodiments, the composition described herein is a drug product. In a specific embodiment, the composition described herein is a drug product and further comprises HSA (e.g., about 0.5 mg of HSA per 100 units of the 900 kDa BoNT/A complex) and sodium chloride (e.g., about 0.9 mg of sodium chloride per 100 units of the 900 kDa BoNT/A complex). In specific embodiments, the composition described herein is a drug substance. In a specific embodiment, the composition described herein is a drug substance in a solution suitable for storage.

In various aspects and embodiments, the 900 kDa BoNT/A complex is produced as described in Section 5.4.

In various aspects and embodiments, the 900 kDa BoNT/A complex is produced as described in Example 1.

In one embodiment, the present disclosure also relates to a method of treating a patient (preferably, a human patient) in need thereof, comprising administering a composition described herein.

5.4. Production of BoNT/A and Production of BoNT/A Compositions

*Botulinum* toxin type A has been approved by the U.S. Food and Drug Administration (FDA) for the treatment of essential blepharospasm, strabismus and hemifacial spasm in patients over the age of twelve, cervical dystonia, glabellar line (facial) wrinkles and for treating hyperhydrosis. A commercially available *botulinum* toxin type A containing pharmaceutical composition is sold under the trademark BOTOX® (onabotulinumtoxinA), available commercially from Allergan, an AbbVie company, North Chicago, Illinois, USA. BOTOX® contains a purified 900 kDa *botulinum* toxin type A complex, human serum albumin, and sodium chloride packaged in sterile, vacuum-dried form. The *botulinum* toxin type A complex in BOTOX® is made from a culture of the Hall strain of *Clostridium botulinum* grown in a medium containing N-Z amine casein and yeast extract (i.e., non-APF process) and purified from the culture solution by a series of precipitation (including acid precipitation) steps to a crystalline complex consisting of the active high molecular weight toxin protein and an associated hemagglutinin protein. The crystalline complex is re-dissolved in a solution containing saline and albumin and sterile filtered using a gamma-irradiated filter (0.2 microns) prior to vacuum-drying. BOTOX® can be reconstituted with sterile, non-preserved saline prior to intramuscular injection. Each 100 unit vial of BOTOX® consists of about 5 ng of purified *botulinum* toxin type A complex, 0.5 mg human serum albumin, and 0.9 mg sodium chloride, vacuum-dried form and intended for reconstitution with sterile normal saline without a preservative (0.9% sodium chloride injection).

A number of steps are required to make the BoNT/A compositions described herein suitable for administration to a human or animal for a therapeutic, diagnostic, research or cosmetic purpose. In one embodiment, these steps can include obtaining a purified *Clostridium botulinum* neurotoxin serotype A (BoNT/A) and then compounding the purified BoNT/A. A first step can be to culture a *Clostridial* bacteria (e.g., the Hall strain of *Clostridium botulinum*), typically on agar plates, in an environment conducive to bacterial growth, such as in a warm anaerobic atmosphere. The culture step using agar plates allows *Clostridial* colonies with desirable morphology and other characteristics to be obtained. The culture step can also be performed with bacteria from an animal product free working cell back (see, e.g., Example 6). In a second step, selected cultured *Clostridial* colonies can be fermented in a suitable medium. After a certain period of fermentation the *Clostridial* bacteria typically lyse and release *Clostridial* toxin (e.g., BoNT/A) into the medium. Thirdly, the toxin can be purified from the culture medium to obtain a bulk or raw BoNT/A toxin drug substance. Preferably, the BoNT/A toxin drug substance will not have been subjected to precipitation (e.g., precipitation with cold ethanol, hydrochloric acid, and/or ammonium sulfate), e.g., during purification. Also preferred is BoNT/A toxin drug substance that has been purified by column chromatography, particularly BoNT/A toxin drug substance produced by purification using a hydrophobic interaction chromatography (HIC) column. When multiple chromatography columns are used to purify the BoNT/A, it is preferable that the toxin is purified using a process wherein a HIC column is used prior to all other chromatography columns. It is preferable that BoNT/A drug substance is produced by a process that qualifies for use under the Good Manufacturing Practice regulations promulgated by the U.S. Food and Drug Administration.

In some embodiments, the BoNT/A compositions described herein are obtained using a substantially, essentially or entirely animal protein free (APF) process. The process can comprise the following sequential steps: culturing *Clostridium botulinum* bacteria (e.g., the Hall strain of

*Clostridium botulinum*) in a substantially APF culture medium; fermenting *Clostridium botulinum* bacteria from the culture medium in a substantially APF fermentation medium, harvesting the fermentation medium by removing cellular debris present in the fermentation medium using filtration or centrifugation; concentrating the harvested fermentation medium by filtration, such as by ultrafiltration (UF); diluting the concentrated fermentation medium by adding a buffer. Following dilution with the buffer, a substantially APF chromatographic process can be undertaken to obtain biologically active highly purified BoNT/A complex. In some embodiments, the APF process described herein does not involve using a protease inhibitor. In some embodiments, the APF process described herein does not involve using benzamidine hydrochloride.

The substantially APF culture and/or fermentation medium can contain a protein product obtained from yeast (e.g., yeast extract or yeast extract concentrate), or from a vegetable (e.g., wheat, soy, malt, Lupinus, corn, cottonseed, *L. campestri* seed, etc.). The APF culture and/or fermentation medium can further comprise a carbon source (e.g., glucose) and/or a source of salt (e.g., sodium chloride). In one embodiment, the medium used for fermentation of *Clostridium botulinum* is free of animal by-products and comprises approximately 10-100 g/L (e.g., 20-60 g/L) hydrolyzed soy (Hy-Soy), approximately 7.5 g/L glucose, and 5.0 g/L NaCl, as disclosed in U.S. Pat. No. 7,354,740, which is incorporated by reference herein in its entirety. In one embodiment, the fermentation medium can comprise 3% w/v or 5% w/v HySoy; 1% w/v Hy Yeast; and 1% w/v glucose, as disclosed in U.S. Pat. No. 8,129,139, which is incorporated by reference herein in its entirety. In one embodiment, the APF fermentation medium can comprise 3.25% w/v soy peptone type II, 1.2% w/v yeast extract, 1.5% w/v glucose, pH adjusted to 7.3 using sodium hydroxide, as illustrated in Example 1 below.

In some embodiments, the BoNT/A compositions described herein are obtained under a cold shock condition, i.e., at a temperature that is lower than the typical fermentation temperature (i.e., at approximately 35±1° C.) for a short period of time within the fermentation process. In some embodiments, the BoNT/A compositions are obtained under cold shock conditions at about 33° C., 30° C., 27° C., 25° C., 22° C., 20° C., 19° C., 18° C., 17° C., 16° C., or 15° C. The cold shock conditions can last for any period of time within the entire fermentation process, for example, for about 2 hours, 5 hours, 8 hours, or 10 hours within a 72-hour fermentation process. The cold shock conditions can occur once or multiple times during the fermentation process. In some embodiments, the BoNT/A compositions described herein are obtained using about 15° C.-20° C. (e.g., about 15° C., 16° C., 17° C., 18° C., 19° C., or 20° C.) cold shock for about 5 hours (e.g., from the $13^{th}$ to $17^{th}$ hour in a 72-hour fermentation process) during fermentation.

In some embodiments, the BoNT/A compositions described herein are obtained under a continuous cold condition, i.e., at a temperature that is continuously lower (e.g., about 25° C.) than the typical fermentation temperature (i.e., at approximately 35±1° C.) throughout the entire fermentation process. In some embodiments, the BoNT/A compositions are obtained under a continuous cold condition at about 33° C., 30° C., 27° C., 25° C., 22° C., 20° C., 19° C., 18° C., 17° C., 16° C., or 15° C. In some embodiments, the BoNT/A compositions described herein are obtained by fermenting a culture of *Clostridium botulinum* at about 25° C. for about 160 hours.

In one aspect, provided herein is a method of producing a composition comprising a 900 kDa BoNT/A complex (such as onabotulinumtoxinA), said method comprising incubating a culture of *Clostridium botulinum*bacteria (e.g., *Clostridium botulinum* type A Hall strain bacteria) in a production fermentor at a temperature that is below 35° C. for a period of time.

In certain embodiments, the entire fermentation period is about 60 hours to about 200 hours. In certain embodiments, the entire fermentation period is about 60 hours to about 160 hours. In certain embodiments, the entire fermentation period is about 60 hours to about 120 hours. In certain embodiments, the entire fermentation period is about 60 hours to about 80 hours. In certain embodiments, the entire fermentation period is about 68 hours to about 76 hours. In certain embodiments, the entire fermentation period is about 65 hours to about 72 hours. In certain embodiments, the entire fermentation period is about 72 hours. In certain embodiments, the entire fermentation period is about 120 hours to about 200 hours. In certain embodiments, the entire fermentation period is about 120 hours to about 180 hours. In certain embodiments, the entire fermentation period is about 140 hours to about 180 hours. In certain embodiments, the entire fermentation period is about 160 hours.

In certain embodiments, the period of time (for low temperature incubation) is about 2 hours. In certain embodiments, the period of time is about 5 hours. In certain embodiments, the period of time is about 8 hours. In certain embodiments, the period of time is about 10 hours. In certain embodiments, the period of time is about 2-5 hours. In certain embodiments, the period of time is about 5-8 hours. In certain embodiments, the period of time is about 8-10 hours. In certain embodiments, the period of time is the entire fermentation period.

In certain embodiments, the temperature is about 33° C., 32° C., 31° C., 30° C., 29° C., 28° C., 27° C., 26° C., 25° C., 24° C., 23° C., 22° C., 21° C., 20° C., 19° C., 18° C., 17° C., 16° C., or 15° C. In certain embodiments, the temperature is about 15° C.-20° C. (e.g., about 15° C., 16° C., 17° C., 18° C., 19° C., or 20° C.). In certain embodiments, the temperature is about 15° C. In certain embodiments, the temperature is about 20° C. In certain embodiments, the temperature is about 25° C.

In certain embodiments, the method comprises, in the following order: (a) incubating the culture of *Clostridium botulinum* bacteria in the production fermentor at 35° C. for about 12 hours; (b) setting temperature to about 15° C.-20° C. (e.g., about 15° C., 16° C., 17° C., 18° C., 19° C., or 20° C.) at the end of step (a); (c) culturing at the set temperature until about 5 hours after step (a); (d) setting temperature to 35° C. at the end of step (c); and (e) culturing at 35° C. until about 55 hours after step (c).

In certain embodiments, the method comprises incubating the culture of *Clostridium botulinum* bacteria in the production fermentor at 25° C. for about 160 hours.

In certain embodiments, the method is performed as described in Example 1.

In some embodiments, the BoNT/A compositions described herein are obtained in the presence of $CO_2$ in the headspace overlay during the fermentation process, e.g., in the presence of $CO_2$ at a concentration of about 1%, 2%, 5%, 10%, 15%, 20%, 25%, 30%, 35%, 40%, 45%, 50%, 55%, 60%, 65%, 70%, 75%, 80%, 85%, 90%, 95%, or 100% in the headspace overlay, or about 1%-10%, 10%-20%, 20%-30%, 30%-40%, 40%-50%, 50%-60%, 60%-70%, 70%-80%, 80%-90%, or 90%-100% in the headspace overlay. The headspace overlay can also include $N_2$. For example, the BoNT/A compositions described herein can be obtained in the presence of, for example, without limitation, about 1% $CO_2$ with 99% $N_2$, 2% $CO_2$ with 98% $N_2$, 5% $CO_2$ with 95% $N_2$, 10% $CO_2$ with 90% $N_2$, 15% $CO_2$ with 85% $N_2$, 20% $CO_2$ with 80% $N_2$, 25% $CO_2$ with 75% $N_2$, 30% $CO_2$ with 70% $N_2$, 35% $CO_2$ with 65% $N_2$, 40% $CO_2$ with 60% $N_2$, 45% $CO_2$ with 55% $N_2$, 55% $CO_2$ with 45% $N_2$, 60% $CO_2$ with 40% $N_2$, 65% $CO_2$ with 45% $N_2$, 70% $CO_2$ with 35% $N_2$, 75% $CO_2$ with 30% $N_2$, 80% $CO_2$ with 20% $N_2$, 85% $CO_2$ with 15% $N_2$, 90% $CO_2$ with 10% $N_2$, 95% $CO_2$ with 5% $N_2$, or 100% $CO_2$ in the headspace overlay during the fermentation process, or about 1%-10%, 10%-20%, 20%-30%, 30%-40%, 40%-50%, 50%-60%, 60%-70%, 70%-80%, 80%-90%, or 90%-99% $CO_2$ in the headspace overlay during the fermentation process with the rest of the headspace overlay being $N_2$.

In one aspect, provided herein is a method of producing a composition comprising a 900 kDa BoNT/A complex (such as onabotulinumtoxinA), said method comprising incubating a culture of *Clostridium botulinum* bacteria (e.g., *Clostridium botulinum* type A Hall strain bacteria) in a production fermentor in the presence of $CO_2$ (and optionally $N_2$) in the fermentor headspace overlay during the fermentation process. In certain embodiments, the fermentor headspace overlay comprises about 1%, 2%, 5%, 10%, 15%, 20%, 25%, 30%, 35%, 40%, 45%, 50%, 55%, 60%, 65%, 70%, 75%, 80%, 85%, 90%, 95%, or 100% $CO_2$. In certain embodiments, the fermentor headspace overlay comprises about 1%-10%, 10%-20%, 20%-30%, 30%-40%, 40%-50%, 50%-60%, 60%-70%, 70%-80%, 80%-90%, or 90%-100% $CO_2$. In certain embodiments, the fermentor headspace overlay comprises about 1% $CO_2$ and 99% $N_2$, 2% $CO_2$ and 98% $N_2$, 5% $CO_2$ and 95% $N_2$, 10% $CO_2$ and 90% $N_2$, 15% $CO_2$ and 85% $N_2$, 20% $CO_2$ and 80% $N_2$, 25% $CO_2$ and 75% $N_2$, 30% $CO_2$ and 70% $N_2$, 35% $CO_2$ and 65% $N_2$, 40% $CO_2$ and 60% $N_2$, 45% $CO_2$ and 55% $N_2$, 55% $CO_2$ and 45% $N_2$, 60% $CO_2$ and 40% $N_2$, 65% $CO_2$ and 45% $N_2$, 70% $CO_2$ and 35% $N_2$, 75% $CO_2$ and 30% $N_2$, 80% $CO_2$ and 20% $N_2$, 85% $CO_2$ and 15% $N_2$, 90% $CO_2$ and 10% $N_2$, 95% $CO_2$ and 5% $N_2$, or 100% $CO_2$. In certain embodiments, the fermentor headspace overlay comprises about 1%-10%, 10%-20%, 20%-30%, 30%-40%, 40%-50%, 50%-60%, 60%-70%, 70%-80%, 80%-90%, or 90%-99% $CO_2$ with the rest of the headspace overlay being $N_2$.

In certain embodiments, the method comprises incubating the culture of *Clostridium botulinum* bacteria (e.g., *Clostridium botulinum* type A Hall strain bacteria) in the production fermentor in the presence of 25% $CO_2$ (and optionally 75% $N_2$) in the fermentor headspace overlay during the fermentation process. In specific embodiments, the method comprises incubating the culture of *Clostridium botulinum* bacteria (e.g., *Clostridium botulinum* type A Hall strain bacteria) in the production fermentor in the presence of 25% $CO_2$ and 75% $N_2$ in the fermentor headspace overlay during the fermentation process.

In certain embodiments, the method comprises incubating the culture of *Clostridium botulinum* bacteria (e.g., *Clostridium botulinum* type A Hall strain bacteria) in the production fermentor in the presence of 50% $CO_2$ (and optionally 50% $N_2$) in the fermentor headspace overlay during the fermentation process. In specific embodiments, the method comprises incubating the culture of *Clostridium botulinum* bacteria (e.g., *Clostridium botulinum* type A Hall strain bacteria) in the production fermentor in the presence of 50% $CO_2$ and 50% $N_2$ in the fermentor headspace overlay during the fermentation process.

In certain embodiments, the method comprises incubating the culture of *Clostridium botulinum* bacteria (e.g., *Clostridium botulinum* type A Hall strain bacteria) in the production fermentor in the presence of 75% $CO_2$ (and optionally 25% $N_2$) in the fermentor headspace overlay during the fermentation process. In specific embodiments, the method comprises incubating the culture of *Clostridium botulinum* bacteria (e.g., *Clostridium botulinum* type A Hall strain bacteria) in the production fermentor in the presence of 75% $CO_2$ and 25% $N_2$ in the fermentor headspace overlay during the fermentation process.

In certain embodiments, the method comprises incubating the culture of *Clostridium botulinum* bacteria (e.g., *Clostridium botulinum* type A Hall strain bacteria) in the production fermentor in the presence of 100% $CO_2$ in the fermentor headspace overlay during the fermentation process.

In certain embodiments, the method is performed as described in Example 1.

In various aspects and embodiments, the fermentation is performed in animal protein free cell culture media.

An animal product free or substantially animal product free chromatographic system and process can be used to purify a clarified culture of *Clostridium botulinum* obtained from the APF fermentation processes described herein. The chromatographic system and process can include one column, two columns or three columns. For example, the chromatographic system and process can comprise one, two, or three steps: a hydrophobic interaction chromatography (HIC), and/or an anion exchange chromatography (AEX), and/or a cation exchange chromatograph. In some embodiments, the chromatographic process comprises a first step of subjecting the BoNT/A culture obtained from the APF process to a HIC, followed by subjecting a BoNT/A-containing eluent from HIC to an AEX, and then followed by subjecting the BoNT/A-containing captured solution from AEX to a CEX. In some embodiments, the chromatography-based purification process further comprises processing the eluent from the columns by diafiltration (DF) and filtering the processed eluent. In some embodiments, the chromatography-based purification process is as disclosed in U.S. Pat. No. 8,129,139, which is incorporated by reference herein in its entirety.

The BoNT/A complex obtained from the APF fermentation and purification processes described herein is biologically active and highly purified. In one embodiment, the BoNT/A compositions described herein comprise less than 3% (e.g., less than about 2.5%, less than about 2.0%, less than about 1.8%, less than about 1.5%, less than about 1.2%, less than about 1.0%, less than about 0.8%, less than about 0.6%, less than about 0.5%, less than about 0.4%, less than about 0.3%, less than about 0.2%, or less than about 0.1%) of host cell protein. The level of the host cell protein can be assessed using methods known in the art, e.g., using Size Exclusion High Performance Liquid Chromatography (SEC-HPLC) or SEC-HPLC in conjugation with Multi-Angle Laser Light Scattering (MALLS) as disclosed in Lietzow et al. (2008) *Protein J* 27:420-425, which is incorporated herein by reference in its entirety. In one embodiment, the percentage of the host cell protein in the BoNT/A compositions described herein is determined using SEC-HPLC.

In various aspects and embodiments, the 900 kDa BoNT/A complex is produced by a Type A strain of *Clostridium botulinum* (e.g., the Type A Hall strain of *Clostridium botulinum*). In specific embodiments, the 900 kDa BoNT/A complex is onabotulinumtoxin A.

In various aspects and embodiments, the 900 kDa BoNT/A complex is produced as described in Example 5, Example 6 or Example 7.

In various aspects and embodiments, the 900 kDa BoNT/A complex is produced using one or more steps as described in Example 5, Example 6 or Example 7.

In various aspects and embodiments, the 900 kDa BoNT/A complex is produced by a process that comprises one or more steps of column chromatography performed during purification of the 900 kDa BoNT/A complex.

In preferred embodiments, the one or more steps of column chromatography performed during purification of the 900 kDa BoNT/A complex comprise hydrophobic interaction chromatography. In specific embodiments, the one or more steps of column chromatography comprise anion exchange chromatography. In specific embodiments, the one or more steps of column chromatography comprise cation exchange chromatography.

In specific embodiments, the one or more steps of column chromatography performed during purification of the 900 kDa BoNT/A complex comprise hydrophobic interaction chromatography and anion exchange chromatography. In a specific embodiment, the one or more steps of column chromatography comprise, in the following order, hydrophobic interaction chromatography and anion exchange chromatography. In a specific embodiment, the one or more steps of column chromatography comprise, in the following order, anion exchange chromatography and hydrophobic interaction chromatography.

In specific embodiments, the one or more steps of column chromatography performed during purification of the 900 kDa BoNT/A complex comprise hydrophobic interaction chromatography and cation exchange chromatography. In a specific embodiment, the one or more steps of column chromatography comprise, in the following order, hydrophobic interaction chromatography and cation exchange chromatography. In a specific embodiment, the one or more steps of column chromatography comprise, in the following order, cation exchange chromatography and hydrophobic interaction chromatography.

In specific embodiments, the one or more steps of column chromatography performed during purification of the 900 kDa BoNT/A complex comprise anion exchange chromatography and cation exchange chromatography. In a specific embodiment, the one or more steps of column chromatography comprise, in the following order, anion exchange chromatography and cation exchange chromatography. In a specific embodiment, the one or more steps of column chromatography comprise, in the following order, cation exchange chromatography and anion exchange chromatography.

In specific embodiments, the one or more steps of column chromatography comprise hydrophobic interaction chromatography, anion exchange chromatography, and cation exchange chromatography. In a preferred embodiment, the one or more steps of column chromatography comprise, in the following order, hydrophobic interaction chromatography, anion exchange chromatography, and cation exchange chromatography. In a specific embodiment, the one or more steps of column chromatography comprise, in the following order, hydrophobic interaction chromatography, cation exchange chromatography, and anion exchange chromatography. In a specific embodiment, the one or more steps of column chromatography comprise, in the following order, anion exchange chromatography, cation exchange chromatography, and hydrophobic interaction chromatography. In a specific embodiment, the one or more steps of column chromatography comprise, in the following order, anion exchange chromatography, hydrophobic interaction chromatography, and cation exchange chromatography. In a specific embodiment, the one or more steps of column chromatography comprise, in the following order, cation exchange chromatography, anion exchange chromatography, and hydrophobic interaction chromatography. In a specific embodiment, the one or more steps of column chromatography comprise, in the following order, cation exchange chromatography, hydrophobic interaction chromatography, and anion exchange chromatography.

In various aspects and embodiments, the 900 kDa BoNT/A complex is produced by a process that does not comprise a step of precipitation with cold ethanol, hydrochloric acid, or ammonia sulfate. In specific embodiments, the 900 kDa BoNT/A complex is produced by a process that does not comprise a step of precipitation with cold ethanol. In specific embodiments, the 900 kDa BoNT/A complex is produced by a process that does not comprise a step of precipitation with hydrochloric acid. In specific embodiments, the 900 kDa BoNT/A complex is produced by a process that does not comprise a step of precipitation with ammonia sulfate.

In various aspects and embodiments, the 900 kDa BoNT/A complex is produced by a process that comprises the following steps: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, and filtering at 0.2 µm with added ammonium sulfate.

In various aspects and embodiments, the 900 kDa BoNT/A complex is produced by a process that comprises one or more of the following steps: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, and filtering at 0.2 µm with added ammonium sulfate.

In various aspects and embodiments, the 900 kDa BoNT/A complex is produced by a process that comprises the following steps and in the following order: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, and filtering at 0.2 µm with added ammonium sulfate.

In various aspects and embodiments, the 900 kDa BoNT/A complex is produced by a process that comprises the following steps: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, filtering at 0.2 µm with added ammonium sulfate, and subjecting the filtrate to hydrophobic interaction chromatography (optionally followed by anion exchange chromatography and cation exchange chromatography).

In various aspects and embodiments, the 900 kDa BoNT/A complex is produced by a process that comprises one or more of the following steps: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, filtering at 0.2 µm with added ammonium sulfate, and subjecting the filtrate to hydrophobic interaction chromatography (optionally followed by anion exchange chromatography and cation exchange chromatography).

In various aspects and embodiments, the 900 kDa BoNT/A complex is produced by a process that comprises the following steps and in the following order: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, filtering at 0.2 µm with added ammonium sulfate, and subjecting the filtrate to hydrophobic interaction chromatography (optionally followed by anion exchange chromatography and cation exchange chromatography).

In various aspects and embodiments, the 900 kDa BoNT/A complex is produced by a process that comprises the following steps: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, filtering at 0.2 µm with added ammonium sulfate, loading the filtrate onto a hydrophobic interaction column, eluting with a descending gradient of ammonium sulfate, and isolating the product peak (optionally followed by anion exchange chromatography and cation exchange chromatography).

In various aspects and embodiments, the 900 kDa BoNT/A complex is produced by a process that comprises one or more of the following steps: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, filtering at 0.2 µm with added ammonium sulfate, loading the filtrate onto a hydrophobic interaction column, eluting with a descending gradient of ammonium sulfate, and isolating the product peak (optionally followed by anion exchange chromatography and cation exchange chromatography).

In various aspects and embodiments, the 900 kDa BoNT/A complex is produced by a process that comprises the following steps and in the following order: subjecting fermentation culture to acid precipitation using 3M sulfuric acid to reduce pH to 3.5 at a temperature below 25° C., subjecting the acid precipitate to tangential flow filtration (e.g., 0.1 µm tangential flow filtration) to concentrate cell mass, adjusting pH to about 6.0, adding one or more nucleases to reduce host cell nucleic acid content, clarifying by centrifugation to remove cell debris, filtering at 0.2 µm with added ammonium sulfate, loading the filtrate onto a hydrophobic interaction column, eluting with a descending gradient of ammonium sulfate, and isolating the product peak (optionally followed by anion exchange chromatography and cation exchange chromatography).

In certain embodiments, the BoNT/A complex is produced by *Clostridium botulinum* bacteria cultured and expanded from an animal product free working cell bank.

In various aspects and embodiments, the 900 kDa BoNT/A complex is produced by a process that does not involve using a protease inhibitor. In certain embodiments, the 900 kDa BoNT/A complex is produced by a process that does not involve using benzamidine hydrocholoride.

After stabilization in a suitable solution, the bulk BoNT/A drug substance can be compounded with one or more excipients (e.g., human serum albumin, such as recombinant human serum albumin, and sodium chloride) and can then be sterile filtered to make a pharmaceutical composition suitable for administration to a human. An example of such a BoNT/A is onabotulinumtoxinA. The pharmaceutical compositions can be made into a solid form (e.g., as powder) by drying (e.g., vacuum-drying or freeze-drying). Solid pharmaceutical compositions can be stored and reconstituted prior to injection. The pharmaceutical composition can also be in a liquid form (e.g., as a solution). Liquid pharmaceutical compositions can be stored and used directly for injection. The BoNT/A pharmaceutical compositions described herein can comprise a 900 kDa *Clostridium botulinum* neurotoxin serotype A (BoNT/A) complex as an active pharmaceutical ingredient. The pharmaceutical composition can also include one or more excipients, buffers, carriers, stabilizers, preservatives and/or bulking agents. Such pharmaceutical compositions are preferably chemically and physically stable such that the BoNT/A active pharmaceutical ingredient remains suitable for use as a pharmaceutical product following storage. BoNT/A products may be stored at room temperature, in refrigerated conditions, or below 0° C. It is preferable that the BoNT/A remains stable during storage for at least about 12 months, more preferably at least about 18 months.

In various aspects and embodiments, the composition described herein is animal product free. In various aspects and embodiments, the composition described herein does not contain a protease inhibitor. In certain embodiments, the composition described herein does not contain benzamidine hydrocholoride. In various aspects and embodiments, the composition described herein is produced by a process that does not involve using a protease inhibitor. In certain embodiments, the composition described herein is produced by a process that does not involve using benzamidine hydrocholoride. In various aspects and embodiments, the 900 kDa BoNT/A complex is produced by *Clostridium botulinum* bacteria cultured and expanded from an animal product free working cell bank. The animal product free working cell bank can be produced, for example and without limitation, as described in Example 6.

In some embodiments, an animal product free composition is free of human derived human serum albumin (HSA). In some embodiments, an animal product free composition is free of animal derived nucleases. In some embodiments, an animal product free composition comprises recombinantly produced HSA. In some embodiments, the recombinantly produced HSA is commercially available or known in the art. In some embodiments, an animal product free composition is ammonium sulfate free. In some embodiments, an animal product free composition comprises chromatography resin.

In various aspects and embodiments, the composition described herein further comprises human serum albumin (HSA). In certain embodiments, the composition comprises about 0.5 mg of HSA per 100 units of the 900 kDa BoNT/A complex. In certain embodiments, the HSA is recombinant HSA. In specific embodiments, the recombinant HSA is animal product free. In specific embodiments, the recombinant HSA is not produced from an animal. In specific embodiments, the recombinant HSA is produced from a microorganism, such as bacteria. In specific embodiments, the recombinant HSA is produced from a plant-based expression system. In certain embodiments, the HSA is human plasma-derived.

In various aspects and embodiments, the composition described herein further comprises sodium chloride. In certain embodiments, the composition comprises about 0.9 mg of sodium chloride per 100 units of the 900 kDa BoNT/A complex.

In various aspects and embodiments, the composition described herein comprises about 50 units of the 900 kDa BoNT/A complex. In various aspects and embodiments, the composition described herein comprises about 100 units of the 900 kDa BoNT/A complex. In various aspects and embodiments, the composition described herein comprises about 200 units of the 900 kDa BONT/A complex.

In various aspects and embodiments, the composition described herein is a liquid composition. In various aspects and embodiments, the composition described herein is a solid composition. In certain embodiments, the composition described herein is a vacuum-dried composition. In certain embodiments, the composition described herein is a freeze-dried composition. In certain embodiments, the composition described herein is a powdered pharmaceutical composition. In specific embodiments, the composition described herein is a drug product. In a specific embodiment, the composition described herein is a drug product and further comprises HSA (e.g., about 0.5 mg of HSA per 100 units of the 900 kDa BoNT/A complex) and sodium chloride (e.g., about 0.9 mg of sodium chloride per 100 units of the 900 kDa BoNT/A complex). In specific embodiments, the composition described herein is a drug substance. In a specific embodiment, the composition described herein is a drug substance in a solution suitable for storage.

In one aspect, provided herein is a BoNT/A composition produced by a method or process described in this Section 5.4.

5.5. Characterization of BoNT/A Compositions

In one embodiment, BoNT/A compositions described herein have a potency of at least about $1.5 \times 10^7$ units/mg, at least about $2.0 \times 10^7$ units/mg, e.g., about $1.5 \times 10^7$ to about $6.0 \times 10^7$ units/mg, about $2.0 \times 10^7$ to about $6.0 \times 10^7$ units/mg, about $2.4 \times 10^7$ to about $6.0 \times 10^7$ units/mg, about $2.4 \times 10^7$ to about $5.9 \times 10^7$ units/mg, about $2.4 \times 10^7$ to about $5.8 \times 10^7$ units/mg, about $2.4 \times 10^7$ to about $5.7 \times 10^7$ units/mg, about $2.4 \times 10^7$ to about $5.6 \times 10^7$ units/mg, about $2.4 \times 10^7$ to about $5.5 \times 10^7$ units/mg, about $2.4 \times 10^7$ to about $5.4 \times 10^7$ units/mg, about $2.5 \times 10^7$ to about $6.0 \times 10^7$ units/mg, about $2.6 \times 10^7$ to about $6.0 \times 10^7$ units/mg, about $2.7 \times 10^7$ to about $6.0 \times 10^7$ units/mg, about $2.8 \times 10^7$ to about $6.0 \times 10^7$ units/mg, about $2.9 \times 10^7$ to about $6.0 \times 10^7$ units/mg, about $3.0 \times 10^7$ to about $6.0 \times 10^7$ units/mg, or any numbers between such ranges.

In one embodiment, BoNT/A compositions described herein have a potency of about $2.4 \times 10^7$ units/mg to about $5.4 \times 10^7$ units/mg. In preferred embodiments, the term "unit" used herein refers to the $LD_{50}$ dose.

In various embodiments and aspects, a BoNT/A composition described herein has a higher potency than a commercially available BoNT/A composition that is known in the art. In certain embodiments, a BoNT/A composition described herein has a potency that is at least 10%, at least 20%, at least 30%, at least 40%, at least 50%, at least 60%, at least 70%, at least 80%, at least 90%, at least 100%, at least 1.5-fold, or at least 2-fold higher than the potency of a commercially available BoNT/A composition that is known in the art. In certain embodiments, a BoNT/A composition described herein has a potency that is at least $0.1 \times 10^7$ units/mg, at least $0.2 \times 10^7$ units/mg, at least $0.3 \times 10^7$ units/mg, at least $0.4 \times 10^7$ units/mg, at least $0.5 \times 10^7$ units/mg, at least $0.6 \times 10^7$ units/mg, at least $0.7 \times 10^7$ units/mg, at least $0.8 \times 10^7$ units/mg, at least $0.9 \times 10^7$ units/mg, at least $1 \times 10^7$ units/mg, at least $1.5 \times 10^7$ units/mg, at least $2 \times 10^7$ units/mg, at least $3 \times 10^7$ units/mg, or at least $4 \times 10^7$ units/mg higher than the potency of a commercially available BoNT/A composition that is known in the art.

The potency of the BoNT/A compositions described herein can be determined with methods known in the art, including but not limited to, e.g., Light-Chain Activity High-Performance Liquid Chromatography (LCA-HPLC) assay, mouse 50% lethal dose ($MLD_{50}$) assay, Mouse Digit Abduction Score (DAS) assay, SNAP-25 assay, cell-based potency assay (CBPA), etc.

The LCA-HPLC assay measures SNAP-25 cleavage specificity. Samples are reacted with a commercially available BoNT/A fluorescent substrate derived from the SNAP-25 sequence. The fluorescently-labeled cleavage products are separated and detected via a reverse-phase (RP)-HPLC method. Further description of LCA-HPLC assay can be found in publications Hunt et al. (2010) *Toxins* 2(8):2198-2212 and Rupp et al. (2020) *Toxins* 12(6):393, each of which is incorporated herein by reference in its entirety.

In one embodiment, the potency is determined using a mouse 50% lethal dose (MLD50) assay. The mouse 50% lethal dose (MLD50) assay has been described in, e.g., Schantz and Kautter (1978) *Journal of the AOAC* 61(1):96-99, Hunt and Kenneth (2009) *Clinical Neuropharmacology* 32(1):28-31, U.S. Pat. Nos. 7,160,699, and 9,725,705, each of which is incorporated herein by reference in its entirety. Mouse 50% lethal dose (MLD50) assay is a method for measuring the potency of a *botulinum* toxin by intraperitoneal injection of the *botulinum* toxin into female mice (about four weeks old) weighing 17-22 grams each at the start of the assay. Each mouse is held in a supine position with its head tilted down and is injected intraperitoneally into the lower right abdomen at an angle of about 30 degrees using a 25 to 27 gauge ⅜" to ⅝" needle with one of several serial dilutions of the *botulinum* toxin in saline. The death rates over the ensuing 72 hours for each dilution are recorded. The dilutions are prepared so that the most concentrated dilution produces a death rate of at least 80% of the mice injected, and the least concentration dilution produces a death rate of no greater than 20% of the mice injected. There must be a minimum of four dilutions that fall within the monotone decreasing range of the death rates. The monotone decreasing range commences with a death rate of no less than 80%. Within the four or more monotone decreasing rates, the two largest and the two smallest rates must be decreasing (i.e., not equivalent). The dilution at which 50% of the mice die within the three day post injection observation period is defined as a dilution which comprises one unit (1 U) of the *botulinum* toxin.

Mouse Digit Abduction Score (DAS) assay is an in vivo assessment of toxin-induced muscle paralysis following injection of BoNT/A toxin into the hind limb muscle of a rodent. The DAS assay can be used to assess the potency of BoNT/A compositions on muscle paralysis, as well as the duration of action. Detailed protocols of DAS assay have been disclosed in Aoki et al. (1999) *Eur. J. Neurol.* 6:s3-s10, Aoki (2001) *Toxicon* 39: 1815-1820, Broide et al. (2013) *Toxicon* 71:18-24, and Rupp et al. (2020) *Toxins* 12(6):393, each of which is incorporated herein by reference in its entirety. For example, the DAS assay can be performed by injection of a BoNT/A composition described herein into the mouse gastrocnemius/soleus complex, followed by assessment of Digital Abduction Score using the method of Aoki (2001) *Toxicon* 39: 1815-1820. In the DAS assay, mice are suspended briefly by the tail in order to elicit a characteristic startle response in which the mouse extends its hind limbs and abducts its hind digits. Following the BoNT/A composition injection, the varying degrees of digit abduction are scored on a five-point scale (0=normal to 4=maximal reduction in digit abduction and leg extension). Safety Ratio, the ratio between the amount of a toxin required for a 10% drop in a bodyweight (measured at peak effect within the first seven days after dosing in a mouse) and the amount of toxin required for a DAS score of 2, can also be determined to assess the therapeutic index of the BoNT/A composition described herein, as described in U.S. Pat. No. 9,920,310, which is incorporated by reference herein in its entirety. High Safety Ratio scores are therefore desired, and indicate a toxin that is able to effectively paralyze a target muscle with little undesired off-target effects.

SNAP-25 assay is an ELISA based method to measure SNAP-25 proteolytic activity of the *botulinum* toxin. The assay uses a truncated SNAP-25 protein (the 206 amino acid residue peptide) bound to polystyrene 96 well microtiter plates and a monoclonal antibody that recognizes the cleaved product (a 197 amino acid residue peptide) which is made by enzymatic hydrolysis between amino acids 197 and 198 of the SNAP-25 by reduced *botulinum* toxin type A. The monoclonal antibody bound to the cleaved product is then detected with a secondary antibody (goat anti-mouse IgG conjugated to horseradish peroxidase HRP), which produces a color change in the presence of a chromogenic substrate (TMB). Exemplary SNAP-25 methods are described in Ekong et al. (1997) *Microbiology* 143:3337-3347, and U.S. Pat. No. 7,160,699, each of which is incorporated herein by reference.

Cell-based potency assay (CBPA) has been described in, e.g., Fernández-Salas et al. (2012) PLOS ONE 7(11): e49516, Rupp et al. (2020) *Toxins* 12(6):393, WO 2010/105234, and WO 2009/114748, each of which is incorporated herein by reference. In one embodiment, the SNAP-$25_{197}$ SiMa Hl electrochemiluminescent (ECL) CBPA is used to determine the potency of the BoNT/A compositions described herein. The SNAP-$25_{197}$ SiMa Hl electrochemiluminescent (ECL) CBPA is an in vitro cell-based assay that measures the key steps of BoNT/A intoxication: receptor-mediated cell binding and internalization, translocation of the protease domain (light chain) into the cytosol, and proteolytic cleavage of SNAP-25, allowing direct comparison of BoNT/A product biological activity in vitro (Fernández-Salas et al. (2012) PLOS ONE 7(11):e49516; Rupp et al. (2020) *Toxins* 12(6):393). In brief, human neuroblastoma SiMa Hl cells are plated onto poly-D-lysine (PDL) 96-well plates in serum-free media (SFM) with 25 µg/mL of $GT_{1b}$ for three days and treated with toxin samples for 24 hours. After treatment, toxins are removed, cells are lysed and lysates are transferred to MSD High Bind plates coated with anti-SNAP-$25_{197}$ monoclonal antibody (mAb) 2E2A6. Plates are then washed and incubated with SULFO-TAG NHS-Ester labeled anti-SNAP-25 polyclonal antibody (pAb) for detection. Captured, BoNT/A toxin-cleaved SNAP-25 is then quantitated on a MSD plate reader.

5.6. Illustrative Embodiments

The present disclosure includes the following non-limiting illustrative embodiments.

1. A composition comprising a 900 kDa *Clostridium botulinum* neurotoxin serotype A (BoNT/A) complex, wherein the 900 kDa BoNT/A complex comprises a 150 kDa BoNT/A that is in the form of a plurality of sequence variant species, wherein the plurality of sequence variant species comprises a 150 kDa BoNT/A sequence variant species with a C-terminal truncated light chain and a 150 kDa BoNT/A sequence variant species with a full-length light chain, wherein the C-terminal truncated light chain has an amino acid sequence set forth in SEQ ID NO: 4, and the full-length light chain has an amino acid sequence set forth in SEQ ID NO: 2, and wherein the abundance ratio of the 150 kDa BoNT/A sequence variant species with the C-terminal truncated light chain to the 150 kDa BoNT/A sequence variant species with the full-length light chain is less than 3.9.

2. A composition comprising a 900 kDa BoNT/A complex, wherein the 900 kDa BoNT/A complex comprises a 150 kDa BoNT/A that is in the form of a plurality of sequence variant species, wherein the plurality of sequence variant species comprises a 150 kDa BoNT/A sequence variant species with a C-terminal truncated light chain, wherein the C-terminal truncated light chain has an amino acid sequence set forth in SEQ ID NO: 4, and wherein the abundance percentage of the 150 kDa BoNT/A sequence variant species with the C-terminal truncated light chain in the plurality of 150 kDa BoNT/A sequence variant species is less than 79.5%.

3. The composition of embodiment 1, wherein the abundance ratio is measured by anion exchange chromatography (AEX).

4. The composition of embodiment 2, wherein the abundance percentage is measured by AEX.

5. The composition of any one of embodiments 1-4, wherein the 900 kDa BoNT/A complex is produced by *Clostridium botulinum* bacteria cultured and expanded from an animal product free working cell bank.

6. The composition of any one of embodiments 1-5, wherein the 900 kDa BoNT/A complex is produced by a Type A strain of *Clostridium botulinum*.

7. The composition of embodiment 6, wherein the Type A strain of *Clostridium botulinum* is a Type A Hall strain of *Clostridium botulinum*.

8. The composition of any one of embodiments 1-7, wherein the 900 kDa BoNT/A complex is onabotulinumtoxin A.

9. The composition of any one of embodiments 1-8, which further comprises human serum albumin.

10. The composition of embodiment 9, which comprises about 0.5 mg of human serum albumin per 100 units of the 900 kDa BoNT/A complex.

11. The composition of embodiment 9 or 10, wherein the human serum albumin is recombinant human serum albumin.
12. The composition of embodiment 9 or 10, wherein the human serum albumin is human plasma-derived.
13. The composition of any one of embodiments 1-11, which is animal product free.
14. The composition of any one of embodiments 1-12, which further comprises sodium chloride.
15. The composition of embodiment 14, which comprises about 0.9 mg of sodium chloride per 100 units of the 900 kDa BoNT/A complex.
16. The composition of any one of embodiments 1-15, which does not contain a protease inhibitor.
17. The composition of any one of embodiments 1-16, which does not contain benzamidine hydrochloride.
18. The composition of any one of embodiments 1-17, which comprises about 50 units, about 100 units or about 200 units of the 900 kDa BoNT/A complex.
19. The composition of any one of embodiments 1-18, which has a potency of about $1.5 \times 10^7$ units/mg to about $6.0 \times 10^7$ units/mg. 20. The composition of any one of embodiments 1-19, which is a powdered pharmaceutical composition.
21. The composition of any one of embodiments 1-20, which is vacuum-dried.
22. The composition of any one of embodiments 1-21, wherein the 900 kDa BoNT/A complex is produced by a process that comprises one or more steps of column chromatography.
23. The composition of embodiment 22, wherein the one or more steps of column chromatography comprise hydrophobic interaction chromatography.
24. The composition of embodiment 23, wherein the one or more steps of column chromatography further comprise anion exchange chromatography.
25. The composition of embodiment 23 or 24, wherein the one or more steps of column chromatography further comprise cation exchange chromatography.
26. A method of producing a composition comprising BoNT/A, said method comprising incubating a culture of *Clostridium botulinum* bacteria in a production fermentor in the presence of $CO_2$ in the fermentor headspace overlay during the fermentation process.
27. The method of embodiment 26, wherein the incubating step is performed in the presence of $CO_2$ and $N_2$ in the fermentor headspace overlay during the fermentation process.
28. The method of embodiment 27, wherein the incubating step is performed in the presence of 25% $CO_2$ and 75% $N_2$ in the fermentor headspace overlay during the fermentation process.
29. The method of embodiment 27, wherein the incubating step is performed in the presence of 50% $CO_2$ and 50% $N_2$ in the fermentor headspace overlay during the fermentation process.
30. The method of embodiment 27, wherein the incubating step is performed in the presence of 75% $CO_2$ and 25% $N_2$ in the fermentor headspace overlay during the fermentation process.
31. The method of embodiment 27, wherein the incubating step is performed in the presence of 100% $CO_2$ in the fermentor headspace overlay during the fermentation process.
32. A method of treating a patient in need thereof, comprising administering a composition according to any one of embodiments 1-25.
33. A method substantially as described herein.
34. A composition substantially as described herein.

6. EXAMPLES

Certain embodiments provided herein are illustrated by the following non-limiting examples, which describe different methods for obtaining BoNT/A and demonstrate that using a temperature that is lower than the standard fermentation temperature and increasing the concentration of $CO_2$ during fermentation both can reduce the ratio of the abundance of a 150 kDa BoNT/A species having a C-terminal truncated light chain to the abundance of the 150 kDa BoNT/A species having the full-length light chain.

6.1. Example 1: Methods and Materials for Examples 2-3

1. Upstream Steps
A. Fermentation of *C. Botulinum* Type A Hall Strain with Continuous Flowrate (Overlay) of Varying Percentage Ratio of $CO_2:N_2$ in Headspace.

Fermentations of *Clostridium botulinum* type A Hall strain were conducted in animal-product-free (APF) medium with the continuous flowrate (overlay) of various percentage ratio of $CO_2:N_2$ (as described in Table 2) to examine the impact on attributes of the *botulinum* neurotoxin type A (BoNT/A) complex produced under these conditions. The Upstream stage included using a 40 mL APF seed culture medium in a 150 mL glass bottle (with a magnetic stir bar) (3.25% w/v soy peptone type II, 1.2% w/v yeast extract, 1.5% w/v glucose, pH adjusted to 7.3 using sodium hydroxide). The seed culture medium was reduced to remove oxygen (in a Don Whitley Scientific A55 anaerobic chamber) for a minimum of 48 hours prior to use. The seed culture medium was inoculated with 50 μL of a thawed *C. botulinum* serotype A Hall strain working cell bank. The seed culture was incubated at 35±1° C. with 150 rpm stirring in the anaerobic chamber.

After overnight seed culture incubation, the optical density (at 600 nm) was 8.04 when 4 mL of culture was transferred to a production fermentor (Ambr® 250 Modular, Sartorius Stedim) containing 196 mL of reduced APF fermentation medium (3.25% w/v soy peptone type II, 1.2% w/v yeast extract, 1.5% w/v glucose, pH adjusted to 7.3 using sodium hydroxide). The fermentation temperature was controlled at 35±0.5° C. Agitation was controlled at 150 rpm. The fermentor headspace was overlaid at 50 mL/min gas flowrate with $N_2$ and an increasing percentage of $CO_2$ according to experimental design (Table 2). $N_2/CO_2$ percentage was controlled via internal mass flow controllers of the Ambr® 250 modular system. Fermentation pH and cell growth were monitored by an online pH probe and reflectance monitor, respectively. The three phases for the production fermentation include exponential growth, stationary, and autolysis phases. Fermentation time was 69 hours, which ensured cellular autolysis occurred, releasing active BoNT/A into the culture medium.

TABLE 2

| Description | Condition |
| --- | --- |
| 25% $CO_2$ Fermentation | 25% $CO_2$ with 75% $N_2$ in headspace overlay |
| 50% $CO_2$ Fermentation | 50% $CO_2$ with 50% $N_2$ in headspace overlay |

TABLE 2-continued

| Description | Condition |
| --- | --- |
| 75% CO$_2$ Fermentation | 75% CO$_2$ with 25% N$_2$ in headspace overlay |
| 100% CO$_2$ Fermentation | 100% CO$_2$ in headspace overlay |

*Fermentation medium was reduced with 100% N$_2$ prior to fermentor inoculation. Upon fermentor inoculation with seed culture, the headspace overlay was changed to include the appropriate CO$_2$ percentage listed in this table.

The harvest step utilized centrifugation followed by 0.2 μm filtration to remove cellular debris from the culture broth, which contained BoNT/A complex and other host-cell proteins. Cellular debris was initially removed by centrifugation at 10,000 rcf for 30 minutes. The clarified supernatant was then subjected to 0.2 μm filtration in a biological safety cabinet to ensure any remaining *C. botulimim* type A organism and cellular debris was removed. Complete removal of organism was confirmed (by plating a portion of the 0.2 μm filtrate on reduced Columbia Blood Agar plates and incubating under anaerobic conditions for a sufficient time to verify absence of viable *C. botulinum* type A) and the clarified harvest material was stored at 4° C. until start of the Downstream stage.

B. Low Temperature or Cold-Shock Fermentations of *C. Botulinum* Type A Hall Strain Fermentations of *Clostridium botulinum* type A Hall strain were conducted in animal-product-free (APF) medium under various temperature conditions (as described in Table 3) to examine the effect on attributes of the *botulinum* neurotoxin type A (BoNT/A) complex produced. The Upstream stage included use of a seed culture medium in a 150 mL glass bottle (with a magnetic stir bar) containing 50 mL APF medium (3.25% w/v soy peptone type II, 1.2% w/v yeast extract, 1.5% w/v glucose, pH adjusted to 7.3 using sodium hydroxide). The seed culture medium was reduced to remove oxygen (in a Don Whitley Scientific A55 anaerobic chamber) for a minimum of 48 hours prior to use. The seed culture medium was inoculated with 50 μL of a thawed *C. botulinum* type A WCB. The seed culture was incubated at 35±1° C. with 150 rpm stirring in the anaerobic chamber.

After overnight seed culture incubation, 4 mL of culture (OD$_{600}$ nm 4.81±0.35) was transferred to a production fermentor (Ambr® 250 Modular, Sartorius Stedim) containing 196 mL of reduced APF fermentation medium (3.25% w/v soy peptone type II, 1.2% w/v yeast extract, 1.5% w/v glucose, pH adjusted to 7.3 using sodium hydroxide). The temperature for each fermentation was controlled according to Table 3. Temperature adjustments for cold-shock fermentations were started at the early stationary phase of cell growth. A cold-shock duration of 5 hours was implemented based on expected time to achieve an expression profile change. Agitation was controlled at 150 rpm and the fermentor headspace was overlaid with N$_2$ at 50 mL/min to maintain an anaerobic environment. Fermentation pH and cell growth were monitored by an online pH probe and reflectance monitor, respectively. Offline samples were taken to measure cell density (OD$_{600}$) at the end of fermentation. The three phases for the production fermentation include exponential growth, stationary, and autolysis phases. The fermentation times were varied from 72 hrs to 160 hrs (Table 3) to ensure cell lysis occurred, which released active BoNT/A complex into the culture medium.

TABLE 3

| Experimental Description | Production Fermentation* Condition | Production Fermentation Time (hours) |
| --- | --- | --- |
| Baseline Control Fermentation | 35° C. throughout fermentation period | 72 |
| 20° C. Cold-shock | 35° C. from 0 to 12 hrs; temperature set to 20° C. at 12 hrs; culture at 20° C. until 17 hrs, then temperature set to 35° C. at 17 hrs; culture at 35° C. until 72 hrs | 72 |
| 15° C. Cold-shock | 35° C. from 0 to 12 hrs; temperature set to 15° C. at 12 hrs; culture at 15° C. until 17 hrs, then temperature set to 35° C. at 17 hrs; culture at 35° C. until 72 hrs. | 72 |
| 25° C. Fermentation | 25° C. throughout fermentation period | 160 |

*The Ambr® 250 Modular system can control temperature to within ±0.5° C.

The harvest step of BoNT/E complex utilized centrifugation followed by 0.2 μm filtration to remove cellular debris from the culture broth, which contained BoNT/A complex and other host-cell proteins. Cellular debris was initially removed by centrifugation at 10,000 rcf for 30 minutes. The clarified supernatant was then subjected to 0.2 μm filtration in a biological safety cabinet to ensure any remaining *C. botulimim* type A organism and cellular debris was removed. Complete removal of organism was confirmed (by plating a portion of the 0.2 μm filtrate on reduced Columbia Blood Agar plates and incubating under anaerobic conditions for a sufficient time to verify absence of viable *C. botulimim* type A) and the clarified harvest material was stored at 4° C. until start of the Downstream stage.

2. Downstream Steps

Downstream steps included a concentration and buffer exchange using tangential flow filtration (TFF), followed by a capture of the *botulinum* neurotoxin on an anion exchange column, elution from the column and further separation from impurities by polishing on a cation exchange column.

A tangential flow filtration system was used to concentrate (by ultrafiltration-UF) and diafilter the clarified fermentation harvest material into 50 mM sodium phosphate, pH 6.5 buffer. Repligen TangenX® SIUS PD cassettes with a 100 kDa molecular weight cut off membrane were used for the concentration and diafiltration steps. The UF/DF step concentrated the clarified harvest material 3 to 4-fold and then diafiltered using 50 mM sodium phosphate, pH 6.5 buffer.

Particulars of the ultrafiltration/diafiltration (UF/DF) process used were as follows. The UF/DF unit and Repligen 100 kDa membrane with 0.02 m$^2$ membrane area was initially flushed with a minimum of 0.2 L of water for injection (WFI) to remove the membrane storage solution. Next, the membrane and UF/DF system were equilibrated with approximately 0.2 L of 50 mM sodium phosphate, pH 6.5 buffer. After membrane equilibration, the clarified fermentation harvest material was loaded onto the TangenX® tangential flow filtration cassette and concentrated 3 to 4-fold at a transmembrane pressure range of 5 to 6 psig (pounds per square inch gauge) and flow rate set at 75 mL/min. Following the concentration step, the retentate pool was diafiltered against a minimum of 5 diafiltration volumes of the 50 mM sodium phosphate, pH 6.5 buffer at a transmembrane pressure range of 5 to 8 psig and flow rate set at 75 mL/min. After completion of diafiltration, the pressure was released from the retentate line and the permeate outlet was closed. The UF/DF material was then recirculated for at least 5 minutes and the system was then drained followed by rinsing with 50 mM sodium phosphate, pH 6.5 buffer as the UF/DF material was recovered into a separate container.

The recovered material (UF/DF retentate) from the UF/DF step was then loaded onto an anion exchange chromatography column packed with POROS® 50HQ resin. The column has an inner diameter of 1.13 cm and a column height of about 5 cm. The entire anion exchange column chromatography was performed at ambient temperature, and the flow was in the downward direction. The *botulinum* neurotoxin type A complex was eluted from the anion exchange column using a pH step change where the more negatively charged impurities such as nucleic acids (e.g., DNAs and RNAs) and other host cell proteins remained bound to the anion exchange column.

Particulars of the anion exchange step were: use of the POROS® 50HQ column equilibrated with a 50 mM sodium phosphate, pH 6.5 buffer (at least 5 column volumes). Next the UF/DF retentate was loaded at 120 cm/hour onto the POROS® 50HQ anion exchange column, followed by washing with at least about 10 column volumes of 50 mM sodium phosphate, pH 6.5 at 120 cm/hour, followed by eluting with 50 mM sodium acetate, pH 4.5 at 120 cm/hour. The peak fraction was collected, when the absorbance at 280 nm (A280) increased to at least about 0.05 AU and through the peak maximum to equal or less than about 0.03 AU on the trailing edge, into a container with 5 mL of 50 mM sodium acetate, pH 4.8. This elution pool was stored at about 2° C. to about 8° C. for up to 48 hours.

The second chromatography step in the downstream process used a POROS® 20HS cation exchange chromatography resin packed into a column with an inner diameter of 0.46 cm and a column height of 10.0 cm. The entire POROS® 20HS column chromatography was performed at ambient temperature, and the flow was in the downward direction. The *botulinum* neurotoxin type A complex binds to the POROS® 20HS column at pH 4.8. After wash steps to remove impurities, the bound *botulinum* neurotoxin type A complex was then eluted from the column with increased NaCl concentration. The product-related impurities were eluted with the wash buffer and decontamination solution.

Particulars of the cation exchange step were: use of the POROS® 20HS column equilibrated with a 50 mM sodium acetate, pH 4.8 buffer (at least about 5 column volumes). Next the POROS® 50HQ product pool (collected as described above, fresh or from storage at 2-8° C.) was loaded onto the POROS® 20HS column. The column was then washed with a 50 mM sodium acetate, pH 4.8 buffer (at least about 5 column volumes) and then washed again with 10 column volumes of second buffer (50 mM sodium acetate, 80 mM sodium chloride, pH 4.8 buffer). The *botulinum* neurotoxin type A complex was eluted from the POROS® 20HS column with a 50 mM sodium acetate, 350 mM sodium chloride, pH 4.8 buffer at 290 cm/hour. The eluate was collected into container with 3 mL of 50 mM sodium acetate, pH 4.8 when the A280 increased to about ≥0.02 AU through peak maximum until the A280 of the trailing edge of the elution peak decreased to a value of ≤0.02 AU or until end of the elution step, which had a total of 5 column volumes starting from the end of the second wash step. The POROS® 20HS product pool was stored for the short term at about 2° C. to 8° C. for up to 120 hours. The product pool was next aliquoted into small volume samples and stored for longer term in a freezer at −70° C. prior to analysis.

3. Sample Analysis

AEX-HPLC Analysis

Samples were equilibrated at room temperature for at least 20 minutes. 100 μL of each sample was transferred to a 0.3 mL polypropylene HPLC vial for direct injection. The AEX-HPLC analysis was performed using an Agilent® HPLC with UV detector following the instrument conditions provided in Table 4.

TABLE 4

AEX-HPLC Experimental Conditions

| Parameter | Condition | | |
|---|---|---|---|
| Column | Dionex ProPac WAX-10G, 4 × 50 mm, 10 μm (Part No 055150) | | |
| Column temperature | 25° C. | | |
| Mobile phase A (MPA) | 40 mM Tris-HCl buffer, pH 8.0 | | |
| Mobile phase B (MPB) | 1.00M NaCl + MPA | | |
| Flow rate | 1.00 mL/min | | |
| UV Detection | 220 nm | | |
| Sample Injection volume | Adjust injection volume based on UV concentration to inject 5 μg | | |
| Auto sampler temperature | 5° C. | | |
| Run Time | 35 min | | |
| | Time (min) | % MPA | % MPB |
| Gradient | 0.00 | 100 | 0 |
| | 17.00 | 40 | 60 |
| | 17.20 | 0 | 100 |
| | 22.00 | 0 | 100 |
| | 22.20 | 100 | 0 |
| | 35.00 | 100 | 0 |

The Chromatography data were processed with Waters® Empower 3 software. All peaks not present in the buffer analysis were integrated.

LC-MS Analysis

Samples were reduced with 50 mM TCEP 90 minutes at 37±3° C. The reduced samples were analyzed using Waters Acquity UPLC coupled to a Waters Synapt G2 mass spectrometer. Twenty picomoles of each sample digest were injected for LC MS analysis. Mass spectrometry of the complex components eluting from the reversed phase column was performed using electrospray ionization in positive mode. The LC MS parameters used for the analysis of the samples are provided in Table 5 below.

Raw data was deconvoluted using Waters MassLynx version 4.1 or later with MaxEnt1. The parameters are listed in Table 6 below.

TABLE 5

LC-MS Experimental Conditions

| Sample | Reduced | | | |
|---|---|---|---|---|
| Sample load | 20 picomoles | | | |
| Instrument | Waters Acquity UPLC and Waters Synapt G2 | | | |
| Column | Agilent Zorbax 300SB-C8, 2.1 mm × 150 mm, 3.5 μm | | | |
| Mobile Phase A (MPA) | 0.1% formic acid, 0.01% TFA in water | | | |
| Mobile Phase B (MPB) | 0.1% formic acid, 0.01% TFA in 100% acetonitrile | | | |
| | Time (min) | Flow rate (ml/min) | % MPA | % MPB |
| Gradient | 0 | 0.3 | 95 | 5 |
| | 5.0 | 0.3 | 95 | 5 |
| | 6.0 | 0.1 | 65 | 35 |
| | 30.0 | 0.1 | 45 | 55 |

TABLE 5-continued

LC-MS Experimental Conditions

| | | | |
|---|---|---|---|
| 40.0 | 0.1 | 25 | 75 |
| 42.0 | 0.3 | 25 | 75 |
| 42.1 | 0.3 | 95 | 5 |
| 45.0 | 0.3 | 95 | 5 |

TABLE 6

MassLynx MaxEnt1 Parameters for BoNT/A Sample Analysis

| Parameter | | | Value |
|---|---|---|---|
| Output mass | Range | 150 kDa HC | 97500:98500 |
| | | 150 kDa LC | 49500:50500 |
| | | NTNH | 137500:138500 |
| | | HA48 | 47500:48500 |
| | | HA34 | 33000:34000 |
| | | HA20 | 19500:21000 |
| | | HA17 | 16500:17500 |
| | | Resolution | 0.1 Da/channel |
| Damage model: Uniform Gaussian | Peak width at half height | 150 kDa HC | 0.25 |
| | | 150 kDa LC | 0.30 |
| | | NTNH | 0.21 |
| | | HA48 | 0.33 |
| | | HA34 | 0.44 |
| | | HA20 | 0.48 |
| | | HA17 | 0.61 |
| Minimum intensity ratios | Left | | 33% |
| | Right | | 33% |
| Completion options | | | Iterate to convergence |

Note:
The peak width at half-height value was theoretically determined using the isotope modeling functionality within MassLynx.

6.2. Example 2: BoNT/a Light Chain C-Terminal Truncation Variants were Reduced in Samples Obtained from Fermentation Conditions with Higher $CO_2$ Concentrations Samples obtained from fermentation cultures with different concentrations of $CO_2$ were analyzed with AEX-HPLC. Two peaks corresponding to 150 kDa BoNT/A having a full-length light chain (SEQ ID NO. 2) and 150 kDa BoNT/A having a C-terminal truncated light chain (SEQ ID NO. 4), respectively, were observed (FIG. 1) and are referred to in this disclosure as the full-length 150 kDa peak and the truncated 150 kDa peak, respectively. The truncated 150 kDa peak was eluted at a slightly later time point than the full-length 150 kDa peak. The relative peak areas for the two peaks are shown below in Table 7.

TABLE 7

$CO_2$ Study AEX Data Summary (% Area), UV220 nm

| | full-length 150 kDa | truncated 150 kDa | Total 150 kDa | 150 kDa ratio (truncated: full-length) | truncated 150 kDa (% of Total 150 kDa) |
|---|---|---|---|---|---|
| Baseline Control Fermentation | 3.1 | 12.0 | 15.1 | 3.9 | 79.5% |
| 25% $CO_2$ Fermentation | 7.5 | 7.2 | 14.7 | 1.0 | 49.0% |
| 50% $CO_2$ Fermentation | 9.4 | 6.1 | 15.5 | 0.6 | 39.4% |
| 75% $CO_2$ Fermentation | 9.9 | 4.4 | 14.3 | 0.4 | 30.8% |
| 100% $CO_2$ Fermentation | 10.1 | 3.7 | 13.8 | 0.4 | 26.8% |

Table 5 shows that the truncated 150 kDa peak area was decreased while the full-length 150 kDa peak area was increased in samples obtained from fermentation cultures with higher $CO_2$ concentration. Accordingly, the ratio of the abundance of the truncated 150 kDa to the abundance of the full-length 150 kDa, and the percentage of the abundance of the truncated 150 kDa out of the abundance of the total 150 kDa (i.e., the sum of the abundance of the full-length 150 kDa and the abundance of the truncated 150 kDa) were both reduced in samples obtained from fermentation cultures with higher $CO_2$ concentration.

Samples obtained from fermentation cultures with different concentrations of $CO_2$ were also analyzed with LC-MS. Both full-length light chain (SEQ ID NO. 2, Molecular Weight of ~50025) and C-terminal truncated light chain (SEQ ID NO. 4, Molecular Weight of ~49810) of BoNT/A were identified (FIGS. 2A-2E). It was shown that increasing $CO_2$ concentration during fermentation led to a decreased level of C-terminal truncated light chain (LC) and an increased level of full-length light chain in the produced BoNT/A samples.

6.3. Example 3: BoNT/a Light Chain C-Terminal Truncation Variants were Reduced in Samples from Low Temperature or Cold-Shock Fermentations Samples obtained from fermentation cultures with different fermentation temperatures were analyzed with AEX-HPLC. The same two peaks (full-length 150 kDa and truncated 150 kDa) corresponding to 150 kDa BoNT/A having a full-length light chain (SEQ ID NO. 2) and 150 kDa BoNT/A having a C-terminal truncated light chain (SEQ ID NO. 4), respectively, were observed (FIG. 3). The relative peak area for the two peaks were shown below in Table 8.

TABLE 8

Thermal Study AEX Data Summary (% Area), UV220 nm

| | full-length 150 kDa | truncated 150 kDa | Total 150 kDa | 150 kDa ratio (truncated:full-length) | truncated 150 kDa (% of Total 150 kDa) |
|---|---|---|---|---|---|
| Baseline Control Fermentation | 3.1 | 12.0 | 15.1 | 3.9 | 79.5% |
| 20° C. Cold-shock | 5.7 | 8.7 | 14.4 | 1.5 | 60.4% |

TABLE 8-continued

Thermal Study AEX Data Summary (% Area), UV220 nm

| | full-length 150 kDa | truncated 150 kDa | Total 150 kDa | 150 kDa ratio (truncated:full-length) | truncated 150 kDa (% of Total 150 kDa) |
|---|---|---|---|---|---|
| 15° C. Cold-shock | 6.7 | 8.0 | 14.7 | 1.2 | 54.4% |
| 25° C. Fermentation | 10.0 | 4.9 | 14.9 | 0.5 | 32.9% |

Table 6 shows that the truncated 150 kDa peak area was decreased while the full-length 150 kDa peak area was increased in samples obtained from fermentation cultures with either cold-shock or continuous low temperature. Accordingly, the ratio of the abundance of the truncated 150 kDa to the abundance of the full-length 150 kDa, and the percentage of the abundance of the truncated 150 kDa out of the abundance of the total 150 kDa (i.e., the sum of the abundance of the full-length 150 kDa and the abundance of the truncated 150 kDa) were both reduced in samples obtained from fermentation cultures with either cold-shock or continuous low temperature.

Samples obtained from cultures with different fermentation temperatures were also analyzed with LC-MS. Both full-length light chain (SEQ ID NO. 2, Molecular Weight of ~50025) and C-terminal truncated light chain (SEQ ID NO. 4, Molecular Weight of ~49810) BoNT/A were identified (FIG. 4). It was shown that either cold-shock or continuous low temperature during fermentation led to a decreased level of C-terminal truncated light chain (LC) and an increased level of full-length LC in the produced BoNT/A samples.

6.4. Example 4: SEC-HPLC Analysis of Samples from Low Temperature or Cold-Shock Fermentations Samples were equilibrated at room temperature for at least 20 minutes. 100 μL of each sample was transferred to a 0.3 mL polypropylene HPLC vial for direct injection. The SEC-HPLC analysis was performed using a Waters® HPLC with UV detector following the instrument conditions provided in Table 9.

TABLE 9

| SEC-HPLC Experimental Conditions | |
|---|---|
| Column | Sepax SRT SEC-500, 7.8 × 300 mm, 5-micron (PN 215500-7830) |
| Column temperature | 30° C. |
| Mobile phase | 40 mM Sodium Phosphate + 200 mM Ammonium Sulfate, pH 6.5 |
| Flow rate | 0.8 mL/min |
| UV Detection | 220 nm |
| Injection volume | Adjust injection volume based on UV concentration to inject 20 μg |
| Auto sampler temperature | 5° C. |
| Run time | 20 minutes |

The chromatography data were processed with Waters® Empower 3 software. The higher molecular weight species elute early than the lower ones. All peaks not present in the buffer analysis were integrated. The relative peak area of each peak were reported.

SEC data (% Area) at UV220 nm are shown below in Table 10.

TABLE 10

| | | HCP (<100 KDa) |
|---|---|---|
| Baseline Control Fermentation | AEC | 15.2 |
| 20° C. Cold-shock | | 0.0 |
| 15° C. Cold-shock | | 1.5 |
| 25° C. Fermentation | | 31.3 |
| Baseline Control Fermentation | CEC | 0.0 |
| 20° C. Cold-shock | | 0.0 |
| 15° C. Cold-shock | | 0.0 |
| 25° C. Fermentation | | 3.6 |

Table 10 shows that the percentage of the host cell protein (HCP) was reduced in both 20° C. and 15° C. cold shock conditions compared to the baseline control fermentation condition after the single anion exchange column (AEC) purification, whereas 25° C. continuous cold fermentation condition had a higher percentage of HCP compared to the baseline control. After the two-column (i.e., AEC followed by CEC) purification process, HCP in the 25° C. continuous cold fermentation condition is higher than 3% while it is undetectable in both the baseline control and the cold-shock conditions.

6.5. Example 5: Non-APF (Schantz) Process for Obtaining a *Botulinum* Toxin

This example sets forth the prior art Schantz process for obtaining *botulinum* neurotoxin. The process is a non-APF process using animal derived media and reagents (i.e., beef blood agar plates for culturing, casein in the fermentation medium and use of Rnase and Dnase enzymes for *botulinum* neurotoxin purification). The Schantz process has about 16 to 20 major steps, for production scale work uses a 115 L fermentor and takes about 3 weeks to complete. The Schantz process is commenced by thawing a non-APF *Clostridium botulinum* master cell bank (MCB) vial to room temperature followed by four cultivation steps. First to select colonies with a suitable morphology, aliquots from the thawed MCB vial are streaked on pre-reduced Columbia blood agar (CBA) plates and anaerobically incubated for 30-48 hours at 34° C.±1° C. Second, selected colonies are inoculated into 9 mL test tubes containing a casein growth medium for 6-12 hours at 34° C. The contents of the 9 mL tube with the most rapid growth and highest density (growth selection step) are then further cultivated through two step-up anaerobic incubations (the third and fourth cultivation steps), being a 12-30 hour incubation at 34° C. in a 600 mL to 1 L seed cultivation bottle, followed by a cultivation in a 15 L to 25 L seed fermentor containing a casein growth medium for 6-16 hours at 35° C. These two step-up cultivations are carried out in a nutritive media containing 2% casein hydrolysate (a casein [milk protein] digest), 1% yeast extract and 1% glucose (dextrose) in water at pH 7.3.

The step-up cultivations are followed by a further incubation for 60-96 hours at 35° C. in a commercial scale (i.e., 115 L) production fermentor in a casein containing medium under a controlled anaerobic atmosphere. Growth of the bacterium is usually complete after 24 to 36 hours, and during the fermentation step carried out for about 65 to about 72 hours where most of the cells undergo lysis and release *botulinum* neurotoxin. It is believed that toxin is liberated by cell lysis and activated by proteases present in the media. A filtrate of the culture medium can be prepared using a single layer depth filter to remove gross impurities (i.e., whole and ruptured cells) thereby obtaining a clear solution referred to as a clarified culture. Collection of *botulinum* neurotoxin from clarified culture is accomplished by lowering the pH of the clarified culture to pH 3.5 with 3M sulfuric acid to precipitate the raw toxin at 20° C. (acidification precipitation). The raw botulinum neurotoxin is then concentrated (to achieve a volume reduction) by ultramicrofiltration (microfiltration) (referred to as MF or UF) followed by diafiltration (DF). A 0.1 µm filter is used for the microfiltration step.

The harvested crude or raw toxin is then transferred to a digestion vessel and stabilized by addition of the protease inhibitor benzamidine hydrochloride. Dnase and Rnase are added to digest (hydrolyze) nucleic acids. The toxin is then extracted with pH 6.0 phosphate buffer and cell debris removed by clarification. Hydrolyzed nucleic acids and low molecular weight impurities are then removed by further UF and DF steps. Next three sequential precipitation steps (cold ethanol, hydrochloric acid and ammonia sulfate precipitations) are carried out. The purified *botulinum* neurotoxin complex (bulk toxin) is stored as a suspension in a sodium phosphate/ammonium sulfate buffer at 2° C. to 8° C.

Completion of this Example 5 Schantz (non-APF) process, including the harvesting and purification steps, takes about two to three weeks. The resulting bulk *botulinum* neurotoxin is a high quality suspension of 900 kDa *botulinum* toxin type A complex made from the Hall A strain of *Clostridium botulinum* with a specific potency of $\geq 2 \times 10^7$ U/mg, an $A_{260}/A_{278}$ of less than 0.6 and a distinct pattern of banding on gel electrophoresis, and suitable for use for the compounding of a *botulinum* toxin pharmaceutical composition.

*Botulinum* neurotoxin can also be obtained from an APF, non-chromatographic process, as set forth in Example 7 of U.S. Pat. No. 7,452,697, the complete APF, non-chromatographic process (from beginning of culturing to end of all purification and processing steps) taking about two to three weeks to complete. Alternately, *botulinum* neurotoxin can also be obtained from an APF, chromatographic process, as set forth in Example 16 of U.S. Pat. No. 7,452,697, the APF, chromatographic process (from beginning of culturing to end of all purification and processing steps) taking a week or longer to complete.

6.6. Example 6: APF, Column Chromatographic Systems and Processes for Obtaining a *Botulinum* Neurotoxin Rapid APF, anion-cation chromatographic based systems and processes are developed for obtaining high yield, high purity *botulinum* neurotoxin. The process of this Example 6 for production purposes (that is to obtain gram quantities of the final *botulinum* neurotoxin) uses a 20 L fermentation vessel and takes only 4-7 days, preferably about 4 to about 6 days, to complete all step of the process from initiation of culturing to completion of final purification and toxin storage. Apparatus utilized in the systems herein disclosed are discussed below. Chromatographic media processes are developed and are set forth herein. These chromatographic media processes use one, two, or three of the following: hydrophobic interaction chromatography (HIC), anion exchange chromatography, cation exchange chromatography. Specifically, the chromatographic media processes that are developed include: (1) a one media process that uses HIC; (2) a two media process that uses HIC followed by anion exchange chromatography; (3) a two media process that uses HIC followed by cation exchange chromatography; (4) a three media process that uses HIC followed by anion exchange chromatography followed by cation exchange chromatography; (5) a three media process that uses HIC followed by cation exchange chromatography followed by anion exchange chromatography; (6) a one media process that uses anion exchange chromatography; (7) a two media process that uses anion exchange chromatography followed by HIC; (8) a two media process that uses anion exchange chromatography followed by cation exchange chromatography; (9) a three media process that uses anion exchange chromatography followed by HIC followed by cation exchange chromatography; (10) a three media process that uses anion exchange chromatography followed by cation exchange chromatography followed by HIC; (11) a one media process that uses cation exchange chromatography; (12) a two media process that uses cation exchange chromatography followed by HIC; (13) a two media process that uses cation exchange chromatography followed by anion exchange chromatography; (14) a three media process that uses cation exchange chromatography followed by HIC followed by anion exchange chromatography; and (15) a three media process that uses cation exchange chromatography followed by anion exchange chromatography followed by HIC. The HIC removes impurities such as a 49 kDa impurity (which turns out to be a host cell glucose phosphate isomerase, as discussed below).

6.6.1. Preparation of Working Cell Bank

A new *Clostridium botulinum* cell bank is developed (for use to initiate the culturing step) without use of Columbia blood agar plates, and which removes the need for colony selection prior to cultivation and also eliminates the need to carry out the Shantz process step up tube cultivation and multiple seed (cultivation) steps.

For this purpose, a previously established Schantz master cell bank (MCB) is used to create an APF research cell bank (RCB) from which a new APF master cell bank (MCB) and a subsequent working cell bank (WCB) are generated. A research cell bank (RCB) is made from a colony from the Schantz (NAPF) MCB. To remove the animal-derived protein from the MCB vial, the cells are washed twice in APF medium containing 2% w/v SPTII (Soy Peptone type II), 1% w/v yeast extract, and 1% w/v glucose. The cells are plated on APF medium under strict anaerobic conditions using a Modular Atmosphere Controlled System (MACS) anaerobic chamber. An isolated colony is further expanded and stored in APF medium containing about 20% glycerol below −135° C.

The APF-MCB is made under GMP conditions by expanding the RCB into oxygen-free APF medium (200 mL, reduced for a minimum of 12 hours in an anaerobic chamber) and cultured in a MACS anaerobic chamber at 34.5° C.±1° C. (stirred at 60 rpm) until the $OD_{540}$ of the culture reaches 2.5±1.0 AU. Sterile glycerol is added to the resultant culture to a final concentration of about 20% after which the mixture is transferred into cryovials at 1 mL/vial (APF- MCB vials). The vials are flash frozen in liquid nitrogen, and then stored below −135° C. An APF-WCB is made under GMP conditions by expanding as above. The resultant APF cell banks are characterized for identity, purity, viability and genetic stability.

6.6.2. Upstream Steps (Culturing and Fermentation)

The Example 6 processes have two general stages: an upstream stage and a downstream stage. The upstream stage includes expansion of a starting cell line (growth and reproduction of Clostridium botulinum bacteria in a substantially APF culture medium), fermentation, harvest (removal of cellular debris) to provide a clarified, harvested culture that is then concentrated and diluted. Thus, in this example the steps of an exemplary three column process can include culturing, fermentation, harvest filtration, concentration, HIC, capture (anion) chromatography, polishing (cation) chromatography, buffer exchange, bioburden reduction and vial fill.

The upstream stage includes use of a culture medium in a 1 L bottle containing 400 mL of reduced (in an anaerobic chamber) seed APF culture medium (2% w/v SPTII, 1% w/v yeast extract, (adjusted to pH 7.3 with 1 N sodium hydroxide and/or 1 N hydrochloric acid prior to autoclaving)) 1% w/v sterile glucose added post autoclaving of culture media). The culture (seed) medium is inoculated with 400 µL of a thawed Clostridium botulinum WCB. Incubation/culturing occurs at 34.5° C.±1.0° C. with 150 rpm agitation in an anaerobic chamber.

When the optical density of the culture medium at 540 nm is 1.8±1.0 AU, the entire contents of the 1 L bottle (approximately 400 mL) are transferred to a 20 L production fermentor containing APF fermentation medium adjusted with 1 N sodium hydroxide and/or 1 N hydrochloric acid post-steam sterilization to pH 7.3, fermentation medium composed of 3.25% w/v SPTII, 1.2% w/v yeast extract, 1.5% w/v sterile glucose (added post sterilization; sterilization, e.g. at about 122° C. for 0.5 hour). The temperature and agitation are controlled at 35° C.±1° C. and 70 rpm, respectively. Nitrogen overlay is set at 12 slpm and headspace pressure set at 5 psig to maintain an anaerobic environment for cell growth. Fermentation pH and cell density are monitored by pH and online turbidity probes, respectively. The three phases for the production fermentation include exponential growth, stationary, and autolysis phases. Cellular autolysis, which releases active BoNT/A complex into the culture medium, is observed to occur consistently between 35 hours and the end of fermentation. At the end of fermentation, the culture is cooled to 25° C. for harvest.

Once the fermentation medium is cooled to 25° C., the cell debris is separated from the botulinum neurotoxin type A complex containing lysate by depth filtration, first through a 5-0.9 µm nominal retention rating gradient pre-filter to remove cell debris, and then through a positively charged 0.8-0.2 µm nominal retention rating gradient to remove DNA (removal of up to about 80%). Both filters are rinsed together with 20 L of water for injection (WFI) before use. A minimum of 15 L of the filtrate is required for further processing, and any excess material is decontaminated after in-process sampling is complete. The filtrate is stored at 4° C. if not immediately processed by ultrafiltration.

Within a biosafety cabinet (BSC) the filtrate from the harvest step is concentrated from 15 L to 5±0.5 L using a hollow fiber, tangential flow filtration (TFF) membrane from GE Healthcare. The ultrafiltered material is then diluted with 10 mM sodium phosphate pH 6.5 buffer to a final volume of 20 L. This material is purified by use of one chromatography column, two chromatography columns or three chromatography columns (see the Downstream Steps section). The diluted, ultrafiltered harvest material is stored at 4° C. if not immediately processed by purification.

In the Schantz process the culture step is ended and the fermentation step begins based on time and visual observation of culture growth. In contrast, in the Example 6 processes determination of when to end the culturing step is based on analysis of culture fluid optical density, which ensures that the culture is in the logarithmic growth phase at the time of commencement of the fermentation step, and permits reduction of duration of the culturing step to about 8 hours to about 14 hours. The OD parameter terminated culture step maximizes the health of the cultured cells and encourages robust and abundant botulinum toxin resulting from the fermentation step. The average optical density (at 540 nm) of the culture medium at conclusion of culturing is 1.8 AU. The average duration of the fermentation step is 72 hours and the average final turbidity ($A_{890}$) of the fermentation medium at conclusion of the fermentation step is 0.15 AU. The average amount of botulinum toxin type A complex present (as determined by ELISA) in the 20 L fermentation medium (whole broth) at the end of the fermentation step for is about 64 µg botulinum toxin type A complex/mL fermentation medium.

The harvest step uses depth filtration to remove cell debris and nucleic acids, followed by ultrafiltration and dilution to prepare the fermentation medium for the next step in the process. This harvesting/cell debris clearing is fundamentally different from the Schantz harvest process, which uses precipitation by acidification followed by microfiltration and diafiltration to concentrate and exchange buffers in preparation for further processing.

6.6.3. Downstream Steps (Purification)

Downstream steps include purification by one chromatography column, two chromatography columns, or three chromatography columns (for example, capture of the botulinum neurotoxin on an anion exchange column, elution from the column and further separation from impurities by polishing on a cation exchange column, and preferably (in the three column process), passage of eluent containing desired botulinum neurotoxin through a third column, preferably a hydrophobic interaction column (e.g. chromatography), before (preferably) or after the two-column process), followed by concentration and buffer exchange using tangential flow filtration (TFF), and bioburden reduction (e.g. by further filtration using a 0.2 µm filter) to a final botulinum neurotoxin type A complex optimized for cold storage, preferably freezing, and eventual compounding into a botulinum neurotoxin type A complex pharmaceutical composition. The sequence of the chromatography and filtration stages is intended to remove product and process-related impurities, to remove potential adventitious agents and to control the botulinum neurotoxin type A complex concentration and buffer matrix of the final botulinum neurotoxin type A in order to provide a more stable drug substance.

Several embodiments of exemplary two-column and three-column downstream processes are described below. Additional embodiments are contemplated in which the order of the columns is changed, and the procedures are adjusted accordingly as deemed appropriate in the opinion and judgment of a person skilled in the art, but which are otherwise similar to or essentially identical to the embodiments described below. Further embodiments of one-column downstream processes are also contemplated, which embodiments involve the use of only one chromatography column but are otherwise similar to or essentially identical to the embodiments described below. Specifically, this example contemplates a three-column downstream process that involves (1) the use of HIC followed by anion exchange chromatography followed by cation exchange chromatography, (2) the use of HIC followed by cation exchange chromatography followed by anion exchange chromatography, (3) the use of anion exchange chromatography followed by HIC followed by cation exchange chromatography, (4) the use of anion exchange chromatography followed by cation exchange chromatography followed by HIC, (5) the use of cation exchange chromatography followed by HIC followed by anion exchange chromatography, or (6) the use of cation exchange chromatography followed by anion exchange chromatography followed by HIC. This example also contemplates a two-column downstream process that involves (1) the use of HIC followed by anion exchange chromatography, (2) the use of HIC followed by cation exchange chromatography, (3) the use of anion exchange chromatography followed by HIC, (4) the use of anion exchange chromatography followed by cation exchange chromatography, (5) the use of cation exchange chromatography followed by HIC, or (6) the use of cation exchange chromatography followed by anion exchange chromatography. This example also contemplates a one-column downstream process that involves the use of HIC, the use of anion exchange chromatography, or the use of cation exchange chromatography.

A first detailed embodiment of an exemplary three-column downstream process carried out is as follows. Clarified (diluted) ultrafiltered material (20 L, as disclosed above) is passed through a POROS® 50HQ anion exchange chromatography resin, the captured botulinum neurotoxin is eluted from the anion exchange column and then run through a POROS® 20HS cation exchange chromatography resin, the eluent from which is run through a Phenyl Sepharose HP chromatography resin. Eluent from the HIC column is subjected to 100 kDa tangential flow filtration, followed by 0.2 μm filtration. The resulting *botulinum* neurotoxin type A complex is frozen for storage.

In this first embodiment of the exemplary three-column downstream process, the first chromatography step of the downstream process uses a POROS® 50HQ anion exchange chromatography resin packed into a column with an inner diameter of about 8 cm and a column height of about 15 cm. The entire POROS® 50HQ column operation is completed at ambient temperature, and the flow is in the downward direction. The *botulinum n*eurotoxin type A complex is eluted from the anion column using a pH step change where the more negatively charged components such as nucleic acids (e.g. DNAs and RNAs) and other host cell proteins remain bound to the anion exchange column.

Particulars of the anion exchange step are: use of the POROS® 50HQ column using 0.1 N sodium hydroxide for a minimum contact time of 30 minutes (at least about 3 column volumes, at 230 cm/hour). The column is then equilibrated with a 50 mM sodium phosphate, pH 6.5 buffer (at least 5 column volumes). Next the clarified ultrafiltered and diluted material (i.e. processed lysate APF fermentation material) is loaded at 230 cm/hour onto the POROS® 50HQ anion exchange column, followed by washing with at least about 20 column volumes of 50 mM sodium phosphate, pH 6.5 at 230 cm/hour until absorbance at 280 nm of column effluent decreases to 0.10 AU, followed by eluting with 50 mM sodium acetate, pH 4.8 at 230 cm/hour. The product pool is collected, when the absorbance at 280 nm ($A_{280}$) increases to at least about 0.15 AU and through the peak maximum to equal or less than about 0.2 AU on the trailing edge, into a vessel containing 1 column volume of 50 mM sodium acetate, pH 4.8. This elution pool is stored at about 2° C. to about 8° C. for up to 48 hours.

The second chromatography step in this first embodiment of the exemplary three-column downstream process of this Example 6 uses a POROS® 20HS cation exchange chromatography resin packed into a column with an inner diameter of 8 cm and a column height of 5 cm. The entire POROS® 20HS column operation is completed at ambient temperature, and the flow is in the downward direction. The *botulinum* neurotoxin type A complex associates with the POROS® 20HS column resin. The *botulinum* neurotoxin type A complex is then eluted from the column using a salt step change. The product-related impurities are eluted with the wash buffer and decontamination solution.

Particulars of the cation exchange step are: use of the POROS® 20HS column using 0.1 N sodium hydroxide solution for a minimum contact time of 30 minutes (at least about 3 column volumes, at 230 cm/hour). The column is then equilibrated with a 50 mM sodium acetate, pH 4.8 buffer (at least about 5 column volumes). Next the POROS® 50HQ product pool (collected as described above, fresh or from refrigeration) is loaded onto the POROS® 20HS column. The column is then washed with a 50 mM sodium acetate, pH 4.8 buffer (at least about 3 column volumes) and then washed again with a 50 mM sodium acetate, 150 mM sodium chloride, pH 4.8 buffer. The *botulinum* neurotoxin type A complex is eluted from the POROS® 20HS column with a 50 mM sodium acetate, 250 mM sodium chloride, pH 4.8 buffer at 200 mL/min, the eluate is diverted into a bioprocess collection bag (containing 1 column volume of 50 mM $NaH_3C_2O_2$, pH 4.8) when the $A_{280}$ increases to about ≥0.1 AU through peak maximum until the $A_{280}$ of the trailing edge of the elution peak decreases to a trailing edge value of ≤0.1 AU. The POROS® 20HS product pool is stored in the collection bag at ambient temperature for up to about 6 hours.

In this first embodiment of the exemplary three-column chromatography media process of this Example 6, eluent from the second (cation exchange) column is passed through a HIC column. The HIC column used is a Phenyl Sepharose HP hydrophobic interaction chromatography resin packed into a column with an inner diameter of about 8 cm and a column height of about 5 cm. The entire Phenyl Sepharose HP column operation is completed at ambient temperature, and the flow is in the downward direction. The *botulinum* neurotoxin type A complex is eluted from the column using a decreasing salt step change. The impurities are eluted during the load and with the wash buffer and decontamination solution.

Particulars of the hydrophobic interaction chromatography step are: a Phenyl Sepharose HP column is initially sanitized with a 0.1 N sodium hydroxide solution for a minimum contact time of 30 minutes (with at least about 3 column volumes of a 0.1 N sodium hydroxide solution at 200 cm/hour). The column is then equilibrated with at least about 5 column volumes of 50 mM sodium acetate, 0.4 M ammonium sulfate, pH 4.8 buffer. Next the POROS® 20HS (cation exchange column) product pool (from above) is combined 1:1 with a 50 mM sodium acetate, 0.8 M ammonium sulfate, pH 4.8 buffer and loaded onto the Phenyl Sepharose HP column. The column is first washed with at least about 3 column volumes of a 50 mM sodium acetate, 0.4 M ammonium sulfate, pH 4.8 buffer, and then washed with a 50 mM sodium phosphate, 0.4 M ammonium sulfate, pH 6.5 buffer. *Botulinum* neurotoxin type A complex is eluted from the column with a 10 mM sodium phosphate, 0.14 M ammonium sulfate, pH 6.5 buffer. The eluate is diverted into a bioprocess collection bag when the $A_{280}$ increases to ≥0.05 AU. The eluate is collected until the $A_{280}$ of the trailing edge of the elution peak decreases to a value of ≤0.05 AU. The Phenyl Sepharose HP product pool is stored in the collection bag at ambient temperature for up to 6 hours.

A tangential flow filtration system is used to concentrate and diafilter the Phenyl Sepharose HP chromatography step product pool into the drug substance formulation buffer. Pall® Filtron Minimate cassettes with a 100 kDa molecular weight cut off membrane are used for the concentration and diafiltration steps. The formulated material is then passed through a Pall Mini Kleenpak® 0.2 µm filter to reduce the potential bioburden. The UF/DF step concentrates the Phenyl Sepharose HP product pool (eluent of the HIC column) to a BoNT/A complex concentration of 0.7 g/L and diafilters the concentrated material with a 10 mM potassium citrate, pH 6.5 buffer.

Particulars of the ultrafiltration/diafiltration process used are as follows. The UF/DF unit and Pall 100 kDa polyether sulfone membrane is initially flushed with a minimum of 5 L of water for injection (WFI) to remove the packing solution and sanitized with a minimum of 200 mL of a 1 N sodium hydroxide solution under recirculation conditions for a minimum of 10 minutes, preferably at least 30 minutes, to sanitize the UF/DF unit. Next the membrane and UF/DF system are equilibrated with sufficient volumes of the 10 mM potassium citrate, pH 6.5 formulation buffer until permeate and retentate pH is pH 6.5. After that the Phenyl Sepharose HP product pool is loaded onto the Minimate® tangential flow filtration cassette and the HIC eluate concentrated to 0.7 g/L. Following the concentration step, the retentate pool is diafiltered against a minimum of 5 diafiltration volumes of the drug substance formulation buffer (10 mM potassium citrate, pH 6.5) at a transmembrane pressure of 7.5 psig (pounds per square inch gauge). The permeate outlet is then closed and the UF/DF system run for at least 2 minutes and the system rinsed with 50 mL of 10 mM potassium citrate, pH 6.5 formulation buffer. After the rinse, the concentration of BoNT/A complex in the retentate pool is determined by measuring the offline $A_{278}$ and based on the $A_{278}$ reading, the concentration of the retentate pool is adjusted to 0.5 g/L with 10 mM potassium citrate, pH 6.5 buffer. The concentration-adjusted retentate pool is then filtered through a Pall Mini Kleenpak™ 0.2 µm filter to reduce potential bioburden. The filtered concentration-adjusted retentate pool is stored in a collection bag at 2° C.-8° C. for up to 2 days.

The final purified *botulinum* neurotoxin type A complex obtained is filled into 1 mL Nunc® cryovials at 700 µL per vial and stored frozen. The filling operation is carried out in a class 100 biosafety cabinet at ambient temperature.

The downstream process (including use of 1 or 2 or 3 chromatography columns) is completed in only 1 to 3 days and the *botulinum* neurotoxin type A complex obtained is stored frozen in a potassium citrate, pH 6.5 buffer at a concentration of 0.5 g/L as a solution. In comparison, the Schantz downstream (toxin purification) process uses multiple filtration, precipitation, extraction and centrifugation steps to purify the *botulinum* neurotoxin type A complex and requires 1-2 weeks to complete just the downstream steps, and the resultant drug substance (recovered *botulinum* neurotoxin) is stored refrigerated as an ammonium sulfate suspension at a concentration of approximately 2.7 g/L. The use of chromatography instead of precipitation and the reduced processing time results in a significantly improved, consistent downstream process, as herein disclosed.

In accordance with one aspect, concentrations of vegetable-based products, such as soy-based products, can be Soy Peptone Type II Hy-Soy® or SE50MK (a Kosher soy peptone) in culture and fermentation media. Hy-Soy® in the seed culture medium can range between 10-200 g/L. Preferably, the concentration of Hy-Soy® in the seed medium ranges between 15-150 g/L. Most preferably, the concentration of Hy-Soy® in the seed medium is approximately between about 20-30 g/L or an amount therebetween. The concentration of glucose in seed medium can range between 0.1 g/L and 20 g/L. Preferably, the concentration of glucose ranges between 0.5-15 g/L. Most preferably, the concentration of glucose in the culture medium is approximately 10 g/L. Yeast extract amounts can be from about 5-20 g/L, more preferably from about 10-15 g/L or an amount therebetween. For example, the pH of the culture medium prior to growth of *Clostridium botulinum* can be approximately pH 7.0-7.5, or therebetween, preferably pH 7.3.

As an example, Hy-Soy® amounts in the production fermentation medium can range between 10-200 g/L. Preferably, the concentration of Hy-Soy® in the fermentation medium ranges between 15-150 g/L. Most preferably, the concentration of Hy-Soy® in the fermentation medium is approximately between about 20-40 g/L or an amount therebetween. The concentration of glucose in fermentation medium can range between 0.1 g/L and 20 g/L. Preferably, the concentration of glucose ranges between 0.5-15 g/L or an amount therebetween. Not necessarily, but as above, the glucose can be sterilized by autoclaving together with the other components of the fermentation medium. The pH level of the fermentation medium prior to growth can be pH 7.0-7.8, preferably about 7.0-7.5 or therebetween, more preferably pH 7.3.

An embodiment of an exemplary two-column downstream process comprises the following steps: (a) culturing bacteria, such as *Clostridium botulinum* bacteria from an APF WCB vial, in a seed/culturing bottle, (b) then fermenting *Clostridium botulinum* bacteria in a fermentor (toxin production fermentor) having APF fermentation medium to expand the cell line, proceeding with fermentation and *botulinum* toxin production until a desired cell lysis phase is reached. Next, (c) harvesting (e.g. clarifying by filtration,) the APF fermentation medium to obtain a harvested fermentation medium, (d) proceeding with concentration and dilution resulting in a diluted harvested fermentation medium that is (e) passed through a capture column to remove impurities, (f) contacting eluent from the capture column with a polishing column to further remove impurities, and optionally a second polishing column (g) concentration and buffer exchange of the polishing column eluent, (h) followed by bioburden reduction filtration and the (i) filling of vials.

In one example, the fermentation volume is 20 L, the total process time for all steps is only 4 to 6 days, and high *botulinum* neurotoxin yield is obtained.

The following provides more details of a particular embodiment within the scope of our invention. The fermentation step is carried out in APF medium using a 30 L stainless steel fermentor.

In this example below, a much-reduced volume of fermentation medium is used while still providing a high yield of high potency *botulinum* neurotoxin type A complex. By using the following protocol, only 20 L or less, for example, of APF fermentation medium is required, instead of the typically larger, previous volumes (e.g. 115 L) of fermentation medium required for producing commercially useful amounts for obtaining a *botulinum* neurotoxin.

The MACS anaerobic workstation (Don Whitley) with airlock provides an oxygen-deficient environment in which to manipulate anaerobic organisms. Access to and egress from the chamber is via a porthole system, comprises of inner and outer doors. The unit is temperature controlled to maintain a user setting within the chamber. A humidistat-controlled condensing plate ensures the effective removal of excess moisture in the chamber. The chamber is illuminated for operator use and alarm for: low gas pressure, continuous gas flow, and loss of power conditions. The chamber is equipped with a HEPA filter to reduce viable and non viable particulate levels in the anaerobic chamber. Anaerobic conditions are maintained utilizing the "Anotox" and Palladium Deoxo "D" Catalyst atmospheric scrubbing system. Condensate water from the condensing plate is collected and piped to an external reservoir where it is removed.

As disclosed above, an APF process is used for preparation of an APF WCB, having cell bank vials stored below −135° C. An APF WCB cell bank vial is thawed at room temperature for about 15 min before culture medium inoculation, followed by a single cultivation step as disclosed above to establish a "seed" culture. This is carried out in a modular atmospheric controlled system utilizing aseptic techniques throughout, to minimize bioburden. The modular atmospheric controlled system is cleaned before undertaking inoculation of the completed seed culture vial with APF WCB vial contents. Culture medium is prepared using 1 N hydrochloric acid and 1 N sodium hydroxide (for pH adjustment), D(+) Glucose, Anhydrous (Mallinckrodt Baker, Cat #7730, 4.00 g), Soy Peptone Type II (SPTII) (Marcor, Cat #1130, 8.00 g), Water for Injection (WFI) 400.0 mL and Yeast Extract (YE) (BD Cat #212730, 4.00 g). The soy peptone Type II and yeast extract solution is made by measuring 300 mL of WFI with a 500 mL graduated cylinder and poured into a seed culture bottle. The seed culture bottle is placed onto a stirrer and the stirrer activated. 8.00 g of SPTII and 4.00 g of yeast extract is added to the seed culture bottle and mixed until dissolved. If dissolution is not complete after mixing, the mixture will be heated on low setting. The pH is measured and adjusted to about 7.30±0.05. The medium solution is brought up to about 360 mL with WFI. The seed culture bottle is adequately vented to allow steam and gas transfer. A 10% Glucose solution (w/v) is prepared by measuring about 30 mL of WFI with a 100 mL graduated cylinder and placed into the pre-assembled glucose addition bottle, which is placed onto a stirrer and the stirrer activated. About 4.00 g of glucose is added to the glucose addition bottle and mixed until dissolved (low heat is used if necessary to a dissolution) and qs (quantity sufficient) glucose solution to 40 mL with WFI. The glucose addition is then capped loosely with vent cap. Both the glucose and seed culture bottles are autoclaved at 123° C. for 30 minutes for sterilization. After sterilization, both items are removed from the autoclave and left to cool in a bio-safety cabinet. After cooling aseptically, 10% of the glucose solution is transferred into the seed culture bottle containing the yeast extract and soy peptone II solution and mixed, thereby providing a completed seed culture bottle.

This completed seed culture bottle is placed into the pre-cleaned MACS (wherein a prepared anaerobic indicator is placed). The cap of the completed seed culture bottle is loosened. The completed seed culture bottle is then placed on a stir plate within the MACS (stir plate activated to about 150 rpm) and the medium in the completed seed culture bottle is reduced for a minimum of 12 hours at about 34.5° C.+/−1° C. within the MACS, after which a 1 mL medium blank is sampled for optical density measurement (for biomass determination at 540 nm). Afterwards, the completed seed culture bottle, in the MACS (anaerobic) is inoculated. An APF WCB culture vial is obtained from the frozen cell bank and brought into the MACS. The vial is thawed for about 10-15 minutes, after which about 400 μL of the vial contents are placed directly into the medium in the completed seed culture bottle. The cap on the completed seed culture bottle is loosened completely and the cap is rested on top of the bottle and the stir pace is set to 150 rpm. After at least about 11 hours of incubation in the MACS, fermentation production is undertaken, as described below.

Probes (e.g. redox probe, pH probe, turbidity probe, e.g. by Broadley James and Optek) and sequence configuration of the fermentor, such as a 30 L stainless steel fermentor, are checked and calibrated, and inserted into their respective fermentor ports and tightened in place. For example, a fermentor can be a ABEC 30 L (VT) Fermentor System consisting of a 30 L volume fermentor vessel, an agitator drive system, piping assembly for utility connections (CIP, clean steam, CDA, Nitrogen, Oxygen, Process Chilled Water, bio-waste, and plant steam), instrumentation (pH, temperature, pressure, ReDox, optical density, and mass flow), and four peristaltic pumps. The bottom mounted agitator speed is controlled using an Allen-Bradley variable frequency drive (VFD). Semi-automatic and automatic control of the system is handled by an Allen-Bradley Control-Logix PLC with programming. The system is designed to provide closed-loop PID (proportional-integral-derivative) control of culture temperature, pressure, pH, and redox during fermentation operations. An Allen-Bradley Device-Net® (an open device level network) is utilized for control and communication with devices and sensors on the skid.

For sterile hold, equilibrium, run and harvest modes, agitation, temperature, pressure and Nitrogen overlay are operated with the following set points.

For sterile hold and equilibrium mode:

| Controlled Parameter | Set Points and Range |
|---|---|
| Agitation | 100 rpm ± 10 |
| Nitrogen Overlay | 12 SLPM ± 2 |
| Fermentor Pressure | 5 psig ± 1 |
| Fermentor Temperature | 35 ± 1° C. |
| Redox | −390 to −150 mV |

For RUN mode:

| Controlled Parameter | Set Points and Range |
|---|---|
| Agitation | 70 rpm ± 5 |
| Nitrogen Overlay | 12 SLPM ± 2 |
| Fermentor Pressure | 5 psig ± 1 |
| Fermentor Temperature | 35 ± 1° C. |

For Harvest mode:

| Controlled Parameter | Set Points and Range |
|---|---|
| Agitation | 150 rpm ± 10 |
| Nitrogen Overlay | 10 SLPM ± 2 |

-continued

| Controlled Parameter | Set Points and Range |
|---|---|
| Initial Fermentor Pressure | 0 psig |
| Fermentor Temperature | 25 ± 1° C. |

To prepare fermentation medium, material needed include D(+) Glucose, Anhydrous (Mallinckrodt Baker, Cat #7730, 300.0 g), Soy Peptone Type II (SPTII) (Marcor, Cat #1130, 650.0 g), Water for Injection (WFI, 13 L) and Yeast Extract (YE) (BD Cat #212730, 240.0 g), along with standard balances, a carboy (20 L, for example), glass bottle (5 L), graduated cylinders, stir bars and stirrers. About 10 L of WFI is added into the carboy along with a stir bar. The carboy is placed onto a stirrer and the stirrer is activated, after which about 650.0 g of soy peptone type II is added, along with about 240.00 g of YE. The fermentation medium is q.s. (quantity sufficient) to 13 L with WFI, and the carboy is capped. A 10% glucose solution (w/v) is then prepared by adding about 2 L if WFI into a glass 5 L bottle (with stir bar therein). Placed onto a stirrer and with the bar spinning, about 300.00 g of glucose is added into the bottle, and mixed until dissolved. The glucose solution is q.s. to 3 L with WFI and the bottled capped, thus providing a 10% glucose solution.

The fermentation medium in the carboy is added to the fermentor and pre-steam in place fermentor volume recorded and the fermentation sequence of operation is advanced. At the end of the SIP (steam in place(122° C.), +/−1° C.), the post-SIP fermentor volume is noted. A glucose addition assembly, comprising a vessel having tube therefrom with and in-line 0.2 μm filter (PALL Corp.) and peristaltic pump, is connected to the fermentor and the line is subjected to SIP and allowed to cool. An addition valve port is opened and about 3 L of glucose (filter sterilized) is added, and the appropriate amount of WFI (filter sterilized) to q.s. the total fermentor volume to 20 L is added to the glucose addition bottle and pumped into the fermentor through the same glucose filter line. The addition valve port is closed. The production fermentation medium has its pH adjusted thereafter, to about pH 7.3+/−0.05, with sterile 1 N sodium hydroxide or 1 N hydrochloric acid, utilizing SIP of addition lines, as required. Afterwards, parameters for sterile hold are set and held for about 12 hours before inoculation. The medium's starting glucose concentration is measured using a metabolite analyzer and glucose concentration recorded.

As stated above, at the end of seed culture incubation (about 11±1 hours), 1 mL of sample is taken for optical density (OD) measurement. OD is measured offline at 540 nm using a spectrophotometer and if within the appropriate range the OD value is recorded and culture is used for fermentation. The fermentor turbidity probe is accordingly zeroed. The seed inoculum bottle, from the anaerobic chamber, is brought over to the fermentor and a seed inoculum transfer assembly (a seed vessel with APF culture medium therein, the vessel having a culture inoculum transfer line with a sterile Kleenpak™ Connector assembly available from PALL Corp. or Millipore). The seed inoculum transfer line is then fixed to a peristaltic pump and the inoculum transfer line with sterile Kleenpak connector is connected to the fermentor. The fermentor pressure is lowered to 2 psig and entire volume of the seed inoculum bottle is pumped into the fermentor. At the end of inoculation, the online Absorbance Units (AU) from the fermentor is recorded, fermentor parameters are set to RUN mode and time is recorded.

Fermentation then proceeds (fermentation runs can be from about 60 hours to about 80 hours, preferably from about 68 hours to about 76 hours, most preferably for about 72 hours) while samples are taken from the fermentor, at 24 and 48 hours, for example, while maintaining aseptic conditions. Tests that are run on at least one sample taken during fermentation can include, but are not limited to, off-line optical density measurements, glucose measurements, ELISA, SDS-PAGE, Western blot, for example. At the end of the fermentation (end of fermentation broth volume is from about 18-19 L, for example), a sample may be taken (for testing by, for example, off-line optical density measurements, glucose measurements, ELISA, SDS-PAGE, western blot and DNA/RNA quantification.

At the end of the fermentation, online optical density, EFT (elapsed fermentation time), and fermentation end time is recorded, as well as agitation rpm, temperature in ° C., pressure psig and Nitrogen overlay slpm and redox mV. Next, the production fermentation broth is subjected to harvesting, i.e. the production fermentation broth is clarified through filtration whereby, for example, about 15 L of filtrate is collected. The fermentation parameters are set for HARVEST and the filter assembly for clarification is prepared (CUNO, 3M filtration) which includes a pre-filter, depth filter and at least one pressure gauge. The pre-filter and depth filter are flushed with about 20 L of water for injection. After flushing, the filtration assembly is attached to the harvest/drain port of the fermentor. The fermentor temperature is decreased to about 25° C., after which clarification of the fermentation broth begins (record clarification start time, initial online OD, initial pH, initial temperature and initial volume of fermentor). The pressure in the fermentor is increased at a rate of about 1 psi (pound per square inch) about every 10 minutes during filtration, until a pressure of about 6 psi is reached, at which the pressure is held until the end of harvesting. This filter removes approximately 80% of the RNA/DNA in the APF fermentation medium (the remainder essentially removed during later chromatography steps, as discussed below), thus doing away with prior reliance/use of RNase and/or DNase to remove such components from the fermentation broth. Process parameters, such as pre-filter inlet pressure, depth filter inlet pressure, fermentor pressure, agitation and filtrate volume are monitored at every 2 L of filtrate collected, at the end of which the clarification end time and volume of filtrate collected is recorded. Following completion of harvest step, the systems are decontaminated and cleaned.

The filtrate carboy is brought into the BSC for sampling, from which about ≤10 mL of filtrate is sampled for offline OD measurements and other analysis (e.g. ELISA, SDS-PAGE, DNA/RNA and western blot).

The filtrate is then subjected to ultrafiltration/dilution. A tangential flow filter (TFF) unit assembly is assembled. The TFF unit is rinsed for about 90 minutes with WFI at a preferred rate of about 2 L per minute and then the TFF unit is sanitized by running 0.1 N sodium hydroxide (re-circulated) therethrough for about 60 minutes, after which 1 L of 10 mM sodium phosphate buffer, pH 6.5 is run therethrough, followed by a rinse with WFI for about 30 minutes. The filtrate from the harvest step (about 15 L) is then passed through the TFF (this is carried out in a bio-safety cabinet), concentrating the filtrate down to about 5 L+/−0.5 L (the concentration step proceeds at about 2 L per minute and at a trans-membrane pressure of about 5 psig). A sample of the permeate can be taken and subjected to ELISA, dsDNA, SDS-PAGE and western blot tests, for example. Once concentrated to about 5 L+/−0.5 L, the retentate pool is then diluted up to about 20 L with about 15 L of sterile filtered 10 mM sodium phosphate buffer, pH 6.5, through the TFF, at about a rate of 2 L per minute. A sample can be then again be taken and subjected to ELISA, DNA/RNA, SDS-PAGE and western blot tests, for example. The ultrafiltration/dilution material (retentate) is stored at 4° C.

Following use all systems are decontaminated using either 1N sodium hydroxide or sterilization (steam) temperatures and cleaned.

The following materials, equipment and procedures are used to make the solutions, buffers, etc, set forth below for use in an exemplary process, that is in the purification of the fermentation medium obtained from the Example 6 processes so as to obtain a purified *botulinum* neurotoxin type A complex. Exemplary buffers utilized (filtered through a 0.2-micron vacuum filter and their conductivity measured in mS/cm, for recordkeeping) include: 10 mM sodium phosphate, pH 6.5; 50 mM sodium phosphate, pH 6.5; 50 mM sodium acetate, pH 4.8; 50 mM sodium acetate, 170 mM sodium chloride, pH 4.8; 50 mM sodium acetate, 250 mM sodium chloride, pH 4.8; 50 mM sodium acetate, 1 M sodium chloride, pH 4.8; 50 mM sodium acetate, pH 4.0 and 10 mM citrate, pH 6.5.

The following is an example of operations for purification and obtaining *botulinum* neurotoxin type A from the Example 6 processes. All product-contact parts are designed and constructed to ensure that they are non-reactive and non-absorptive. Additionally, all equipments are designed to allow the utilization of single use disposable systems or are designed and constructed to facilitate sanitization, cleaning and decontamination as per documented, validated methods. The systems or skids are designed to be non-product contacting while the flow paths are designed to be single use disposable, including the chromatography columns and the all associated tubing. Chromatography components are obtained from AlphaBio and UF/DF components are obtained from Scilog Inc. The chromatography set ups used include a peristaltic pump for solution delivery with variable speed drive, inlet valve manifold with 5 inlets, a column valve manifold with an array of 3 automated valves, outlet valve manifold with 3 outlets, column effluent monitoring, including pH, conductivity, and UV, peak collection based on UV absorbance, and instrumentation and controls required to complete the purification operations. The control system has both the software and hardware designed to control the purification process. Commands and data are entered via a HMI (Human Machine Interface) terminal. The operator initiates all automated process functions by commands at the HMI and monitors and adjusts process parameters such as feed flow rates, pressure, conductivity, pH, UV absorbance and individual valve positions.

The UF/DF system includes a recirculation pump, diafiltration pump, 2 balances and a tangential flow filter (TFF) holder. The recirculation pump interfaces with 3 disposable pressure sensors and one of the balances (located under the permeate reservoir) to control the flow rate to maintain a defined transmembrane pressure and stop, based on the weight of the permeate reservoir. The diafiltration pump interfaces with the second balance (located under the retentate reservoir) to start and stop, based on maintaining a constant weight of the retentate reservoir.

After concentration and dilution of retentate material from the harvesting step (harvesting the animal protein free fermentation medium), the material is loaded onto an anion exchange column. The following is the procedure used for packing and testing the anion exchange column useful in the exemplary Example 6 two-column process.

Pre-packed columns are used for all three chromatographic steps. First, feed material (harvested APF media that has been subjected to ultrafiltration/dilution) is passed through the anion exchange column (Poros 50HQ, from ABI as described above). At least 5 column volumes (CVs) of 50 mM sodium phosphate, pH 6.5, are utilized to equilibrate the anion exchange column (in this example, a capture column).

After equilibration, the loading step is performed, where feed material (post harvesting step harvested fermentation broth, of about 20 L, for example)) is loaded onto the anion exchange column at a rate of about 200 cm/hr for example. After 0.5 column volume of loaded material has passed through the anion exchange column, the flow through (FT) pool is collected into a receptacle such as a polyethersulfone vessel, while toxin complex is bound to the anion exchange column material. This is followed by a wash step, where at least about 15 column volumes of the wash buffer (e.g. 50 mM sodium phosphate at a pH of 6.5) is passed through the anion exchange column. The wash step is stopped when the UV, measured at the column outlet, in real time, decreases to less than or equal to about 80 mAU. The wash buffer volume and the flow through/wash pool volume are recorded, and a 1 mL sample of the flow through/wash pool is taken and tested, for example, for toxin concentration, nucleic acid content, whole cell proteins, SDS-PAGE, qPCR, 2D LC and ELISA.

The next step is the elution step, where elution buffer (e.g. 50 mM sodium acetate, pH 4.8) is pumped onto the anion exchange column. When the UV reading at the column outlet, in real-time, increases to about 150 mAU or more, collection of eluate in a container pre-filled with 1 CV of elution buffer (50 mM sodium acetate, pH 4.8) is begun. Collection of eluate pool is stopped when the UV reading decreases to less than or equal to about 200 mAU (volume collected at this point is between about 1 to about 2 CVs). The chromatography system is then decontaminated and cleaned using 1 N sodium hydroxide.

The eluate pool from the anion exchange column is then prepared for addition onto the cation exchange column. The anion exchange eluate volume, pH, conductivity and feed temperature are recorded and the eluate pool from the anion exchange column is diluted with 1 CV of 50 mM sodium acetate, pH 4.8.

Following the run-through of the anion exchange column, cation exchange chromatography operation is undertaken. The cation exchange column (e.g. Poros® 20HS) is equilibrated with a minimum of 5 CVs of equilibration buffer (50 mM sodium acetate, pH 4.8). After equilibration, the diluted eluate pool from the anion exchange column is loaded onto the cation exchange column and the total volume loaded is recorded. After 0.5 column volume of loaded diluted eluate pool has passed through the cation exchange column, the flow through (FT) pool is collected. A first wash of the cation exchange column is conducted where about 3-5 CVs of 50 mM sodium acetate, pH 4.8, is passed through the cation exchange column (volume of first wash buffer utilized is recorded). A second wash is performed, where about 3 CVs of 170 mM sodium chloride, 50 mM sodium acetate, pH 4.8, is pumped through the column, this eluate being collected in a new container labeled "WASH 2 Peak". Collection is begun when the UV readings increase to greater than or equal to 50 mAU. 1 CV is collected and the second wash buffer volume utilized is recorded.

Elution of bulk toxin complex from the cation exchange column is carried out utilizing elution buffer (e.g. 250 mM sodium chloride in 50 mM sodium acetate, pH 4.8) which is pumped onto the cation exchange column. When the UV reading of the elution reaches at least about 100 mAU, eluate collection begins into containers pre-filled with dilution buffers (40 mL of 100 mM potassium phosphate, pH 6.8 and 60 mL of 10 mM potassium citrate, pH 6.5). Collection of eluate from the cation exchange column continues until UV readings decreases to about 100 mAU or less. The total volume of elute, after dilution, is recorded. The cation exchange chromatography system is then decontaminated and cleaned.

Following elution from the cation exchange column, the eluate is subjected to filtration. A tangential flow filtration (TFF) system is utilized, using three 100K MWCO membranes (Sartorius AG, Goettingen, Germany) stacked one atop the other. The cation exchange eluate pool initial volume is noted, as are the diafiltration/equilibration and sanitation solution descriptions. For example, the diafiltration solution can be 10 mM potassium citrate, pH 6.5 and the sanitation solution can be 0.1 N sodium hydroxide. System set up proceeds with connection of one tube from the reservoir containing either eluate from the cation column (IAPF) or HIC column (FAPF), the eluate containing *botulinum* toxin, through the ultrafiltration pump head into the inlet of the tangential flow filtration membrane. A second tube from the permeate outlet of the tangential flow filtration membrane is connected to the ultrafiltration (UF) permeate container. A tube from the retentate outlet of the tangential flow filtration membrane to the retentate reservoir is secured, and a fourth tube from the diafiltration (DF) buffer through the diafiltration pump head and into the retentate reservoir is also secured. The storage buffer of the system is flushed, as is the membrane, by flushing the membrane with at least about 720 mL of water for injection (WFI) with the retentate directed to waste, after which the membrane is further flushed with at least about 4200 mL of water for injection with the retentate recirculating to the reservoir. After this, membrane sanitation (if necessary) is carried out by flushing the membrane with at least about 200 mL of IN sodium hydroxide with the retentate directed to waste, followed by a flushing of the membrane with at least about 200 mL of 1N NaOH with the retentate recirculating to the reservoir for a minimum of 30 minutes. Equilibration is then performed, by flushing the membrane with equilibration buffer (10 mM potassium citrate at a pH of 6.5), with retentate directed to waste until the retentate and permeate pH is within +/−0.2 units of the pH of the equilibration buffer (for example, within +/−0.2 units of pH 6.5).

The concentration of the material (eluate (product pool) from the cation exchange column) is determined, to see if dilution or concentration (exemplary processing) is appropriate (an example target concentration can be about 0.7 mg/mL). Dilution is accomplished utilizing 10 mM potassium citrate, pH 6.5. A target volume is determined, for example for a 0.7 mg/mL product concentration (target vol=(starting concentration/starting vol)/0.7 mg/mL).

The product pool (eluate (accordingly processed or not) from cation exchange column) is loaded onto the membrane and recirculation (with permeate outlet closed) of the system (TFF system) is run for at least 2 minutes with no backpressure, after which the permeate valve is slowly opened while adjusting the retentate back pressure valve to a target of about 7 psig transmembrane pressure. For dilution, 10 mM potassium citrate, pH 6.5 is added to target volume, and moved onto diafiltration without ultrafiltration; for concentration, ultrafiltration is begun. For diafiltration: permeate waste is collected in a new container (target diafiltration volume is 5× diafiltration volume) and diafiltered with at least 5 diafiltration volumes of 10 mM potassium citrate, pH 6.5. Diafiltration process data is collected at a minimum of 10-minute intervals (permeate weight g/vol mL, inlet pressure (psig), retentate pressure (psig), permeate pressure (psig) and transmembrane pressure (psig)). For recirculation/and rinse: with the permeate outlet filter closed, the system is recirculated/run for at least 2 minutes with no backpressure and the system is rinsed with at least 20 mL of 10 mM potassium citrate, pH 6.5. The product pool includes the retentate and the rinse. A sample can be taken from the product pool and subjected to verification analysis including, for example, UV at 278 nm, SDS-Page, LcHPLC, SE-HPLC, qPCR, RP-HPLC, Native-Page, AUC, Limulus amebocyte lysate, Western Blot and ELISA tests. For post-use cleaning, the system is flushed with IN sodium hydroxide, recirculated for at least 10 minutes, after which the system is flushed and stored with 0.1 N sodium hydroxide therein.

Sterile filtration and filling are then conducted for storing and dividing the bulk neurotoxin. Concentration adjustment is performed to adjust toxin concentration, using 10 mM potassium citrate, pH 6.5, to about 0.5 mg/mL with the post rinse sample. If toxin concentration is less than about 0.5 mg/mL, then no concentration adjustment is needed.

Using a sterile pipette, 10 mL/0.75 mL aliquots into each of sterile 15 mL/1.5 mL sample tubes are made. The product container is gently stirred by hand and transfer the required amount of solution (containing bulk drug substance, i.e. bulk *botulinum* toxin) into each vial. The samples are stored a maximum of 5 days at 2° C.-8° C. refrigerator or 0.75 mL of the filtrate product pool is transferred to cryovials. The cryovials are stored at −70° C.+/−5° C.

6.7. Example 7: A Column Chromatographic Process for Obtaining a *Botulinum* Neurotoxin This example describes a column chromatographic process for obtaining a *botulinum* neurotoxin. It is contemplated that certain steps described in Example 5, certain steps described in Example 6, and certain steps described in this Example 7 can be combined or switched with each other for obtaining the *botulinum* neurotoxin as deemed appropriated in the opinion and judgment of a person skilled in the art.

*Clostridium botulinum* bacteria are cultured and allowed to grow until fermentation is complete. The fermentation culture is then used in the following purification procedure:

The fermentation culture is subjected to acid precipitation using 3M sulfuric acid to reduce pH to 3.5 at a temperature that is below 25° C. The acid precipitate is then subjected to 0.1 μm tangential flow filtration to concentrate cell mass. Then the pH is adjusted to 6.0 and nucleases are added to reduce host cell nucleic acid content. Then clarification by centrifugation is performed to remove cell debris and dead end filtration at 0.2 μm is performed with added ammonium sulfate. The filtrate is then directly loaded onto the hydrophobic interaction column, Phenyl Sepharose HP (GE Life Sciences), eluted with a descending gradient of ammonium sulfate, and the product peak is isolated.

Anion exchange column and/or cation exchange column are optionally used before or after the hydrophobic interaction column. If anion exchange column and/or cation exchange column are used, they are used preferably after the hydrophobic interaction column.

7. INCORPORATION BY REFERENCE

All references cited herein are incorporated herein by reference in their entirety and for all purposes to the same extent as if each individual publication or patent or patent application was specifically and individually indicated to be incorporated by reference in its entirety for all purposes.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A composition comprising a plurality of 900 kDa *Clostridium botulinum* neurotoxin serotype A (BoNT/A) complex species, wherein the composition comprises:
   (a) a 900 kDa BoNT/A complex species comprising a 150 kDa BoNT/A sequence variant species with a C-terminal truncated light chain, wherein the C-terminal truncated light chain has an amino acid sequence set forth in SEQ ID NO: 4, and
   (b) a 900 kDa BoNT/A complex species comprising a 150 kDa BoNT/A sequence variant species with a full-length light chain, wherein the full-length light chain has an amino acid sequence set forth in SEQ ID NO: 2, wherein the abundance ratio of the 150 kDa BoNT/A sequence variant species with the C-terminal truncated light chain to the 150 kDa BoNT/A sequence variant species with the full-length light chain is less than 3.9.

2. A composition comprising a plurality of 900 kDa BoNT/A complex species, wherein the composition comprises a 900 kDa BoNT/A complex species comprising a 150 kDa BoNT/A sequence variant species with a C-terminal truncated light chain, wherein the C-terminal truncated light chain has an amino acid sequence set forth in SEQ ID NO: 4, and wherein the abundance percentage of the 150 kDa BoNT/A sequence variant species with the C-terminal truncated light chain compared to all 150 kDa BoNT/A sequence variant species is less than 79.5%.

3. The composition of claim 1, wherein the abundance ratio is measured by anion exchange chromatography (AEX).

4. The composition of claim 2, wherein the abundance percentage is measured by AEX.

5. The composition of claim 1, wherein the 900 kDa BoNT/A complex is produced by *Clostridium botulinum* bacteria cultured and expanded from an animal product free working cell bank.

6. The composition of claim 1, wherein the 900 kDa BoNT/A complex is onabotulinumtoxin A.

7. The composition of claim 1, which further comprises about 0.5 mg of human serum albumin per 100 units of the 900 kDa BoNT/A complex and about 0.9 mg of sodium chloride per 100 units of the 900 kDa BoNT/A complex.

8. The composition of claim 7, wherein the human serum albumin is recombinant human serum albumin.

9. The composition of claim 1, which is animal product free.

10. The composition of claim 1, which does not contain a protease inhibitor.

11. The composition of claim 1, which has a potency of from about $1.5 \times 10^7$ units/mg to about $6.0 \times 10^7$ units/mg.

12. The composition of claim 1, which is a powdered pharmaceutical composition.

13. The composition of claim 1, wherein the 900 kDa BoNT/A complex is produced by a process that comprises one or more steps of column chromatography.

14. The composition of claim 13, wherein the one or more steps of column chromatography comprise hydrophobic interaction chromatography.

15. The composition of claim 14, wherein the one or more steps of column chromatography further comprise anion exchange chromatography or cation exchange chromatography.

16. The composition of claim 2, wherein the 900 kDa BoNT/A complex is produced by *Clostridium botulinum* bacteria cultured and expanded from an animal product free working cell bank.

17. The composition of claim 2, wherein the 900 kDa BoNT/A complex is onabotulinumtoxin A.

18. The composition of claim 2, which further comprises about 0.5 mg of human serum albumin per 100 units of the 900 kDa BoNT/A complex and about 0.9 mg of sodium chloride per 100 units of the 900 kDa BoNT/A complex.

19. The composition of claim 18, wherein the human serum albumin is recombinant human serum albumin.

20. The composition of claim 2, which is animal product free.

21. The composition of claim 2, which does not contain a protease inhibitor.

22. The composition of claim 2, which has a potency of from about $1.5 \times 10^7$ units/mg to about $6.0 \times 10^7$ units/mg.

23. The composition of claim 2, which is a powdered pharmaceutical composition.

24. The composition of claim 2, wherein the 900 kDa BoNT/A complex is produced by a process that comprises one or more steps of column chromatography.

25. The composition of claim 24, wherein the one or more steps of column chromatography comprise hydrophobic interaction chromatography.

26. The composition of claim 25, wherein the one or more steps of column chromatography further comprise anion exchange chromatography or cation exchange chromatography.

* * * * *

```
                         SEQUENCE LISTING

Sequence total quantity: 4
SEQ ID NO: 1            moltype = AA  length = 1296
FEATURE                 Location/Qualifiers
source                  1..1296
                        mol_type = protein
                        note = amino acid sequence of the 150 kDa BoNT/A molecule
                        organism = Clostridium botulinum
SEQUENCE: 1
MPFVNKQFNY KDPVNGVDIA YIKIPNAGQM QPVKAFKIHN KIWVIPERDT FTNPEEGDLN   60
PPPEAKQVPV SYYDSTYLST DNEKDNYLKG VTKLFERIYS TDLGRMLLTS IVRGIPFWGG  120
STIDTELKVI DTNCINVIQP DGSYRSEELN LVIIGPSADI IQFECKSFGH EVLNLTRNGY  180
GSTQYIRFSP DFTFGFEESL EVDTNPLLGA GKFATDPAVT LAHELIHAGH RLYGIAINPN  240
RVFKVNTNAY YEMSGLEVSF EELRTFGGHD AKFIDSLQEN EFRLYYYNKF KDIASTLNKA  300
KSIVGTTASL QYMKNVFKEK YLLSEDTSGK FSVDKLKFDK LYKMLTEIYT EDNFVKFFKV  360
LNRKTYLNFD KAVFKINIVP KVNYTIYDGF NLRNTNLAAN FNGQNTEINN MNFTKLKNFT  420
GLFEFYKLLC VRGIITSKTK SLDKGYNKAL NDLCIKVNNW DLFFSPSEDN FTNDLNKGEE  480
ITSDTNIEAA EENISLDLIQ QYYLTFNFDN EPENISIENL SSDIIGQLEL MPNIERFPNG  540
KKYELDKYTM FHYLRAQEFE HGKSRIALTN SVNEALLNPS RVYTFFSSDY VKKVNKATEA  600
AMFLGWVEQL VYDFTDETSE VSTTDKIADI TIIIPYIGPA LNIGNMLYKD DFVGALIFSG  660
AVILLEFIPE IAIPVLGTFA LVSYIANKVL TVQTIDNALS KRNEKWDEVY KYIVTNWLAK  720
VNTQIDLIRK KMKEALENQA EATKAIINYQ YNQYTEEEKN NINFNIDDLS SKLNESINKA  780
MININKFLNQ CSVSYLMNSM IPYGVKRLED FDASLKDLL KYIYDNRGTL IGQVDRLKDK  840
VNNTLSTDIP FQLSKYVDNQ RLLSTFTEYI KNIIINTSILN LRYESNHLID LSRYASKINI  900
GSKVNFDPID KNQIQLFNLE SSKIEVILKN AIVYNSMYEN FSTSFWIRIP KYFNSISLNN  960
EYTIINCMEN NSGWKVSLNY GEIIWTLQDT QEIKQRVVFK YSQMINISDY INRWIFVTIT 1020
NNRLNNSKIY INGRLIDQKP ISNLGNIHAS NNIMFKLDRC RDTHRYIWIK YFNLFDKELN 1080
EKEIKDLYDN QSNSGILKDF WGDYLQYDKP YYMLNLYDPN KYVDVNNVGI RGYMYLKGPR 1140
GSVMTTNIYL NSSLYRGTKF IIKKYASGNK DNIVRNNDRV YINVVVKNKE YRLATNASQA 1200
GVEKILSALE IPDVGNLSQV VVMKSKNDQG ITNKCKMNLQ DNNGNDIGFI GFHQFNNIAK 1260
LVASNWYNRQ IERSSRTLGC SWEFIPVDDG WGERPL                          1296

SEQ ID NO: 2            moltype = AA  length = 437
FEATURE                 Location/Qualifiers
source                  1..437
                        mol_type = protein
                        note = amino acid sequence of the light chain (LC) of
                          full-length 150 kDa BoNT/A
                        organism = Clostridium botulinum
SEQUENCE: 2
PFVNKQFNYK DPVNGVDIAY IKIPNAGQMQ PVKAFKIHNK IWVIPERDTF TNPEEGDLNP   60
PPEAKQVPVS YYDSTYLSTD NEKDNYLKGV TKLFERIYST DLGRMLLTSI VRGIPFWGGS  120
TIDTELKVID TNCINVIQPD GSYRSEELNL VIIGPSADII QFECKSFGHE VLNLTRNGYG  180
STQYIRFSPD FTFGFEESLE VDTNPLLGAG KFATDPAVTL AHELIHAGHR LYGIAINPNR  240
VFKVNTNAYY EMSGLEVSFE ELRTFGGHDA KFIDSLQENE FRLYYYNKFK DIASTLNKAK  300
SIVGTTASLQ YMKNVFKEKY LLSEDTSGKF SVDKLKFDKL YKMLTEIYTE DNFVKFFKVL  360
NRKTYLNFDK AVFKINIVPK VNYTIYDGFN LRNTNLAANF NGQNTEINNM NFTKLKNFTG  420
LFEFYKLLCV RGIITSK                                                437

SEQ ID NO: 3            moltype = AA  length = 848
FEATURE                 Location/Qualifiers
source                  1..848
                        mol_type = protein
                        note = amino acid sequence of the heavy chain (HC) of 150
                          kDa BoNT/A
                        organism = Clostridium botulinum
SEQUENCE: 3
ALNDLCIKVN NWDLFFSPSE DNFTNDLNKG EEITSDTNIE AAEENISLDL IQQYYLTFNF   60
DNEPENISIE NLSSDIIGQL ELMPNIERFP NGKKYELDKY TMFHYLRAQE FEHGKSRIAL  120
TNSVNEALLN PSRVYTFFSS DYVKKVNKAT EAAMFLGWVE QLVYDFTDET SEVSTTDKIA  180
DITIIIPYIG PALNIGNMLY KDDPVGALIF SGAVILLEFI PEIAIPVLGT FALVSYIANK  240
VLTVQTIDNA LSKRNEKWDE VYKYIVTNWL AKVNTQIDLI RKKMKEALEN QAEATKAIIN  300
YQYNQYTEEE KNNINFNIDD LSSKLNESIN KAMININKFL NQCSVSYLMN SMIPYGVKRL  360
EDFDASLKDA LLKYIYDNRG TLIGQVDRLK DKVNNTLSTD IPFQLSKYVD NQRLLSTFTE  420
YIKNIINTSI LNLRYESNHL IDLSRYASKI NIGSKVNFDP IDKNQIQLFN LESSKIEVIL  480
KNAIVYNSMY ENFSTSFWIR IPKYFNSISL NNEYTIINCM ENNSGWKVSL NYGEIIWTLQ  540
DTQEIKQRVV FKYSQMINIS DYINRWIFVT ITNNRLNNSK IYINGRLIDQ KPISNLGNIH  600
```

```
ASNNIMFKLD GCRDTHRYIW IKYFNLFDKE LNEKEIKDLY DNQSNSGILK DFWGDYLQYD   660
KPYYMLNLYD PNKYVDVNNV GIRGYMYLKG PRGSVMTTNI YLNSSLYRGT KFIIKKYASG   720
NKDNIVRNND RVYINVVVKN KEYRLATNAS QAGVEKILSA LEIPDVGNLS QVVVMKSKND   780
QGITNKCKMN LQDNNGNDIG FIGFHQFNNI AKLVASNWYN RQIERSSRTL GCSWEFIPVD   840
DGWGERPL                                                           848

SEQ ID NO: 4            moltype = AA  length = 435
FEATURE                 Location/Qualifiers
source                  1..435
                        mol_type = protein
                        note = amino acid sequence of the light chain (LC) of the
                          truncated 150 kDa BoNT/A with C-terminal (-SK) truncation
                        organism = Clostridium botulinum
SEQUENCE: 4
PFVNKQFNYK DPVNGVDIAY IKIPNAGQMQ PVKAFKIHNK IWVIPERDTF TNPEEGDLNP   60
PPEAKQVPVS YYDSTYLSTD NEKDNYLKGV TKLFERIYST DLGRMLLTSI VRGIPFWGGS   120
TIDTELKVID TNCINVIQPD GSYRSEELNL VIIGPSADII QFECKSFGHE VLNLTRNGYG   180
STQYIRFSPD FTFGFEESLE VDTNPLLGAG KFATDPAVTL AHELIHAGHR LYGIAINPNR   240
VFKVNTNAYY EMSGLEVSFE ELRTFGGHDA KFIDSLQENE FRLYYYNKFK DIASTLNKAK   300
SIVGTTASLQ YMKNVFKEKY LLSEDTSGKF SVDKLKFDKL YKMLTEIYTE DNFVKFFKVL   360
NRKTYLNFDK AVFKINIVPK VNYTIYDGFN LRNTNLAANF NGQNTEINNM NFTKLKNFTG   420
LFEFYKLLCV RGIIT                                                   435
```